(12) United States Patent
Garza et al.

(10) Patent No.: US 7,893,356 B2
(45) Date of Patent: Feb. 22, 2011

(54) CABLE MANAGEMENT ACCESSORIES

(75) Inventors: Jose Arturo Garza, Pflugerville, TX (US); Daniel Alaniz, Austin, TX (US); D. Brian Donowho, Austin, TX (US); James I. Lawrence, Georgetown, TX (US); Joshua James Young, Austin, TX (US); Wayne Arnold Zahlit, Thousand Oaks, CA (US)

(73) Assignee: Chatsworth Products, Inc., Westlake Village, CA (US)

( * ) Notice: Subject to any disclaimer, the term of this patent is extended or adjusted under 35 U.S.C. 154(b) by 0 days.

(21) Appl. No.: 12/695,916

(22) Filed: Jan. 28, 2010

(65) Prior Publication Data

US 2010/0126750 A1 May 27, 2010

Related U.S. Application Data

(63) Continuation of application No. 12/350,216, filed on Jan. 7, 2009.

(60) Provisional application No. 61/019,599, filed on Jan. 7, 2008, provisional application No. 61/020,745, filed on Jan. 14, 2008, provisional application No. 61/095,308, filed on Sep. 8, 2008, provisional application No. 61/019,592, filed on Jan. 7, 2008, provisional application No. 61/020,741, filed on Jan. 13, 2008.

(51) Int. Cl.
*H02G 3/00* (2006.01)

(52) U.S. Cl. ............... 174/100; 174/68.3; 174/68.1; 385/134; 385/135; 439/719; 361/826

(58) Field of Classification Search .............. 174/480, 174/481, 68.1, 68.3, 101, 72 A, 100, 135, 174/97; 439/719; 385/134, 135, 825, 826, 385/827, 829; 211/26, 189; 248/68.1, 49; 361/826, 827

See application file for complete search history.

(56) References Cited

U.S. PATENT DOCUMENTS 2,531,110 A 11/1950 Cisler (Continued)

FOREIGN PATENT DOCUMENTS

AU 322229 11/2008

(Continued)

OTHER PUBLICATIONS

"International Search Report" and "Written Opinion of the International Search Authority" (Australian Patent Office) in Chatsworth Products, Inc. et al., International Patent Application Serial No. PCT/US2008/030368, dated Apr. 8, 2009, 20 pages.

(Continued)

*Primary Examiner*—Angel R Estrada
(74) *Attorney, Agent, or Firm*—Tillman Wright, PLLC; James D. Wright; Chad D. Tillman

(57) ABSTRACT

A vertical cable manager includes a base, an interconnected double-spine assembly topped by a top frame, and a pair of doors. The double-spine assembly is supported by the base. Each door is removably coupled at each lower corner to the base and at each upper corner to the top frame, thus permitting each door to be opened or hinged along either of its lateral sides or removed entirely. The double-spine assembly may support selectively repositionable mounting members, which may in turn support a large cable spool, a selectively repositionable shelf-mounted handle spool assembly, and various other cable management accessories.

38 Claims, 40 Drawing Sheets

U.S. PATENT DOCUMENTS

| | | | |
|---|---|---|---|
| D171,224 S | 12/1953 | Pfaff, Jr. |
| 2,921,607 A | 1/1960 | Caveney |
| 3,403,220 A | 9/1968 | Riedel et al. |
| 3,485,937 A | 12/1969 | Caveney |
| 3,657,608 A | 4/1972 | Leone et al. |
| 3,705,949 A | 12/1972 | Weiss |
| 3,761,603 A | 9/1973 | Hays et al. |
| 3,890,459 A | 6/1975 | Caveney |
| 3,906,146 A | 9/1975 | Taylor |
| 3,968,322 A | 7/1976 | Taylor |
| 4,002,856 A | 1/1977 | Sedlacek et al. |
| 4,046,957 A | 9/1977 | Taylor et al. |
| 4,136,257 A | 1/1979 | Taylor |
| 4,398,564 A | 8/1983 | Young et al. |
| 4,470,102 A | 9/1984 | De Luca et al. |
| 4,484,020 A | 11/1984 | Loof et al. |
| 4,553,674 A | 11/1985 | Yoshikawa et al. |
| D282,538 S | 2/1986 | Loof et al. |
| 4,641,225 A | 2/1987 | Reichle |
| D292,974 S | 12/1987 | Kenning et al. |
| 4,902,852 A | 2/1990 | Wuertz |
| 5,023,404 A | 6/1991 | Hudson et al. |
| 5,024,251 A | 6/1991 | Chapman |
| 5,086,195 A | 2/1992 | Claisse |
| 5,216,579 A | 6/1993 | Basara et al. |
| 5,235,136 A | 8/1993 | Santucci et al. |
| 5,326,934 A | 7/1994 | LeMaster et al. |
| D360,189 S | 7/1995 | Orlando |
| 5,586,012 A | 12/1996 | Lerman |
| 5,602,364 A | 2/1997 | Ustin |
| 5,640,482 A | 6/1997 | Barry et al. |
| 5,758,002 A | 5/1998 | Walters |
| D395,816 S | 7/1998 | Colodny |
| 5,788,087 A | 8/1998 | Orlando |
| 5,831,216 A | 11/1998 | Hoffmann |
| 5,901,033 A | 5/1999 | Crawford et al. |
| 5,902,961 A | 5/1999 | Viklund et al. |
| 6,011,221 A | 1/2000 | Lecinski et al. |
| 6,012,683 A | 1/2000 | Howell |
| 6,044,194 A | 3/2000 | Meyerhoefer |
| 6,067,233 A | 5/2000 | English et al. |
| 6,102,214 A | 8/2000 | Mendoza |
| 6,107,576 A | 8/2000 | Morton et al. |
| 6,127,631 A | 10/2000 | Green et al. |
| 6,181,862 B1 | 1/2001 | Noble et al. |
| 6,185,098 B1 | 2/2001 | Benavides |
| D439,503 S | 3/2001 | Paliga et al. |
| D440,210 S | 4/2001 | Larsen et al. |
| 6,215,069 B1 | 4/2001 | Martin et al. |
| 6,245,998 B1 | 6/2001 | Curry et al. |
| 6,250,816 B1 * | 6/2001 | Johnston et al. ............ 385/135 |
| D448,737 S | 10/2001 | Nakamura |
| 6,307,997 B1 | 10/2001 | Walters et al. |
| 6,313,405 B1 | 11/2001 | Rinderer |
| 6,318,680 B1 | 11/2001 | Benedict et al. |
| 6,332,594 B2 | 12/2001 | Shelton et al. |
| 6,347,714 B1 | 2/2002 | Fournier et al. |
| 6,348,655 B1 | 2/2002 | Wright |
| 6,365,834 B1 | 4/2002 | Larsen et al. |
| 6,386,120 B1 | 5/2002 | Nelson et al. |
| 6,398,149 B1 | 6/2002 | Hines et al. |
| 6,403,885 B1 | 6/2002 | Baker et al. |
| 6,437,243 B1 | 8/2002 | VanderVelde et al. |
| 6,437,244 B1 | 8/2002 | VanderVelde |
| D463,253 S | 9/2002 | Canty |
| 6,461,052 B1 | 10/2002 | Hines et al. |
| 6,467,633 B1 | 10/2002 | Mendoza |
| 6,468,112 B1 | 10/2002 | Follingstad et al. |
| 6,489,565 B1 | 12/2002 | Krietzman et al. |
| 6,501,020 B2 | 12/2002 | Grant et al. |
| 6,501,899 B1 | 12/2002 | Marrs et al. |
| 6,504,100 B2 | 1/2003 | Lawrence et al. |
| 6,515,225 B1 | 2/2003 | Wright |
| 6,541,705 B1 | 4/2003 | McGrath |
| 6,584,267 B1 | 6/2003 | Caveney et al. |
| 6,600,107 B1 | 7/2003 | Wright et al. |
| 6,605,782 B1 | 8/2003 | Krietzman et al. |
| 6,614,665 B2 | 9/2003 | Witty et al. |
| 6,614,978 B1 | 9/2003 | Caveney et al. |
| 6,647,197 B1 | 11/2003 | Marrs et al. |
| 6,708,830 B2 | 3/2004 | Mendoza |
| 6,715,619 B2 | 4/2004 | Kim et al. |
| 6,761,583 B2 | 7/2004 | Ortowski et al. |
| 6,762,360 B2 | 7/2004 | Wright |
| 6,766,093 B2 | 7/2004 | McGrath et al. |
| D495,244 S | 8/2004 | Ward |
| 6,855,884 B2 | 2/2005 | Spagnoli et al. |
| 6,866,541 B2 | 3/2005 | Barker et al. |
| 6,884,942 B2 | 4/2005 | McGrath et al. |
| 6,918,796 B2 | 7/2005 | Elliot et al. |
| D509,479 S | 9/2005 | DePaola |
| 6,945,616 B2 | 9/2005 | Webster et al. |
| 6,946,605 B2 | 9/2005 | Levesque et al. |
| 6,964,588 B2 | 11/2005 | Follingstad et al. |
| 6,968,647 B2 | 11/2005 | Levesque et al. |
| 6,981,893 B2 | 1/2006 | Barker et al. |
| 7,000,784 B2 | 2/2006 | Canty et al. |
| 7,019,213 B1 | 3/2006 | McNutt et al. |
| 7,026,553 B2 | 4/2006 | Levesque et al. |
| 7,060,893 B1 | 6/2006 | Villi |
| 7,083,051 B2 | 8/2006 | Smith et al. |
| 7,119,282 B2 | 10/2006 | Krietzman et al. |
| 7,120,348 B2 * | 10/2006 | Trebesch et al. ............ 385/135 |
| 7,152,936 B2 | 12/2006 | Tarawicz |
| 7,178,679 B2 | 2/2007 | Canty et al. |
| D539,228 S | 3/2007 | Toikka et al. |
| D542,240 S | 5/2007 | Laursen et al. |
| 7,220,150 B2 | 5/2007 | Follingstad et al. |
| 7,225,586 B2 | 6/2007 | Levesque et al. |
| 7,229,050 B2 | 6/2007 | Schloss |
| 7,285,027 B2 | 10/2007 | McGrath et al. |
| 7,286,345 B2 | 10/2007 | Casebolt |
| D554,598 S | 11/2007 | Laursen et al. |
| 7,300,308 B2 | 11/2007 | Laursen et al. |
| 7,345,241 B2 | 3/2008 | Caveney et al. |
| 7,362,941 B2 | 4/2008 | Rinderer et al. |
| 7,378,046 B2 | 5/2008 | Canty et al. |
| 7,381,100 B2 | 6/2008 | Follingstad et al. |
| 7,406,242 B1 | 7/2008 | Braga |
| 7,417,188 B2 | 8/2008 | McNutt et al. |
| 7,425,678 B2 | 9/2008 | Adducci et al. |
| 7,427,713 B2 | 9/2008 | Adducci et al. |
| 7,437,048 B2 | 10/2008 | Farrell et al. |
| 7,458,859 B2 | 12/2008 | McGrath et al. |
| 7,480,154 B2 | 1/2009 | Lawrence et al. |
| 7,485,803 B2 | 2/2009 | Adducci et al. |
| 7,495,169 B2 | 2/2009 | Adducci et al. |
| 7,504,581 B2 | 3/2009 | Adducci et al. |
| D596,928 S | 7/2009 | Lawrence et al. |
| D596,929 S | 7/2009 | Lawrence et al. |
| 7,565,051 B2 | 7/2009 | Vongseng |
| D602,764 S | 10/2009 | Pae et al. |
| D611,326 S | 3/2010 | Alaniz et al. |
| 7,687,716 B2 * | 3/2010 | Pepe et al. ................. 174/101 |
| 7,746,637 B2 | 6/2010 | Donowho et al. |
| 7,762,405 B2 | 7/2010 | Vogel et al. |
| 2001/0002689 A1 | 6/2001 | Shelton et al. |
| 2001/0022231 A1 | 9/2001 | Dyer |
| 2001/0030266 A1 | 10/2001 | MacDonald et al. |
| 2002/0074149 A1 | 6/2002 | Lawrence et al. |
| 2002/0092662 A1 | 7/2002 | Grant et al. |
| 2003/0020379 A1 | 1/2003 | Larsen et al. |
| 2003/0190036 A1 | 10/2003 | Mandoza |
| 2004/0007372 A1 | 1/2004 | Krietzman et al. |

| | | | |
|---|---|---|---|
| 2004/0011547 A1 | 1/2004 | Wright | |
| 2004/0050808 A1 | 3/2004 | Krampotich et al. | |
| 2004/0069725 A1 | 4/2004 | Adducci et al. | |
| 2004/0094491 A1 | 5/2004 | Smith et al. | |
| 2004/0173545 A1 | 9/2004 | Canty et al. | |
| 2004/0183409 A1 | 9/2004 | Rinderer | |
| 2004/0190270 A1 | 9/2004 | Aldag et al. | |
| 2005/0006323 A1 | 1/2005 | Abby et al. | |
| 2005/0057912 A1 | 3/2005 | Hardt et al. | |
| 2005/0103517 A1 | 5/2005 | Canepa | |
| 2005/0115152 A1 | 6/2005 | Levesque et al. | |
| 2005/0115737 A1 | 6/2005 | Levesque et al. | |
| 2005/0221683 A1 | 10/2005 | McGrath et al. | |
| 2005/0247650 A1 | 11/2005 | Vogel et al. | |
| 2006/0043031 A1 | 3/2006 | Rinderer | |
| 2006/0054336 A1 | 3/2006 | McNutt et al. | |
| 2006/0059802 A1 | 3/2006 | McNutt et al. | |
| 2006/0091086 A1 | 5/2006 | Canty et al. | |
| 2006/0162948 A1 | 7/2006 | Rinderer et al. | |
| 2006/0171651 A1 | 8/2006 | Laursen | |
| 2006/0269210 A1 | 11/2006 | Waszak | |
| 2007/0207666 A1 | 9/2007 | Caveney et al. | |
| 2007/0210679 A1 | 9/2007 | Adducci et al. | |
| 2007/0210680 A1 | 9/2007 | Appino et al. | |
| 2007/0210681 A1 | 9/2007 | Adducci et al. | |
| 2007/0210683 A1 | 9/2007 | Adducci et al. | |
| 2007/0210686 A1 | 9/2007 | Adducci et al. | |
| 2007/0212010 A1 | 9/2007 | Caveney et al. | |
| 2007/0221393 A1 | 9/2007 | Adducci et al. | |
| 2007/0249237 A1 | 10/2007 | Follingstad et al. | |
| 2008/0174217 A1 | 7/2008 | Walker | |
| 2008/0316702 A1 | 12/2008 | Donowho et al. | |
| 2008/0316703 A1 | 12/2008 | Donowho et al. | |
| 2009/0038845 A1 | 2/2009 | Fransen et al. | |
| 2009/0093169 A1 | 4/2009 | McGrath et al. | |
| 2009/0129013 A1 | 5/2009 | Donowho et al. | |
| 2009/0224110 A1 | 9/2009 | Donowho et al. | |
| 2009/0236117 A1 | 9/2009 | Garza et al. | |
| 2009/0273915 A1 | 11/2009 | Dean, Jr. et al. | |
| 2009/0283488 A1 | 11/2009 | McMillan et al. | |
| 2010/0122830 A1 | 5/2010 | Garza et al. | |
| 2010/0126751 A1 | 5/2010 | Garza et al. | |
| 2010/0193754 A1 | 8/2010 | Garza et al. | |
| 2010/0200707 A1 | 8/2010 | Garza et al. | |

FOREIGN PATENT DOCUMENTS

| | | |
|---|---|---|
| AU | 322230 | 11/2008 |
| AU | 322231 | 11/2008 |
| AU | 322232 | 11/2008 |
| AU | 322233 | 11/2008 |
| AU | 323811 | 1/2009 |
| AU | 323812 | 1/2009 |
| AU | 323813 | 1/2009 |
| AU | 323814 | 1/2009 |
| AU | 328418 | 10/2009 |
| AU | 328419 | 10/2009 |
| AU | 328420 | 10/2009 |
| AU | 332167 | 8/2010 |
| AU | 332168 | 8/2010 |
| CA | 132619 | 6/2010 |
| CN | ZL200830139486.2 | 10/2009 |
| CN | ZL200830139492.8 | 10/2009 |
| CN | ZL200830139487.7 | 11/2009 |
| CN | ZL200830139489.6 | 11/2009 |
| CN | ZL200830139490.9 | 11/2009 |
| CN | ZL200830139491.3 | 11/2009 |
| CN | ZL200830139488.1 | 2/2010 |
| EC | 000968607-0001 | 7/2008 |
| EC | 000968607-0002 | 7/2008 |
| EC | 000968607-0003 | 7/2008 |
| EC | 000968607-0004 | 7/2008 |
| EC | 000968607-0005 | 7/2008 |
| EC | 000968607-0006 | 7/2008 |
| EC | 000968607-0007 | 7/2008 |
| EC | 000968607-0008 | 7/2008 |
| EC | 000968607-0009 | 7/2008 |
| EC | 000968607-0010 | 7/2008 |
| EC | 000968607-0011 | 7/2008 |
| EC | 001173330-0001 | 10/2009 |
| EC | 001173330-0002 | 10/2009 |
| EC | 001173330-0003 | 10/2009 |
| EP | 0577433 | 1/1994 |
| IN | 216979 | 6/2009 |
| IN | 216981 | 7/2009 |
| IN | 216983 | 7/2009 |
| IN | 216984 | 7/2009 |
| IN | 216985 | 7/2009 |
| IN | 216982 | 8/2009 |
| MX | 27994 | 4/2009 |
| MX | 27995 | 4/2009 |
| MX | 27996 | 4/2009 |
| MX | 27997 | 4/2009 |
| MX | 29091 | 8/2009 |
| MX | 29092 | 8/2009 |
| SG | D2009/924 H | 10/2009 |
| SG | D2009/925/D | 10/2009 |
| SG | D2009/926/J | 10/2009 |
| WO | 9948305 | 9/1999 |
| WO | 0101533 A1 | 1/2001 |
| WO | 0101534 A1 | 1/2001 |
| WO | 02052866 A2 | 7/2002 |
| WO | 2009089008 A2 | 7/2009 |
| WO | 2009089306 A1 | 7/2009 |
| WO | 2009089307 A2 | 7/2009 |
| WO | 2009143193 A2 | 11/2009 |
| WO | 2009089307 A3 | 12/2009 |

OTHER PUBLICATIONS

"International Search Report" and "Written Opinion of the International Search Authority" (Korean Intellectual Property Office) in Chatsworth Products, Inc. et al., International Patent Application Serial No. PCT/US2009/044577, dated Jan. 12, 2010, 7 pages.

"International Search Report" and "Written Opinion of the International Search Authority" (Korean Intellectual Property Office) in Chatsworth Products, Inc. et al., International Patent Application Serial No. PCT/US2009/030369, dated Oct. 12, 2009, 9 pages.

Information Disclosure Statement (IDS) Letter Regarding Common Patent Application(s), dated Apr. 21, 2010.

* cited by examiner

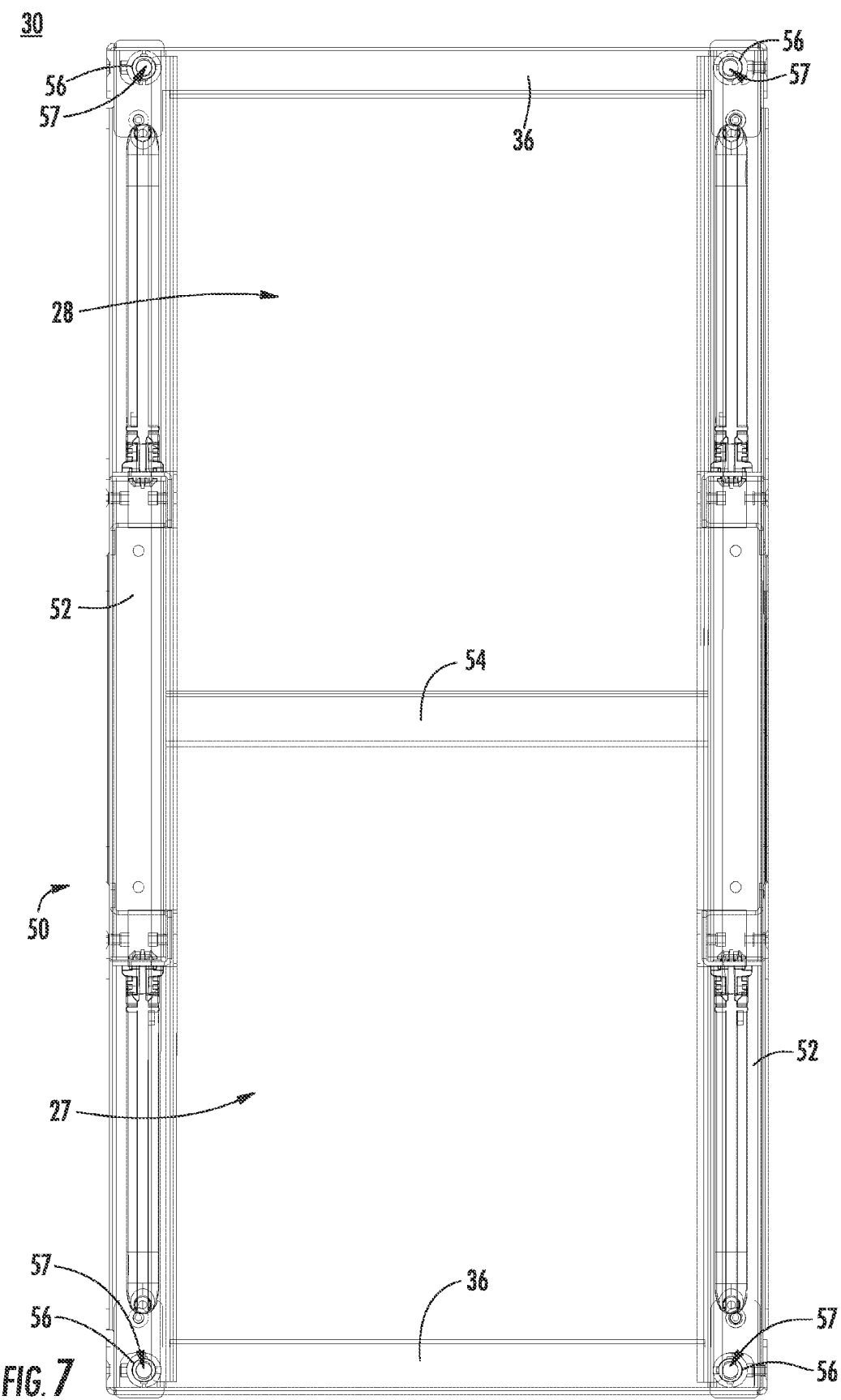

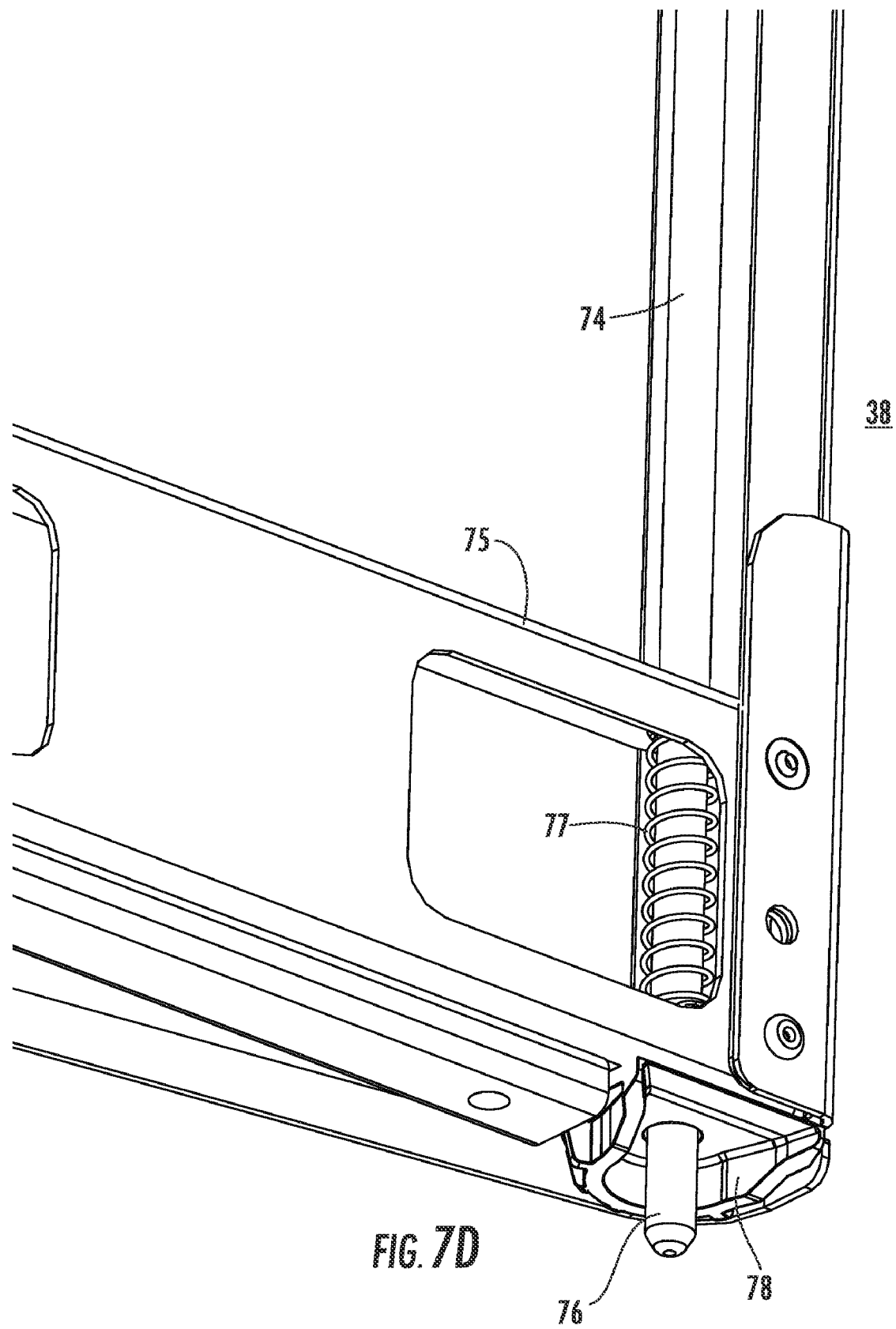

CABLE MANAGEMENT ACCESSORIES

CROSS-REFERENCE TO RELATED APPLICATIONS

The present application is a U.S. continuation patent application of, and claims priority under 35 U.S.C. §120 to, U.S. nonprovisional patent application Ser. No. 12/350,216, filed on Jan. 7, 2009 and published as US 2009/0236117 A1, which '216 application is a U.S. nonprovisional patent application of, and claims priority under 35 U.S.C. §119(e) to each of the following;

U.S. Patent Application No. 61/019,599 to Garza, filed Jan. 7, 2008;
U.S. Patent Application No. 61/019,592 to Hathcock, filed Jan. 7, 2008;
U.S. Patent Application No. 61/020,741 to Hathcock, Jan. 13, 2008;
U.S. Patent Application No. 61/020,745 to Garza, filed Jan. 14, 2008; and
U.S. Patent Application No. 61/095,308 to Donowho, filed Sep. 8, 2008.

Each of the foregoing U.S. patent applications and patent application publications is incorporated by reference herein.

The entirety of each of the following commonly-assigned patent applications is incorporated by reference herein:

U.S. Design Pat. application No. 29/299,950 to Alaniz et al., filed Jan. 7, 2008;
U.S. Design Pat. application No. 29/302,236 to Donowho et al., filed Jan. 14, 2008;
U.S. Design Pat. application No. 29/302,304 to Donowho et al., filed Jan. 14, 2008;
U.S. Design Pat. application No. 29/302,305 to Lawrence et al., filed Jan. 14, 2008;
U.S. Design Pat. application No. 29/302,309 to Lewis II et al., filed Jan. 14, 2008; and
U.S. Patent Application No. 61/019,596 to Donowho et al., filed Jan. 7, 2008.

COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE PRESENT INVENTION

Field of the Present Invention

The present invention relates generally to cable management systems for telecommunications cables, and, in particular, to vertical cable managers having adjustable internal components for better cable management.

BACKGROUND

Racks, frames, cabinets and the like for supporting computer and other electronic equipment are very well known. Similarly, raceways for routing cables and wires to and from that equipment are likewise well known. In particular, a number of raceways have been proposed for routing cables, wires and the like (generally referred to hereinafter as "cables") vertically through or adjacent to equipment racks, frames, cabinets and the like (generally referred to hereinafter as "mounting fixtures"). Such raceways may be used to route cables vertically to equipment mounted or otherwise supported on a mounting fixture from other equipment on the mounting fixture, from an overhead or underfloor raceway, or the like. These cables are generally routed in the vertical direction to a point adjacent to the desired equipment and then routed in the horizontal direction to the desired equipment.

An important characteristic of such raceways is the presence of a plurality of openings in the sides of the raceway through which cables may be routed, thereby facilitating more convenient access between the equipment and the interior of the raceway. For example, U.S. Pat. No. 2,921,607 to Caveney, U.S. Pat. No. 3,705,949 to Weiss, commonly-assigned U.S. Pat. No. 7,119,282 to Krietzman et al., and U.S. Pat. No. 7,285,027 to McGrath et al. each disclose a covered wiring duct or wireway which includes side walls having a series of finger-like projections separated by openings. The cables may be routed through the openings by bending them around the projections, thus allowing the cables to be routed with relative precision, and preventing cables from hanging loosely across the face of the rack itself. A gap at the distal ends of each pair of adjacent projections permits cables to be inserted into each respective opening. The gap is narrower than the opening, thus aiding in the retention of the cables within the opening. The distal ends of all the projections may then be covered by a cover, thus providing further retention capability.

It is often advantageous to provide a cable raceway having a front portion and a rear portion, wherein two separate channels are established. In such raceways, the separate channels are commonly established by a partition or "midsection," often with passthrough openings therein. Known products utilize a fixed midsection that is attached to the vertical side rails in one position only. The fixed midsection provides strength and rigidity to the total structure. One downside of a fixed midsection is that it reduces cable capacity. Furthermore, installers find it difficult to position cables front-to-back, and lashing bars and spools are not flexibly available. For example, U.S. Pat. No. 7,220,150 to Follingstad et al. discloses the use of spools, but the positions of the spools are relatively fixed.

Thus, a need exists for a rigid vertical cable manager that facilitates a moveable midsection. The structure must be designed in a way to be free standing and/or fixed to a rack with or without moveable midsections between the vertical side rails. Thus, the structure must be rigid and structurally sound to prevent any movement (flexure of the structure). A need further exists for the moveable midsections to be mounted between the vertical side rails in multiple vertical locations and a plurality of positions front to back in order to provide greater passthrough cable capacity and increased cable management. Still further, a need exists for additional options and flexibility in the use of lashing bars and spools with the partition or midsection(s).

Improvement is also needed in the area of cable management features within the vertical cable manager. Conventional tie-down features included such devices as bridge lances or punched slots in the sheet metal comprising the rear "wall" of the cable management space. The use of such features required a more tedious "threading" of Velcro ties. Furthermore, previous methods almost uniformly required that Velcro tie wraps be threaded through bridge lances or through punched slots in sheet metal, often requiring access to both the front and the rear of the manager. Thus, a need exists for improved cable management features within the vertical cable manager.

SUMMARY OF THE PRESENT INVENTION

The present invention according to a first aspect is a vertical cable manager, including a first column assembly; a second column assembly, parallel to but spaced apart from the first column assembly; a top frame connecting a top end of the first column assembly to a top end of the second column assembly; and a base connecting a bottom end of the first column assembly to a bottom end of the second column assembly; wherein the top frame and the base are structurally sufficient to support the second column assembly, relative to the first column assembly, without further structural support members.

In a feature of this aspect, a door, providing substantially no additional structural support to the second column assembly relative to the first column assembly, is hingedly coupled to, and supported by, the top frame and the base.

In a further feature of this aspect, a removable midsection member, providing substantially no additional structural support to the second column assembly relative to the first column assembly, is coupled to, and supported by, the first and second column assemblies. In still further features, the removable midsection member, the column assemblies, the top frame and the base define a wiring channel; and the removable midsection member, the column assemblies, the top frame and the base define at least two wiring channels, each having a top, a bottom, a front, a rear and two sides, the column assemblies being disposed on the respective sides of the wiring channels.

In a further feature of this aspect, the first and second column assemblies each include a respective side panel, wherein the side panel of the first column assembly includes a first set of mounting features each adapted to support a first end of removable midsection member, the second column assembly includes a second set of mounting features each adapted to support a second end of the removable midsection member, and the mounting features of the first set are aligned with the mounting features of the second set such that the removable midsection member may be supported at any of various locations in the vertical cable manager.

In still further features of this aspect, the base is adapted to rest on, and be supported by, a floor in a room; and the base is adapted to support the column assemblies and top frame in a freestanding state.

The present invention according to a second aspect is a vertical cable manager, including a first column assembly; a second column assembly, parallel to but spaced apart from the first column assembly; a top frame connecting a top end of the first column assembly to a top end of the second column assembly; and a base, adapted to rest on, and be supported by, a floor in a room, connecting a bottom end of the first column assembly to a bottom end of the second column assembly; wherein the column assemblies, the top frame and the base define at least one wiring channel having a top, a bottom, a front, a rear and two sides, the column assemblies being disposed on the respective sides of the wiring channel; and wherein no solid transverse wall extends between the two sides of the wiring channel.

In a feature of this aspect a door, providing substantially no additional structural support to the second column assembly relative to the first column assembly, is hingedly coupled to, and supported by, the top frame and the base.

In further features of this aspect, a removable midsection member, providing substantially no additional structural support to the second column assembly relative to the first column assembly, is coupled to, and supported by, the first and second column assemblies; the removable midsection member further defines the wiring channel; and the removable midsection member, the column assemblies, the top frame and the base define at least two wiring channels, each having a top, a bottom, a front, a rear and two sides, the column assemblies being disposed on the respective sides of the wiring channels.

In a further feature of this aspect, the first and second column assemblies each include a respective side panel, wherein the side panel of the first column assembly includes a first set of mounting features each adapted to support a first end of removable midsection member, the second column assembly includes a second set of mounting features each adapted to support a second end of the removable midsection member, and the mounting features of the first set are aligned with the mounting features of the second set such that the removable midsection member may be supported at any of various locations in the vertical cable manager.

In a further feature of this aspect, the base is adapted to support the column assemblies and top frame in a freestanding state.

The present invention according to a third aspect is a vertical cable manager, including a first column assembly; a second column assembly, parallel to but spaced apart from the first column assembly; a top frame, having a first side assembly having an end projecting forwardly or rearwardly from a top of the first column assembly, a second side assembly having an end projecting forwardly or rearwardly, in similar manner to the first side assembly, from a top of the second column assembly, and a single cross member connecting the first side assembly to the second side assembly; and a base connecting a bottom end of the first column assembly to a bottom end of the second column assembly; wherein an open space is defined beneath the single cross member of the top frame to the bottoms of the first and second column assemblies.

In a feature of this aspect, a door, providing substantially no additional structural support to the second column assembly relative to the first column assembly, is hingedly coupled to, and supported by, the top frame and the base.

In further features of this aspect, a removable midsection member, providing substantially no additional structural support to the second column assembly relative to the first column assembly, is coupled to, and supported by, the first and second column assemblies; the removable midsection member, the column assemblies, the top frame and the base define a wiring channel; and the removable midsection member, the column assemblies, the top frame and the base define at least two wiring channels, each having a top, a bottom, a front, a rear and two sides, the column assemblies being disposed on the respective sides of the wiring channels.

In a further feature of this aspect, the first and second column assemblies each include a respective side panel, wherein the side panel of the first column assembly includes a first set of mounting features each adapted to support a first end of removable midsection member, the second column assembly includes a second set of mounting features each adapted to support a second end of the removable midsection member, and the mounting features of the first set are aligned with the mounting features of the second set such that the removable midsection member may be supported at any of various locations in the vertical cable manager.

In further features of this aspect, the base is adapted to rest on, and be supported by, a floor in a room; and the base is adapted to support the column assemblies and top frame in a freestanding state.

The present invention according to a fourth aspect is a vertical cable manager, including a first column assembly; a second column assembly, parallel to but spaced apart from the first column assembly; a top frame connecting a top end of the first column assembly to a top end of the second column assembly; and a base connecting a bottom end of the first column assembly to a bottom end of the second column assembly; wherein at least one of the top frame and the base includes a member utilizing tubular construction to provide structural rigidity between the first and second column assemblies.

In a feature of this aspect, the top frame and the base each include a member utilizing tubular construction to provide structural rigidity between the first and second column assemblies.

In a further feature of this aspect, the top frame includes a cross member utilizing tubular construction to provide structural rigidity between the first and second column assemblies.

In further features of this aspect, the top frame has a first side assembly coupled to the top end of the first column assembly; a second side assembly coupled to the top end of the second column assembly; and a cross member, interconnecting the first and second side assemblies; and the first side assembly, second side assembly and cross member each utilize tubular construction to provide structural rigidity between the first and second column assemblies.

In further features of this aspect, the base has a rectangular frame that includes two side members and two cross members; the rectangular frame supports the vertical cable manager on a floor of a room; the two side members utilize tubular construction to provide structural rigidity between the first and second column assemblies; and the first and second side assemblies are each mounted on top of, and are supported by, a respective side member of the base.

In a further feature of this aspect, each of the first and second column assemblies has a first member, including a side panel, extending from a bottom of the column assembly to a top of the column assembly; and first and second brackets, formed separately from the first member but rigidly attached thereto, each including a portion, orthogonally disposed relative to the side panel, extending from the bottom of the column assembly to the top of the column assembly.

The present invention according to a fifth aspect is a vertical cable manager, including a first column assembly; a second column assembly, parallel to but spaced apart from the first column assembly; a top frame connecting a top end of the first column assembly to a top end of the second column assembly; and a base connecting a bottom end of the first column assembly to a bottom end of the second column assembly; wherein each of the first and second column assemblies has a first member, including a side panel, extending from a bottom of the column assembly to a top of the column assembly, and first and second brackets, formed separately from the first member but rigidly attached thereto, each including a portion, orthogonally disposed relative to the side panel, extending from the bottom of the column assembly to the top of the column assembly.

In a feature of this aspect, the first and second brackets are welded to the first member.

In a further feature of this aspect, each bracket includes at least two planar members that are orthogonally disposed relative to one another such a first planar member is orthogonally disposed relative to the side panel and a second planar member is parallel to, but spaced apart from, the side panel.

In further features of this aspect, the first member of each column assembly includes, first and second flanges, orthogonally disposed relative to the side panel, and wherein each of the first and second brackets is rigidly attached to a respective one of the first and second flanges; and a column of evenly-spaced mounting apertures are disposed along the first bracket and penetrate through both the bracket and the respective one of the first and second flanges.

In further features of this aspect, each column assembly includes a plurality of finger projections extending forwardly or rearwardly from the first brackets; and the finger projections are a part of a fingered cable guide mounted to a respective one of the first brackets.

In a further feature of this aspect, the side panel of the first column assembly includes a first column of mounting features each adapted to support a first end of removable midsection member, the second column assembly includes a second column of mounting features each adapted to support a second end of the removable midsection member, and the mounting features of the first column are aligned with the mounting features of the second column such that the removable midsection member may be supported at any of various heights in the vertical cable manager.

In a further feature of this aspect, side panel of the first column assembly includes a first row of mounting features each adapted to support a first end of removable midsection member, the second column assembly includes a second row of mounting features each adapted to support a second end of the removable midsection member, and the mounting features of the first row are aligned with the mounting features of the second row such that the removable midsection member may be supported at any of various depths in the vertical cable manager.

The present invention according to a sixth aspect is a vertical cable manager, including a pair of column assemblies, each having a generally planar portion with a plurality of mounting locations arranged in a plurality of columns, the mounting locations of one column assembly being aligned with the mounting locations of the other column assembly; and a removable midsection member connected between the column assemblies at the mounting locations; wherein the midsection member is adapted to be repositioned relative to the column assemblies.

In features of this aspect, the midsection member is repositionable to any of various heights by mounting at different mounting locations within a selected column; the midsection member is repositionable to any of various depths by mounting at mounting locations within different columns; and the midsection member is generally C-shaped in cross-section.

In further features of this aspect, the mounting locations are apertures; the midsection member includes static tabs at ends thereof for extending through the apertures of the planar portions; and the vertical cable manager includes a locking key attachable at an end of the midsection member and extendable through an aperture of the planar portion for providing stability to the midsection member.

In a further feature of this aspect, the midsection member includes two telescoping sections, one section being nested within the other, for permitting adjustment of the length of the midsection member.

In further features of this aspect, the midsection member includes one or more apertures for mounting accessories thereto; a large cable spool is mountable to the midsection member; a lashing bar assembly is mountable to the midsection member; and a sub-channel unit is mountable to the midsection member.

The present invention according to a seventh aspect is a vertical cable manager, including a pair of column assemblies, each having a generally planar portion with a plurality of mounting locations arranged in a plurality of columns, the mounting locations of one column assembly being aligned with the mounting locations of the other column assembly; and a removable, C-shaped midsection member connected between the column assemblies at the mounting locations, the midsection members including two telescoping sections, one section being nested within the other, for permitting adjustment of the length of the midsection member; wherein the midsection member is adapted to be repositioned relative to the column assemblies.

In features of this aspect, the midsection member is repositionable to any of various heights by mounting at different mounting locations within a selected column; or the midsection member is repositionable to any of various depths by mounting at mounting locations within different columns.

In further features of this aspect, the mounting locations are apertures; the midsection member includes static tabs at ends thereof for extending through the apertures of the planar portions; and/or the vertical cable manager includes locking key attachable at an end of the midsection member and extendable through an aperture of the planar portion for providing stability to the midsection member.

In further features of this aspect, the midsection member includes one or more apertures for mounting accessories thereto; each telescoping section includes one or more apertures that are alignable when the telescoping sections are adjusted relative to one another; a large cable spool is mountable to the midsection member; a lashing bar assembly is mountable to the midsection member; and/or a sub-channel unit is mountable to the midsection member.

The present invention according to an eight aspect is a removable midsection member for use in connection with a vertical cable manager, including two telescoping sections, one being nested within the other, for adjusting the length of the midsection member between a pair of column assemblies of the vertical cable manager; and static tabs at each end thereof for extending through mounting apertures arranged in general alignment with one another at the respective column assemblies; wherein the midsection member is adapted to be repositioned relative to the column assemblies to any of various heights or depths.

In features of this aspect, the telescoping sections are each generally C-shaped in cross-section; or the vertical cable manager further includes a locking key attachable at outermost ends of the telescoping sections and extendable through an aperture of the respective column assemblies for providing stability to the midsection member.

In further features of this aspect, each telescoping section includes one or more apertures that are alignable when the telescoping sections are adjusted relative to one another; a large cable spool is mountable to the telescoping sections; a lashing bar assembly is mountable to the telescoping sections; and/or a sub-channel unit is mountable to the telescoping sections.

The present invention according to a ninth aspect is a vertical cable manager, including a first column assembly; a second column assembly, parallel to but spaced apart from the first column assembly; and a plurality of midsection members, independent and spaced apart from one another, each having a first end coupled to the first column assembly and a second end coupled to the second column assembly.

In features of this aspect, the plurality of midsection members include at least three midsection members; or the midsection members of the plurality of midsection members are distributed along the height of the first and second column assemblies.

In a further feature of this aspect, the vertical cable manager includes least one cable management accessory that is coupled at one end to a first of the plurality of midsection members and at an opposing end to a second of the plurality of midsection members, the second midsection member being disposed beneath the first midsection member. In still further features a third midsection member is disposed between the first and second midsection members; no midsection member is disposed between the first and second midsection members; at least one cable management accessory includes a lashing bar; at least one cable management accessory includes a sub-channel unit having a cable spool coupled thereto; the cable spool includes a gate arm extending orthogonally from a shaft that couples to the sub-channel unit, at least the gate arm being rotationally repositionable relative to the sub-channel unit; and/or at least one cable management accessory is a first cable management accessory of a first type, the vertical cable manager further comprising a second cable management accessory, of a second type, that is coupled to the first of the plurality of midsection members.

In a further feature of this aspect, the vertical cable manager includes a first cable management accessory of a first type and a second cable management accessory of a second type. In still further features, the first cable management accessory is a cable spool and the second cable management accessory is a lashing bar; the first cable management accessory is a cable spool and the second cable management accessory is a sub-channel unit having a cable spool mounted thereon; the first cable management accessory is a cable spool of a first type and the second cable management accessory is a cable spool of a second type; and/or the first cable spool has a cylindrical shaft of a first diameter and the second cable spool has a cylindrical shaft of a second diameter.

In a further feature of this aspect, each midsection member is spaced apart from the next adjacent midsection member by a distance that is at least as great as the height of the midsection member.

In still further features of this aspect, the vertical cable manager includes a base connecting a bottom end of the first column assembly to a bottom end of the second column assembly; a top frame connecting a top end of the first column assembly to a top end of the second column assembly; and/or a door that is hingedly coupled to, and supported by, the top frame and the base.

In a further feature of this aspect, the vertical cable manager includes a top frame connecting a top end of the first column assembly to a top end of the second column assembly.

The present invention according to a tenth aspect is a vertical cable manager, including a first column assembly; a second column assembly, parallel to but spaced apart from the first column assembly; a midsection member having a first end coupled to the first column assembly and a second end coupled to the second column assembly; and a cable spool, having a gate arm extending orthogonally from a shaft that is coupled to the midsection member, wherein a portion of the cable spool, including at least the gate arm, is rotationally repositionable relative to the midsection member.

In features of this aspect, the gate arm and shaft are fixed relative to each other; the rotationally repositionable portion of the cable spool includes the gate arm and the shaft; and/or a longitudinal axis of the gate arm is orthogonal to a longitudinal axis of the shaft.

In further features of this aspect, the shaft is cylindrical; or the cable spool is a first cable spool, the vertical cable manager further including a second cable spool having a cylindrical shaft, a diameter of the first cable spool being substantially greater or less than a diameter of the second cable spool.

In still further features of this aspect, the gate arm extends in one direction, away from the shaft, for a distance that is substantially greater than the extension of the gate arm in any other direction away from the shaft; the rotationally repositionable portion of the cable spool is adapted to be removed from the midsection member and recoupled to the midsection member in an orientation that is rotated 90 degrees about a longitudinal axis of the shaft; the rotationally repositionable portion of the cable spool is adapted to be removed from the midsection member and recoupled to the midsection member in any of at least two other orientations that are rotated about a longitudinal axis of the shaft; and/or the rotationally repositionable portion of the cable spool is adapted to be removed from the midsection member and recoupled to the midsection member in any of three other orientations that are rotated about a longitudinal axis of the shaft.

The present invention according to an eleventh aspect is a lashing bar assembly for a vertical cable manager, including a base attachable to at least a pair of mounting members interconnected between side members, the base including a plurality of apertures; and a lashing bar, each end of which being mountable relative to one of the plurality apertures, thereby forming at least one loop for cable management.

In features of this aspect, the plurality of apertures are slotted openings; the base includes a mounting tab at each end thereof for attachment relative to the mounting members; the base extends across other mounting members without connecting thereto; the lashing bar creates a plurality of loops for cable management; the plurality of loops subdivides a vertical cable management space between the side members into two vertical channels; the lashing bar is installable relative to the base by squeezing the ends of the bar toward one another such that the ends of the bar may be fit into corresponding apertures; the base and the lashing bar are made of a metal material; and the lashing bar assembly includes plurality of lashing bars.

The present invention according to a twelfth aspect is a lashing bar assembly for a vertical cable manager, including a base attachable to at least a pair of mounting members interconnected between side members, the base including an edge portion having a plurality of recesses; and a lashing bar, each end of which being mountable relative to one of the plurality of recesses, the lashing bar thereby forming a loop for cable management.

In features of this aspect, the plurality of recesses are slotted recesses; the base includes a mounting tab at each end thereof for attachment relative to the mounting members; the base extends across other mounting members without connecting thereto; the lashing bar is installable relative to the base by squeezing the ends of the bar toward one another such that the ends of the bar may be fit into corresponding recesses; the base and the lashing bar are made of a metal material; the lashing bar assembly includes a plurality of lashing bars, each lashing bar forming a loop for cable management; and the plurality of lashing bars subdivides a vertical cable management space between the side members into two vertical channels.

The present invention according to a thirteenth aspect is a vertical cable manager, including a pair of side members; two or more midsection members connected between the pair of side members; and a lashing bar assembly connected between at least two midsection members, the lashing bar assembly including a base and a lashing bar mountable relative to the base, thereby forming at least one loop for cable management.

In features of this aspect, the lashing bar creates a plurality of loops for cable management; and the plurality of loops subdivides a vertical cable management space between the side members into two vertical channels.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, which are not necessarily to scale, wherein:

FIG. 7 is a top view of the vertical cable manager of FIG. 3;

FIG. 7D is a fragmentary rear orthogonal view of another portion of one of the doors of FIG. 2;

DETAILED DESCRIPTION OF THE PREFERRED EMBODIMENTS

Figure 1:
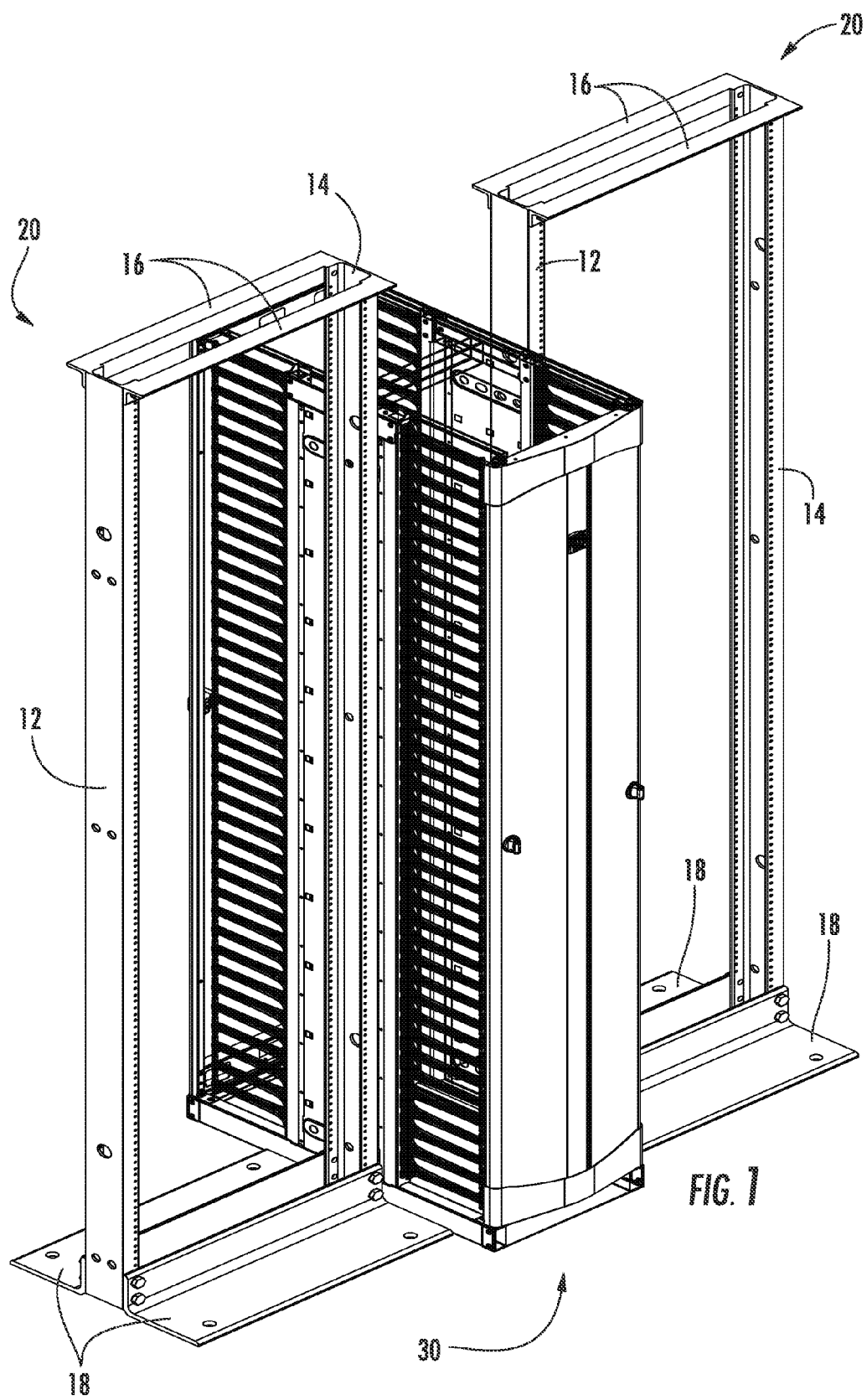
FIG. 1 is an isometric view of a mounting fixture system utilizing a vertical cable manager in accordance with a first preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

FIG. 1 is an isometric view of a mounting fixture system 10 utilizing a vertical cable manager 30 in accordance with a first preferred embodiment of the present invention. As shown, the system 10 includes two conventional two-post mounting racks 20, between which is disposed the vertical cable manager 30. Each two-post mounting rack 20 includes a pair of vertical support members 12,14, connected at their upper ends by a pair of upper cross-members 16 and at their lower ends by a pair of lower cross-members 18. The posts 12,14 are arranged to support a variety of electronic equipment, accessories and the like, all as is well known.

It will be apparent to the Ordinary Artisan that the arrangement illustrated in FIG. 1 may be a preferred implementation of one or more of the vertical cable managers described and illustrated herein. However, it will be appreciated that the vertical cable manager of the present invention may be utilized with a variety of mounting fixtures, for example including mounting fixtures formed from four support posts that may or may not be covered by panels to form an enclosure; and that mounting fixtures may be alternatively located on one or both sides of the cable manager 30, or alternatively may be used in isolation, as described below.

Figure 2:
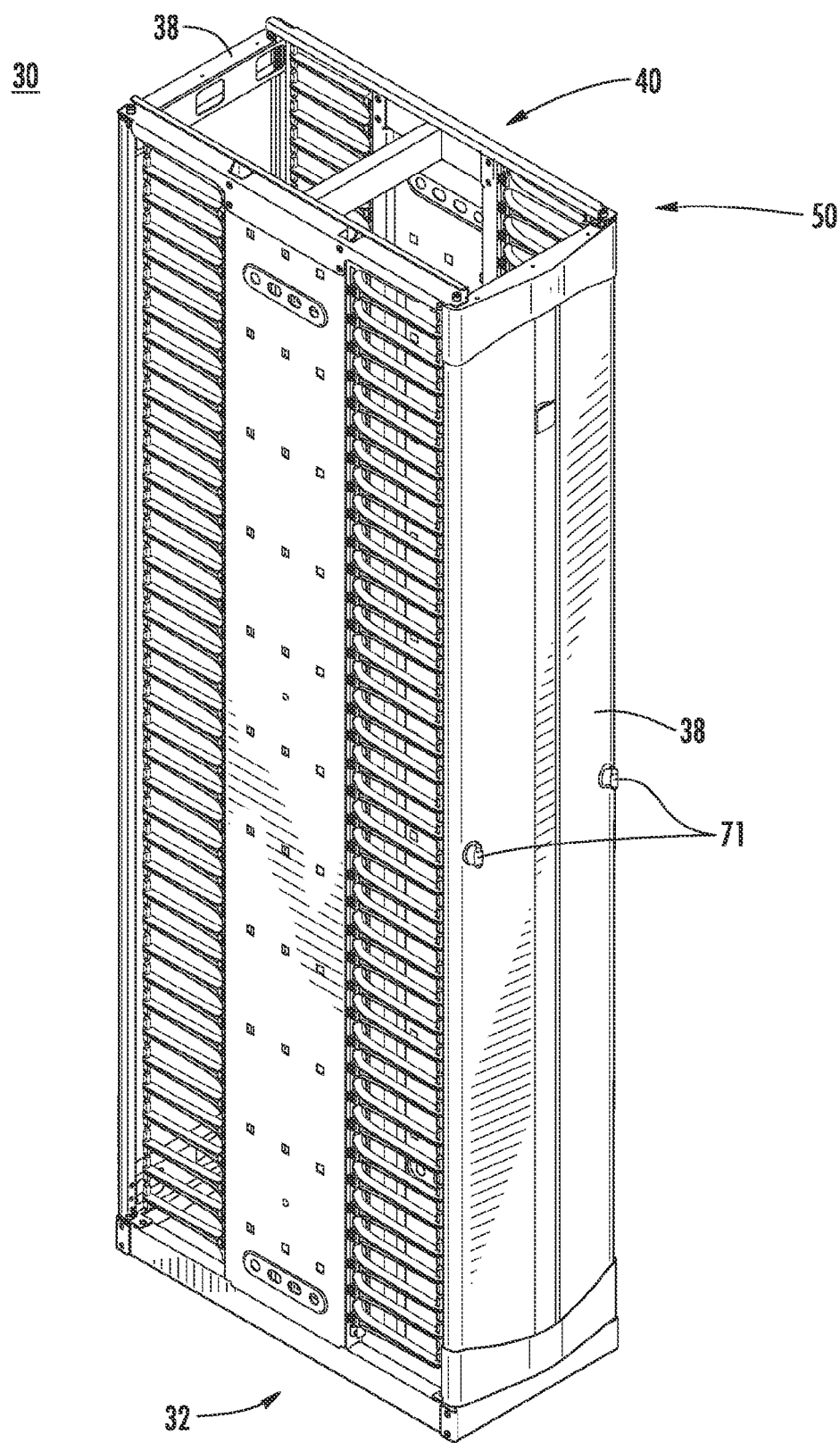
FIG. 2 is an isometric view of the vertical cable manager of FIG. 1, shown in isolation.

FIG. 2 is an isometric view of the vertical cable manager 30 of FIG. 1, shown in isolation. As shown therein, the vertical cable manager 30 includes a base 32, an interconnected double-spine assembly 40 topped by a top frame 50, and a pair of doors 38. The double-spine assembly 40 is supported by the base 32, thus avoiding the necessity of supporting the apparatus 30 on an adjoining mounting fixture. Each door 38 is removably coupled at each lower corner to the base 32 and at each upper corner to the top frame 50, thus permitting each door 38 to be opened or hinged along either of its lateral sides or removed entirely. Each of these components will be described in greater detail herein.

Figure 3:
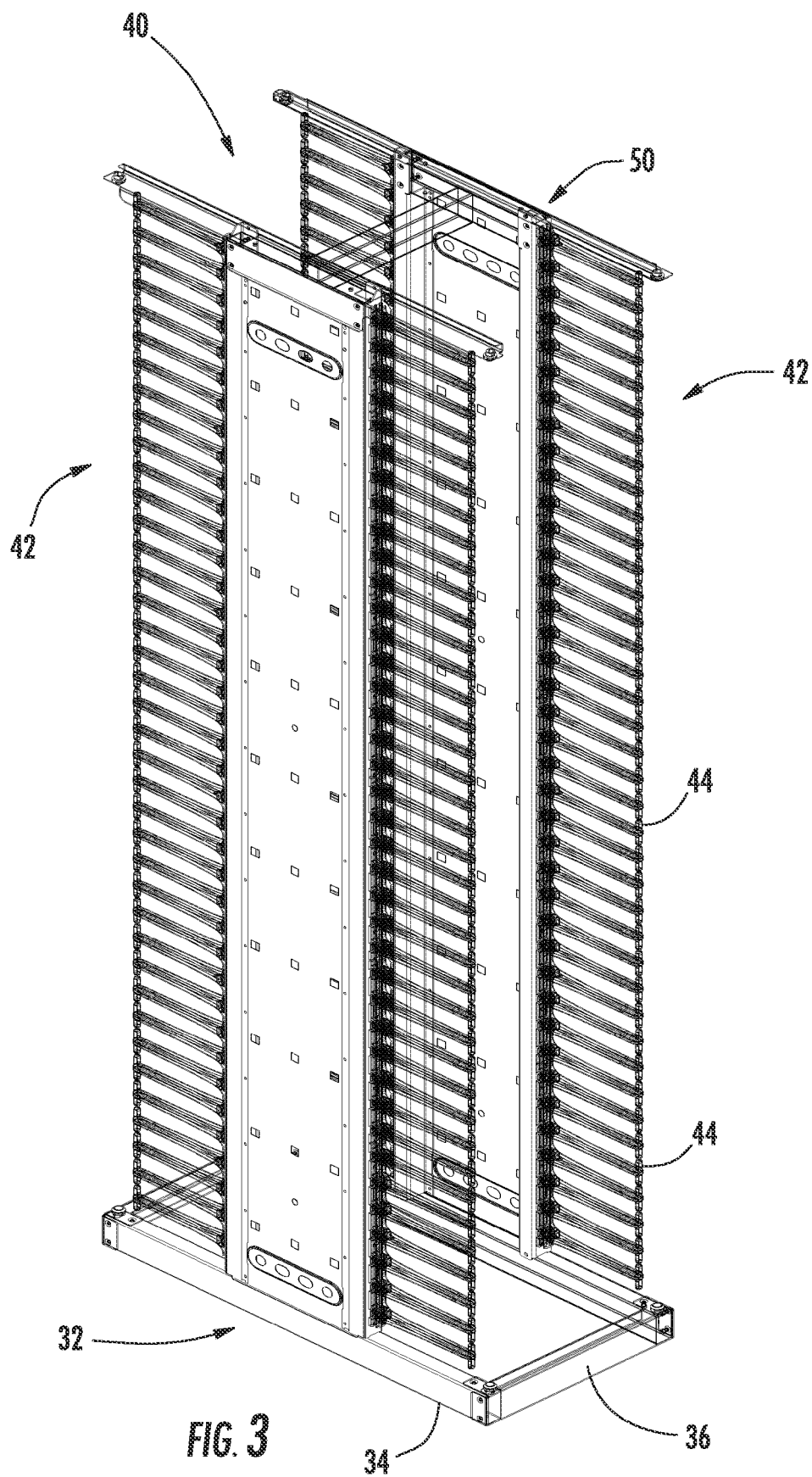
FIG. 3 is an isometric view of the vertical cable manager of FIG. 2, shown with the doors removed.
Figure 4:
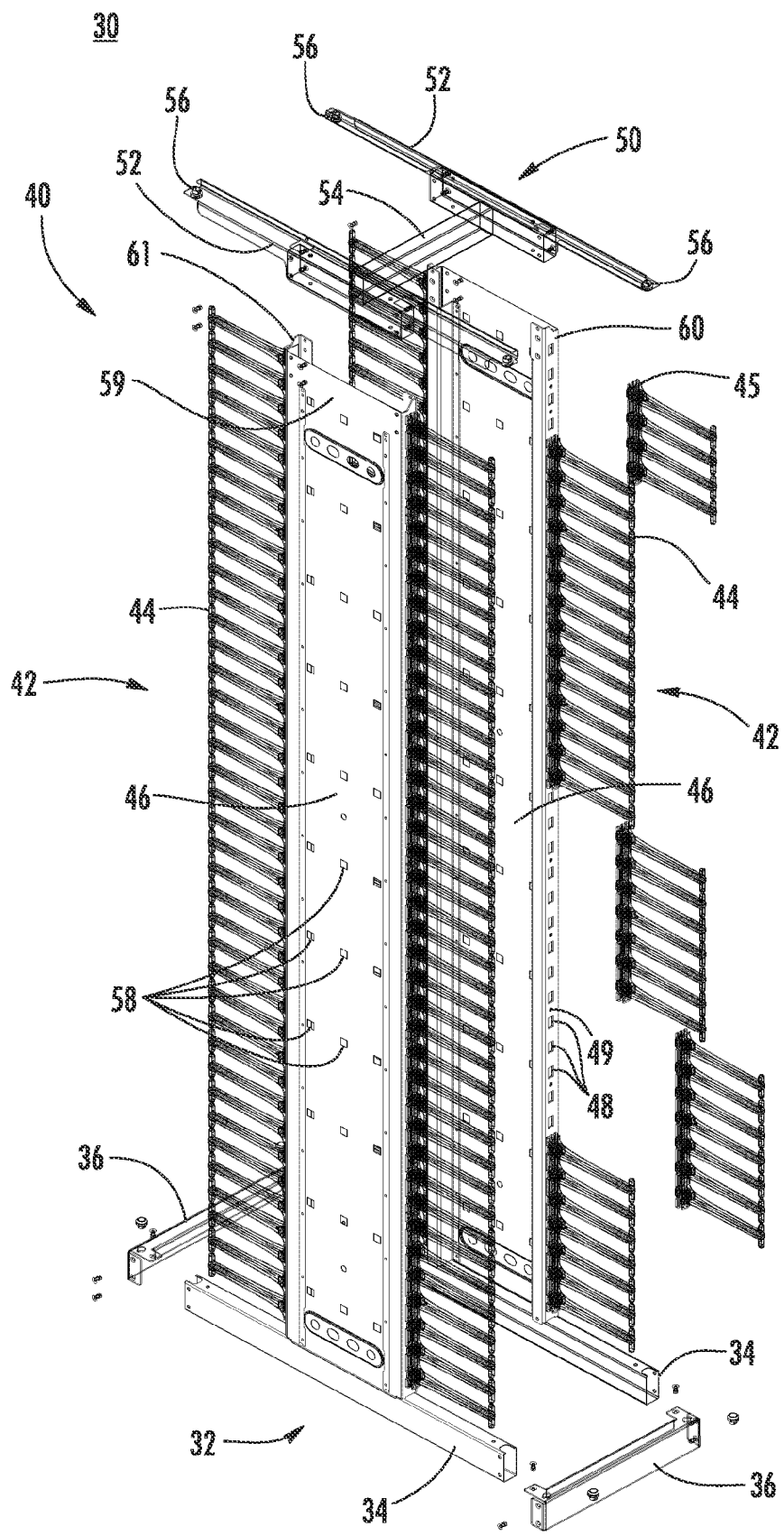
FIG. 4 is an exploded isometric view of the vertical cable manager of FIG. 3.
Figure 5:
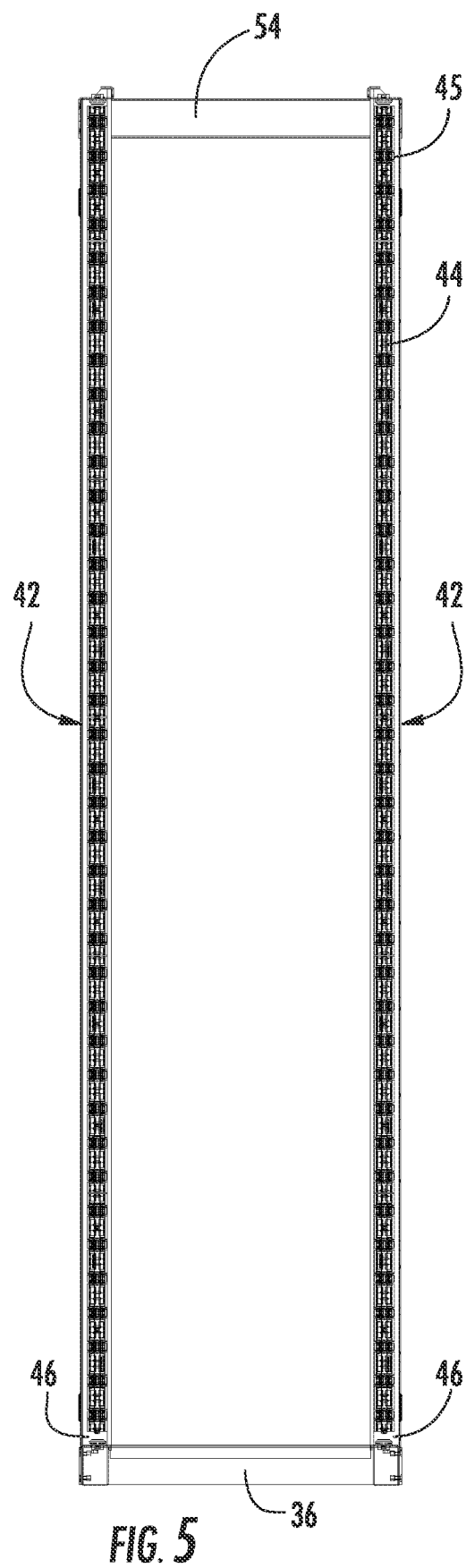
FIG. 5 is a front view of the vertical cable manager of FIG. 3.
Figure 6:
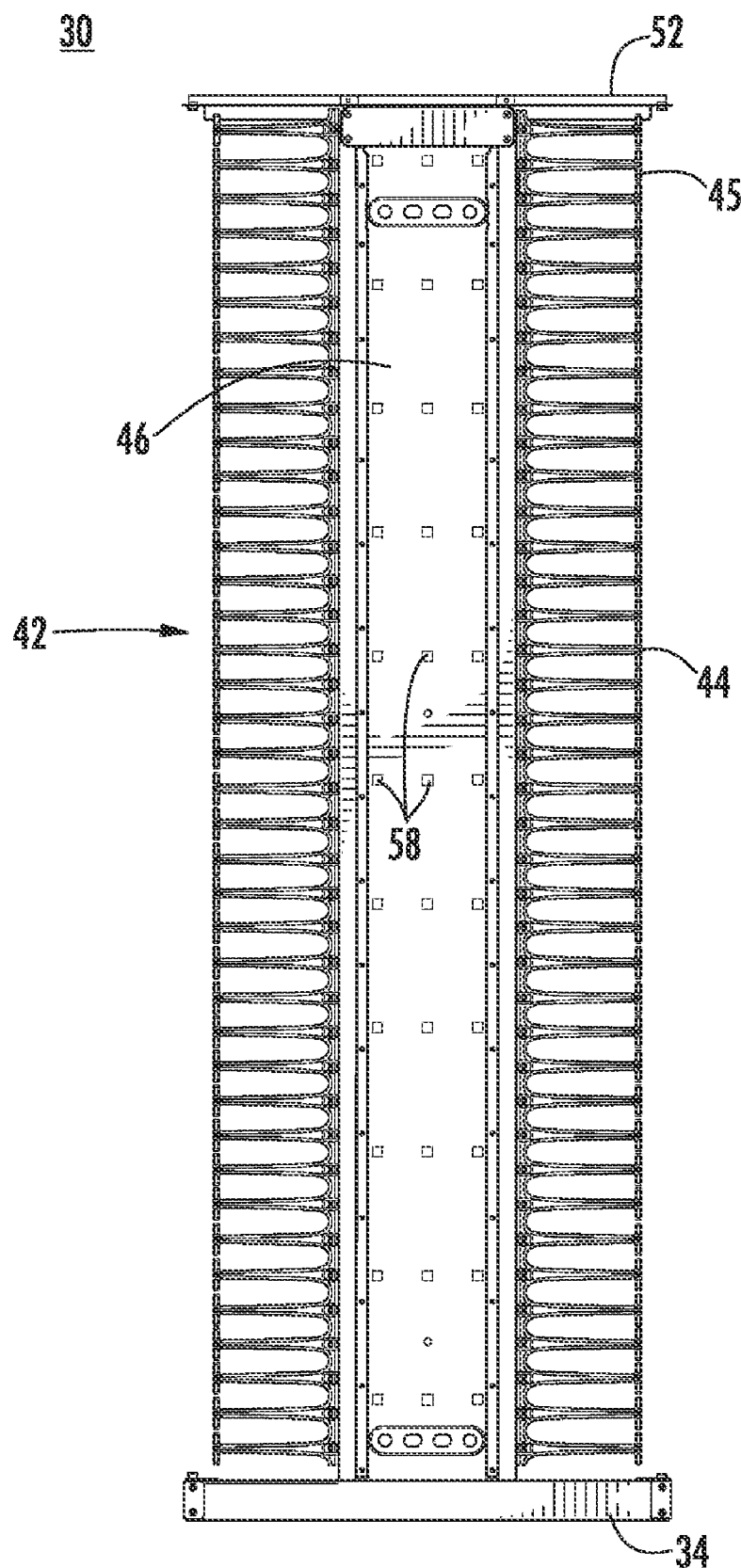
FIG. 6 is a side view of the vertical cable manager of FIG. 3.

FIGS. 3 and 4 are an isometric view and an exploded isometric view, respectively, of the vertical cable manager 30 of FIG. 2, shown with the doors 36 removed, and FIGS. 5-7 are a front, side and top view of the vertical cable manager 30 of FIG. 3. As perhaps best illustrated in FIG. 4, the base 32 comprises a frame that includes two side members 34 and two cross members 36, with the length of the side members 34 and the length of the cross members 36 defining the depth and width, respectively, of the vertical cable manager 30. In at least one embodiment, the side members 34 are rectangular tubes. In at least one embodiment, the side members 34 are formed from flat sheet metal. The base 32 serves both to support the interconnected double-spine assembly 40 and to support the doors 38, but these functions may be separated, for example through the use of separate components for each function. The base frame members 34,36 are interconnected using any appropriate connection means, including fasteners as shown in FIG. 4. In at least one embodiment, the cross members 36 are riveted to the side members 34.

The interconnected double-spine assembly 40 includes two spine assemblies 42, each having a plurality of ribbed or fingered cable guides 44,45 extending forwardly and a plurality of ribbed or fingered cable guides 44,45 extending rearwardly from a vertical support column 46. The spine assemblies 42 are interconnected at their lower ends by the base 32 and at their upper ends by the top frame 50. In at least one embodiment, the spine assemblies 42 are welded to the side members 34 of the base 32. In at least one embodiment, each support column 46 is comprised of two brackets 60,61 that are resistance welded to a flat panel 59 to form a unit having a C-shaped cross-section perhaps best seen in FIG. 4. The combination of the brackets 60,61, lateral portion 59 and the tubes of the base side members 34 provides tensional resistance when the manager is under load. In at least one other embodiment, each support column 46 may be formed from a C-shaped section of metal, producing a lateral portion 59, a front bracket 60 and a rear bracket 61. Penetrating each of the front and rear brackets 60,61 are a series of preferably evenly-spaced square apertures 48 and a number of small round apertures 49 interspersed therebetween. The front and rear brackets 60,61 and the apertures 48,49 penetrating therethrough are arranged for specific purposes, at least some of which will be described below, but it will be appreciated that these same purposes may be accomplished using spine assemblies whose design and construction differs from that described herein, all without departing from the scope of the present invention.

Figure 18:
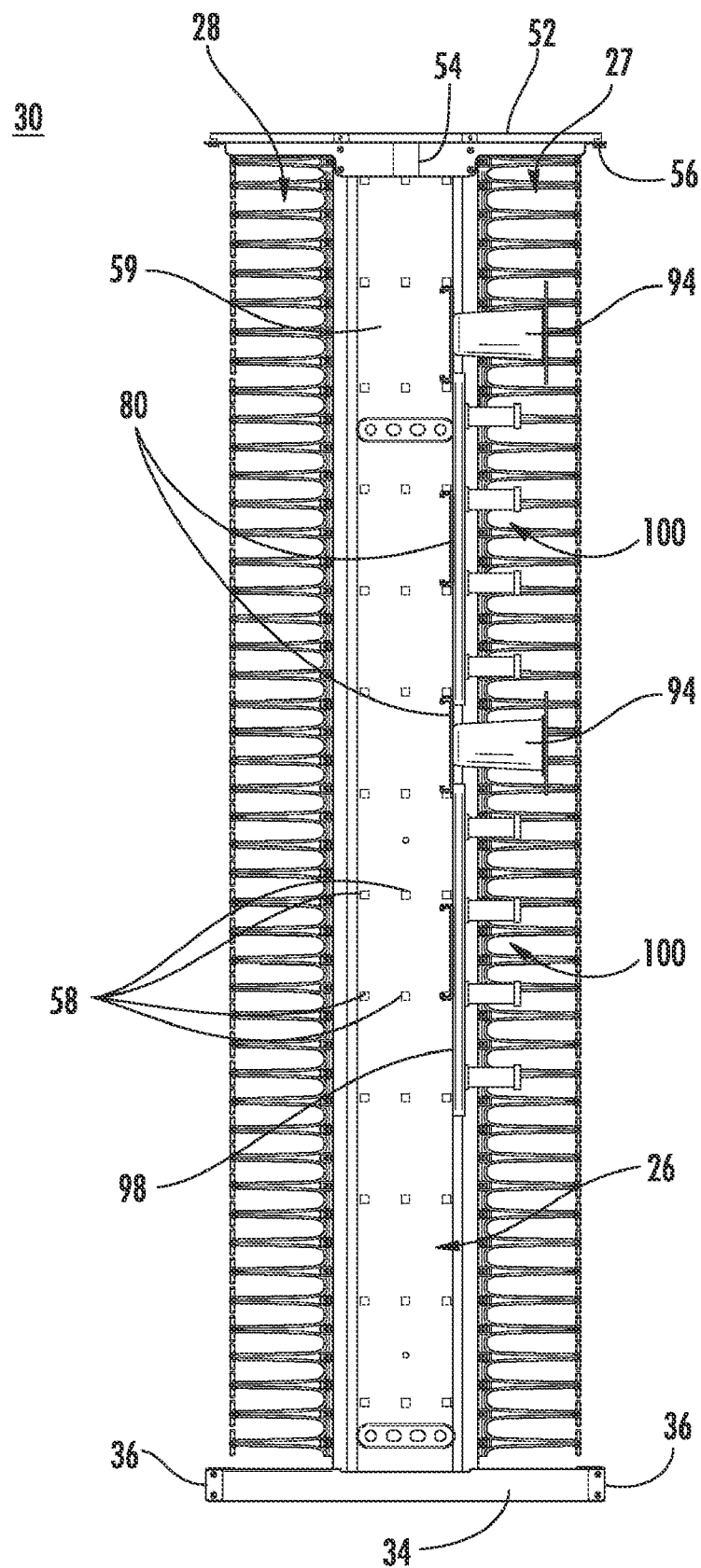
FIG. 18 is a side cross-sectional view of the vertical cable manager of FIG. 13.
Figure 19:
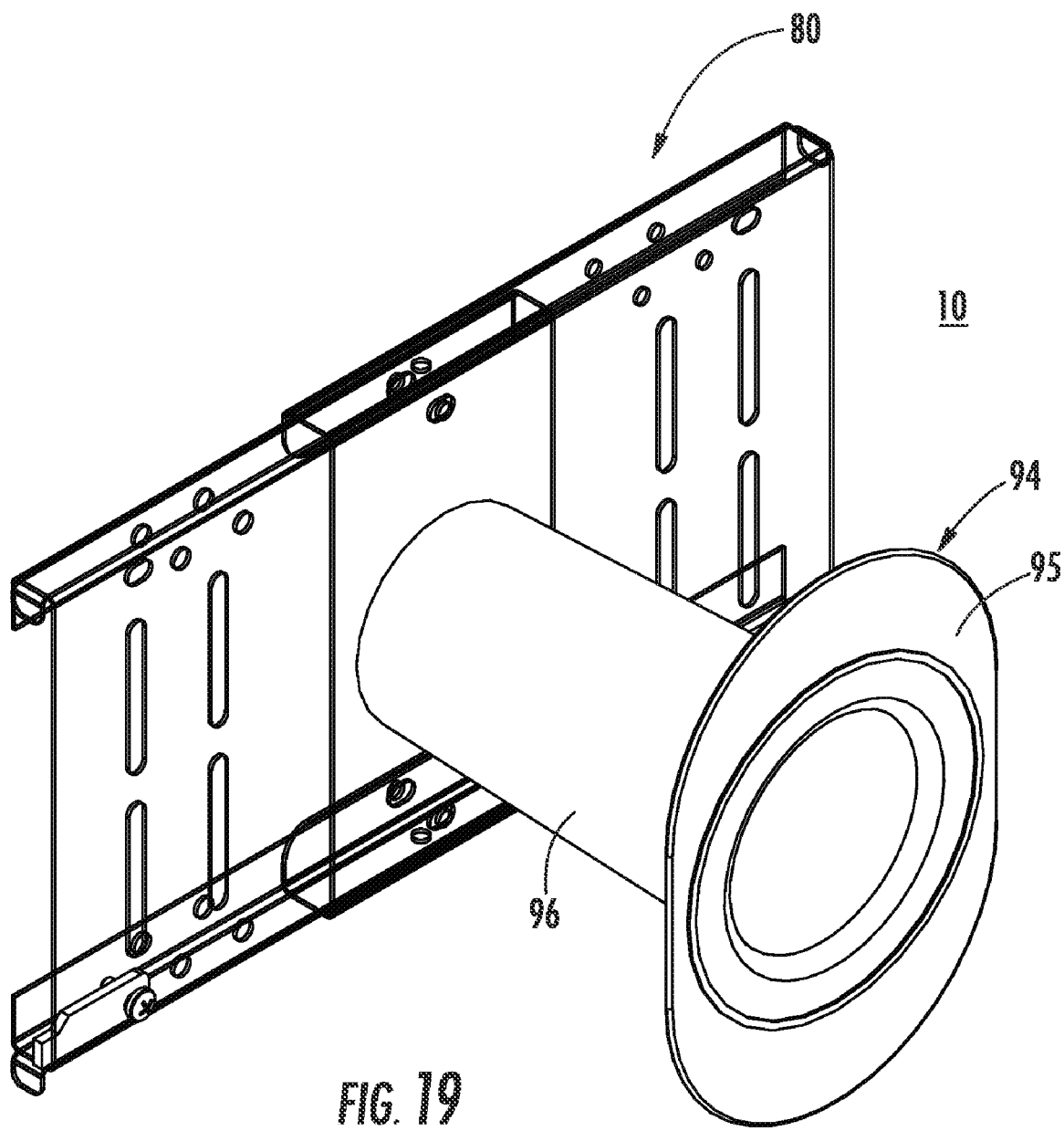
FIG. 19 is an isometric view of one of the large cable spools of FIG. 13 shown in relation to the midsection member of FIG. 9.
Figure 20:
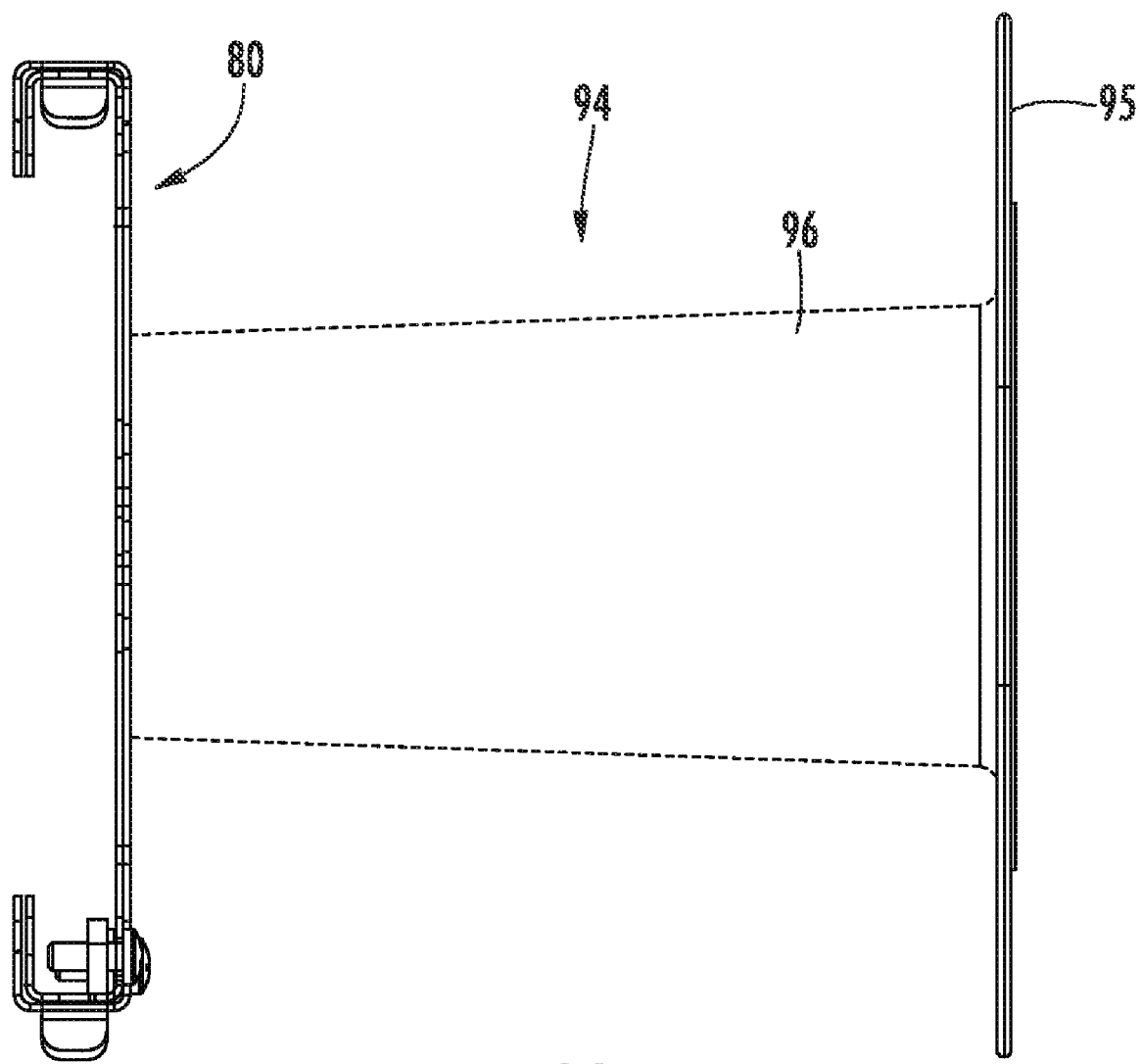
FIG. 20 is a left side view of the large cable spool and midsection member of FIG. 19.
Figure 21:
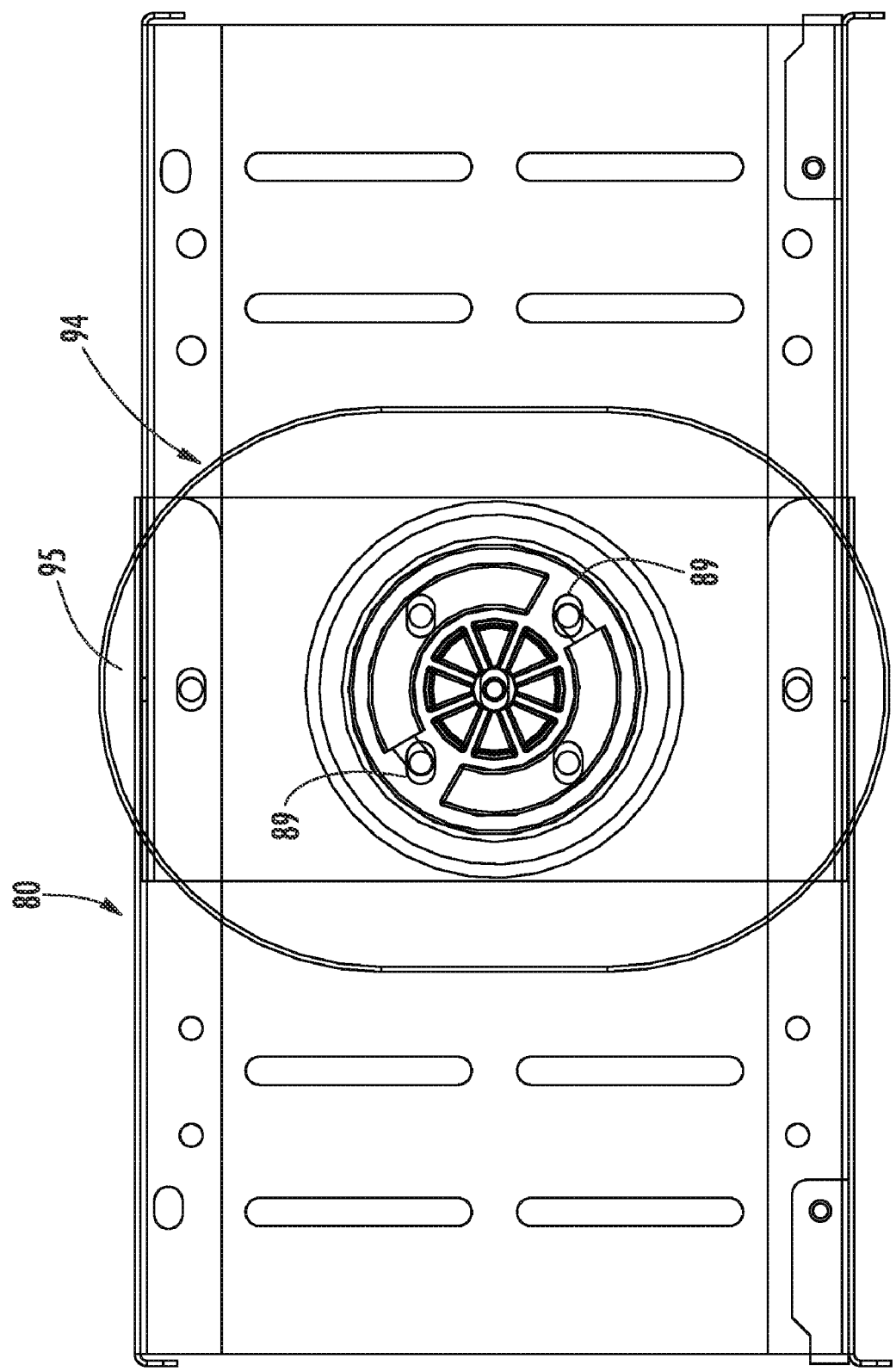
FIG. 21 is a rear view of the large cable spool and midsection member of FIG. 19.
Figure 22:
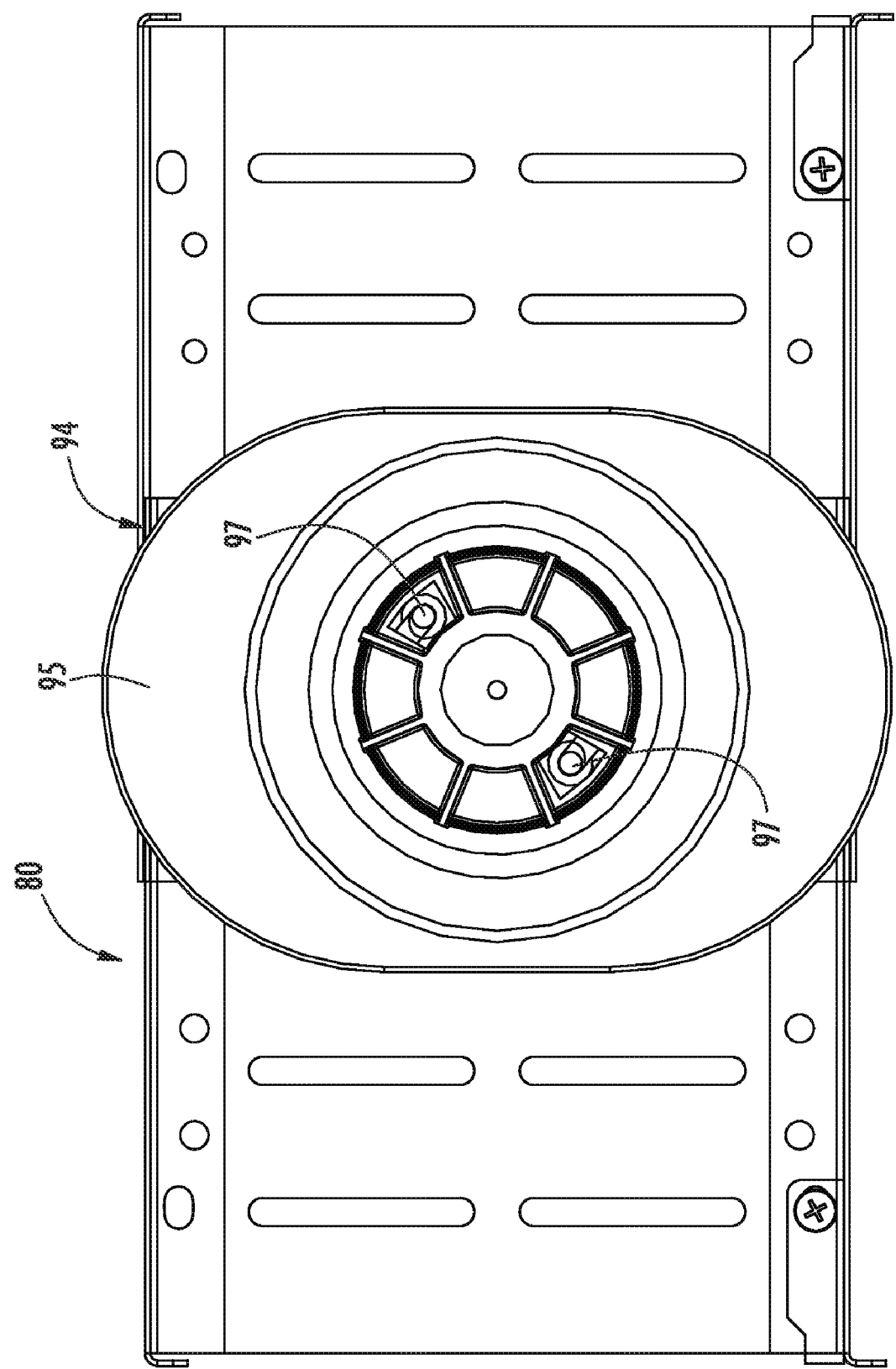
FIG. 22 is a front view of the large cable spool and midsection member of FIG. 19.

The top frame 50 includes two side assemblies 52 and a cross member 54. As perhaps best seen in FIG. 18, the cross member 54 is a rectangular tube that is welded to the side assemblies 52. The tube provides tensional resistance when the cable manager 30 is under load. Although in at least one embodiment the side assemblies 52 and cross member 54 are three separate components, it will be appreciated that the side assemblies 52 and cross member 54 could instead be reduced to a single component with the same results obtained thereby.

Each side assembly 52 includes a portion for mounting to the top of a respective support column 46 and a horizontal rail. A hinge/latch interface 56, including a hinge pin socket 57, is disposed at each of the distal ends of the horizontal rails, thereby providing hinge and latch functions for each lateral side of each door 38 as further described hereinbelow. The cross member 54 stabilizes the upper ends of the spine assemblies 42, fixing the distance therebetween. Optionally, additional interconnection between the spine assemblies 42 may be provided by midsection members 80, described hereinbelow.

Figure 7A:
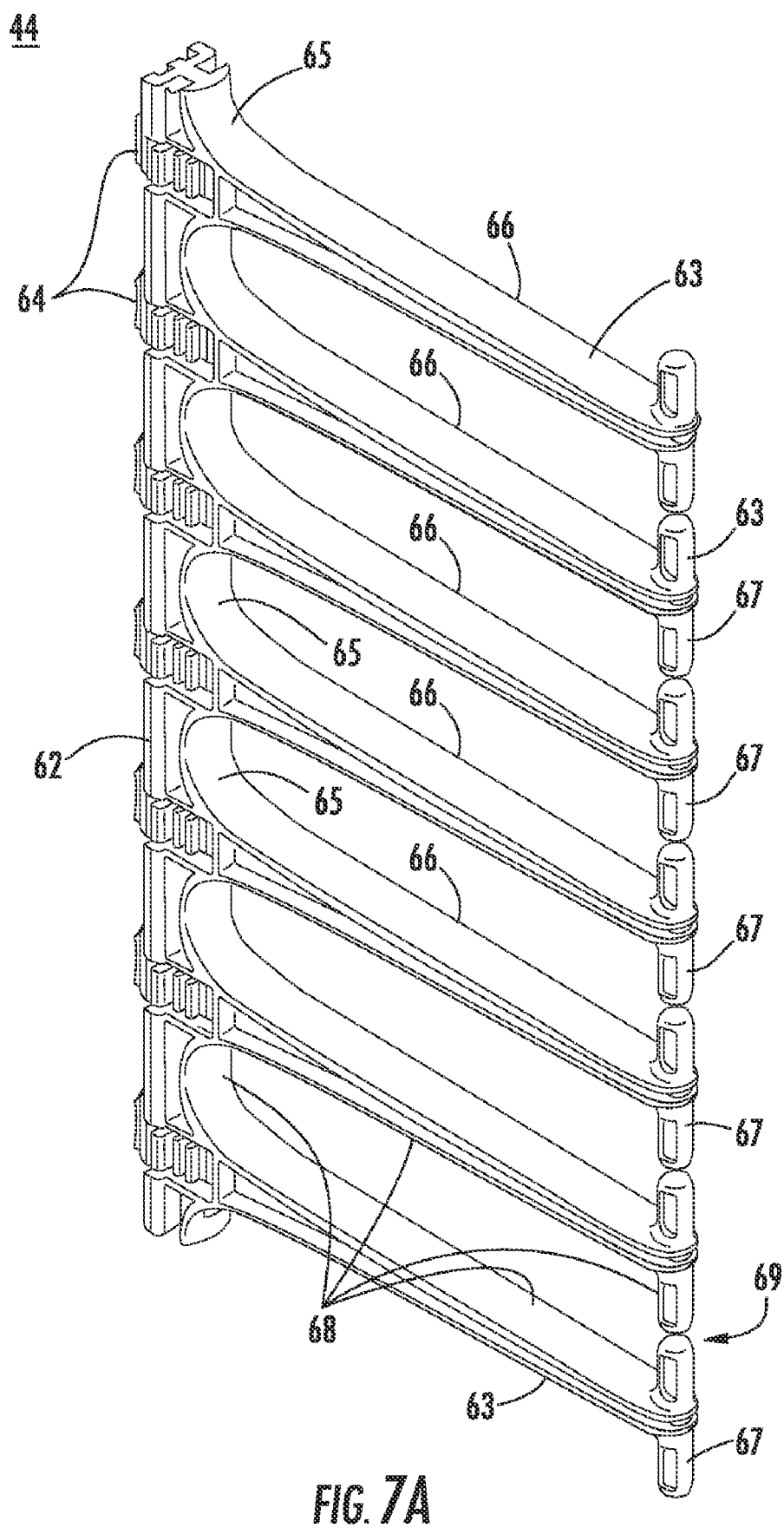
FIG. 7A is an isometric view of one of the cable guides of FIG. 4.

FIG. 7A is an isometric view of one of the cable guides 44 of FIG. 4. The fingered cable guides 44,45, which may be of different lengths, each include a linear projection support bracket 62 and a plurality of T-shaped projections 63 extending therefrom. Evenly-spaced snap fasteners 64 extend from the projection support brackets 62 in the opposite direction from the T-shaped projections 63 for mating with the rectangular apertures 48 in the front and rear brackets 60,61 of the support column 46.

The cable guide 44,45 may be mounted on a front or rear bracket 60,61 of the support column 46 by aligning the snap fasteners 64 with the rectangular apertures 48 in the support column 46 and then pressing the fasteners 64 through the apertures 48. As the fasteners 64 are inserted, one or more preferably-beveled portion of each fastener 64 may make contact with the support column 46, thus urging the deflection thereof, until the fasteners 64 are inserted a sufficient distance and "snap" into place, thereby retaining the guide 44,45 and preventing its removal. Each cable guide 44,45 may be further secured to the respective support column 46 by inserting fasteners (not shown) through the small round apertures 49 in the support column 46.

Each T-shaped projection 63 includes a reinforced base 65, a shaft 66 and a crosspiece 67. Each pair of adjacent T-shaped projections 63 defines a cable ring 68 formed by the respective bases 65, shafts 66 and crosspieces 67 of the projections 63 and the body of the projection support bracket 62. An opening into each cable ring 68 is provided by a gap 69 between the ends of the crosspieces 67 of each pair of adjacent projections 63. This gap 69 permits cables to be inserted into the ring 68 by passing them sideways through the gap 69, as described further in the aforementioned U.S. Pat. No. 7,119,282, the entirety of which is incorporated herein by reference.

The respective projections 63 are evenly spaced along the length of the cable guide 44,45 at a standardized spacing. In the embodiment shown and described, the spacing between the respective projections 63 is equal to a single standard rack mounting unit ("RMU"), but it should be obvious that other standard spacings could be used such as spacings measured in alternative units or spacings which are multiples of the RMU. By using such a standard spacing, it is ensured that a cable ring 68 is disposed at, and dedicated to, each RMU along the height of a rack 20. The benefit of this is further described in the aforementioned U.S. Pat. No. 7,119,282.

Because each cable guide 44,45 is formed separately from the support column 46 and subsequently attached thereto, rather than being formed integrally therewith, each cable guide 44,45 may be formed from a different material than the support column 46. Thus, although the support column 46 may preferably be formed from metal, each cable guide 44,45 may be injection-molded from plastic in order to create rounded or beveled edges along the edges of the T-shaped projections 63. Various advantages of such an arrangement are described in the aforementioned U.S. Pat. No. 7,119,282.

Figure 7B:
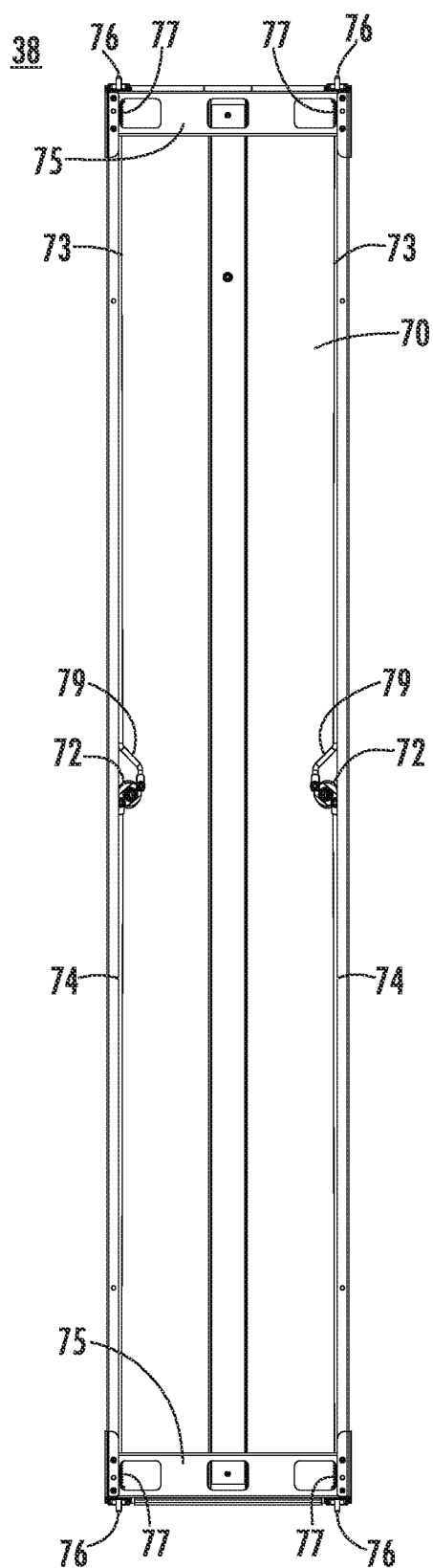
FIG. 7B is a rear plan view of one of the doors of FIG. 2.
Figure 7C:
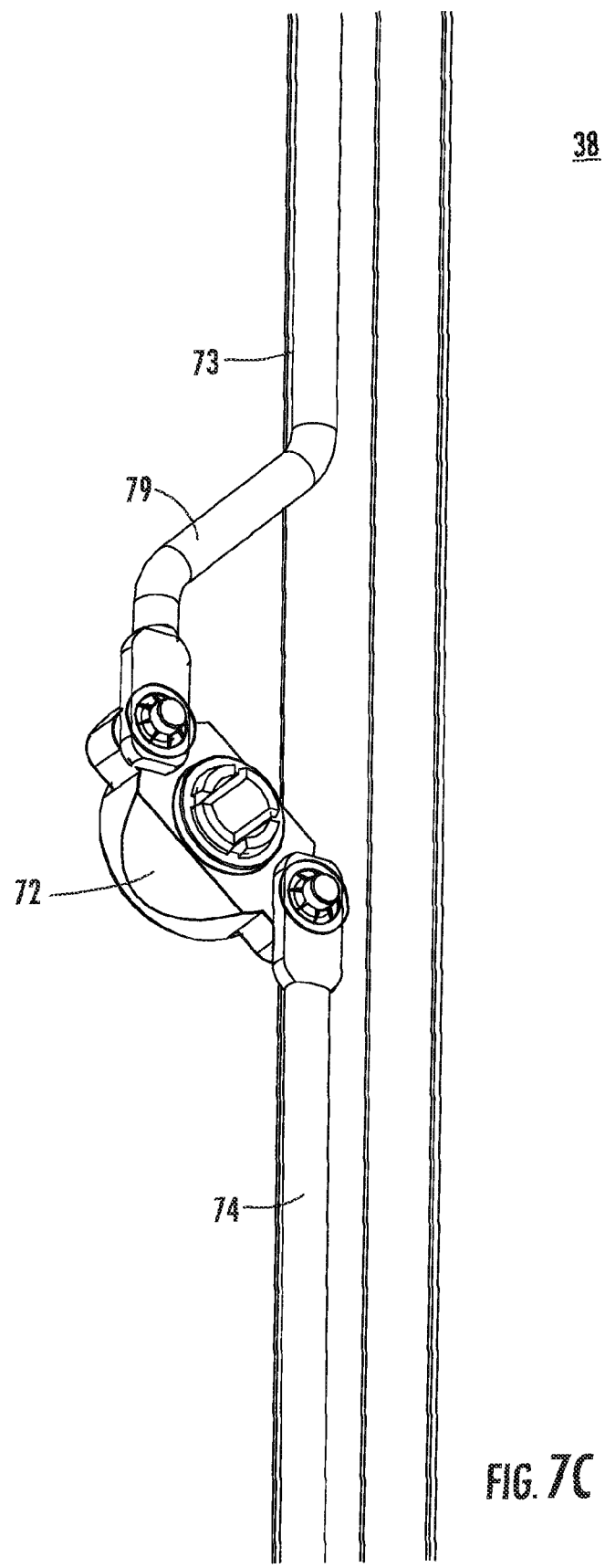
FIG. 7C is a fragmentary rear orthogonal view of a portion of one of the doors of FIG. 2.

FIGS. 7B-7D are a rear plan view and two fragmentary rear orthogonal views, respectively, of one of the doors of FIG. 2. Each door 38 includes a panel 70, two knobs 71 (perhaps best seen in FIG. 2), two rod interfaces 72, two upper rods 73 and two lower rods 74, and upper and lower reinforcement structures 75. Each rod 73,74 has a rod tip 76, functioning as a hinge pin, that is biased in an extended position (perhaps best shown in FIG. 7C) by a coil spring 77 attached at one end to the rod tip 76 and is held in place at its end by a surface on one of the reinforcement structures 75. Each knob 71 is coupled through the panel 70 to a respective rod interface 72. Referring to FIG. 7C, each rod interface 72 is rotatably coupled to proximal ends of an upper rod 73 and a lower rod 74 such that when the knob 71, and thus the rod interface 72, is rotated by a user, the rods 73,74 coupled to that rod interface 72 are pulled inward, thereby retracting the rod tips 76 into a respective end of the door 38. On the other hand, when the knob 71 is released, the springs 77 force the rod tips 76 from their retracted position back their extended position, pulling the rods 73,74 outward and rotating the rod interface 72, and thus the knob 71, back to its original state.

As perhaps best seen in FIG. 7B, each rod tip 76 is disposed close to a corner of the door panel 70, directly above or below, as appropriate, a knob 71 and rod interface 72. As seen in FIG. 7C, each upper rod 73 includes an offset portion 79 to align the upper rod tip 76 with the lower rod tip 76, thereby defining a hinge axis along each lateral side of the door 38. In this location, each rod tip 76 is arranged to extend into the hinge pin socket 57 (shown in FIG. 7) of a corresponding hinge/latch interface 56 in the top frame 50. Each hinge/latch interface 56, in turn, nestles within a partial shroud 78 (seen in FIG. 7D).

In use, each rod tip 76 is biased in its extended position into a corresponding hinge pin socket 57 in the top frame 50, thereby closing the door 38 along each side, as shown in FIG. 2. To open the door 38 along either side, the knob 71 on that side may be turned, thereby rotating the rod interface and retracting the rod tips 76 on the rods 73,74 coupled thereto. The door 38 may then be swung open on the rod tips 76, functioning as hinge pins, along the opposite side thereof. Once released, the knob 71 may return to its original position by the biasing action of the springs on the rod tips 76 and thus through the rods 73,74 to the rod interface 72. The door 38 may be closed and latched shut again by turning the knobs 71 to retract the hinge pins 76, swinging the door 38 back to the position shown in FIG. 2 wherein each hinge/latch interface 56 is nestled within its corresponding shroud 78. In this disposition, the hinge pins 76 are thereby aligned with the hinge pin sockets 57, and so releasing the knob 71 allows it to rotate to its original position as the hinge pins 76 are extended once more into their sockets 57. If the door 38 is to be removed entirely, as shown in FIG. 3, then the knobs 71 on both sides are turned, retracting all four rod tips 76, and the door 38 may be lifted from the hinge/latch interfaces and removed entirely.

Figure 8:
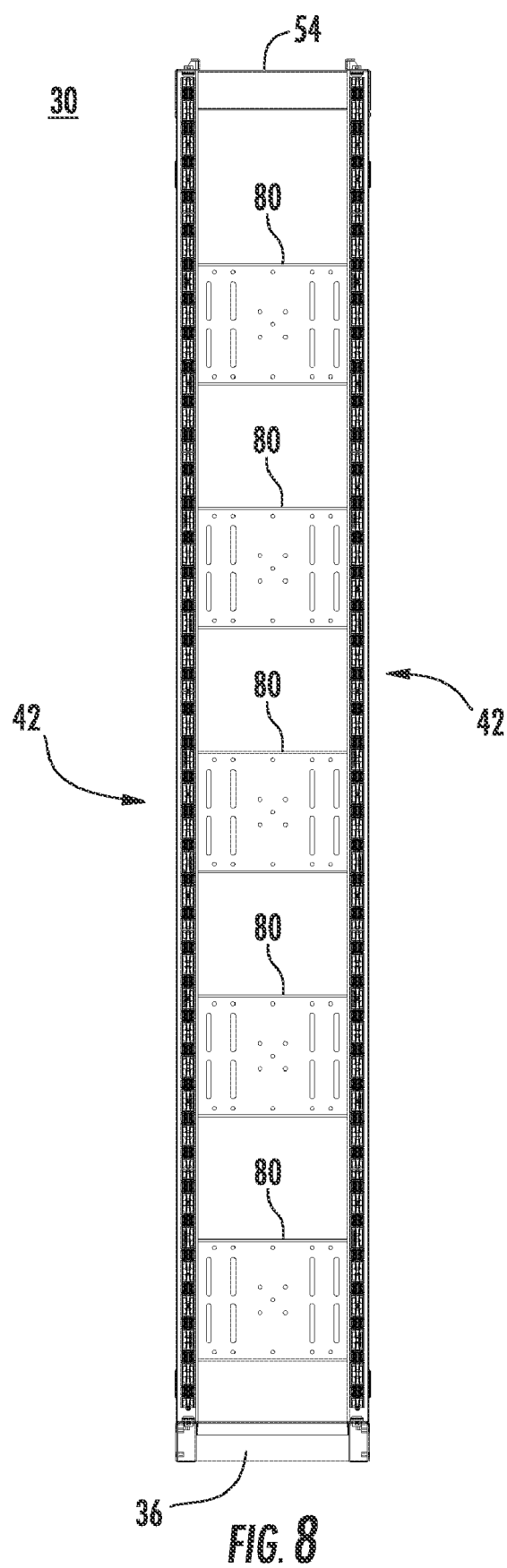
FIG. 8 is a front view of the vertical cable manager of FIG. 3, shown with a plurality of midsection members installed therein.

As described previously, midsection members 80 may optionally provide additional interconnection between the spine assemblies 42. FIG. 8 is a front view of the vertical cable manager 30 of FIG. 3, shown with a plurality of midsection members 80 installed therein. In the illustrated embodiment, five midsection members 80 are utilized and they are spaced evenly along approximately the entire height of the cable manager 30. However, it will be apparent to the Ordinary Artisan that, in at least some embodiments, different numbers of midsection members 80 may be used, that their spacing may be greater or lesser than that shown, and that they may alternatively be arranged at irregular intervals, provided, of course, that appropriate mounting means and locations are provided on the columns 46.

Figure 9:
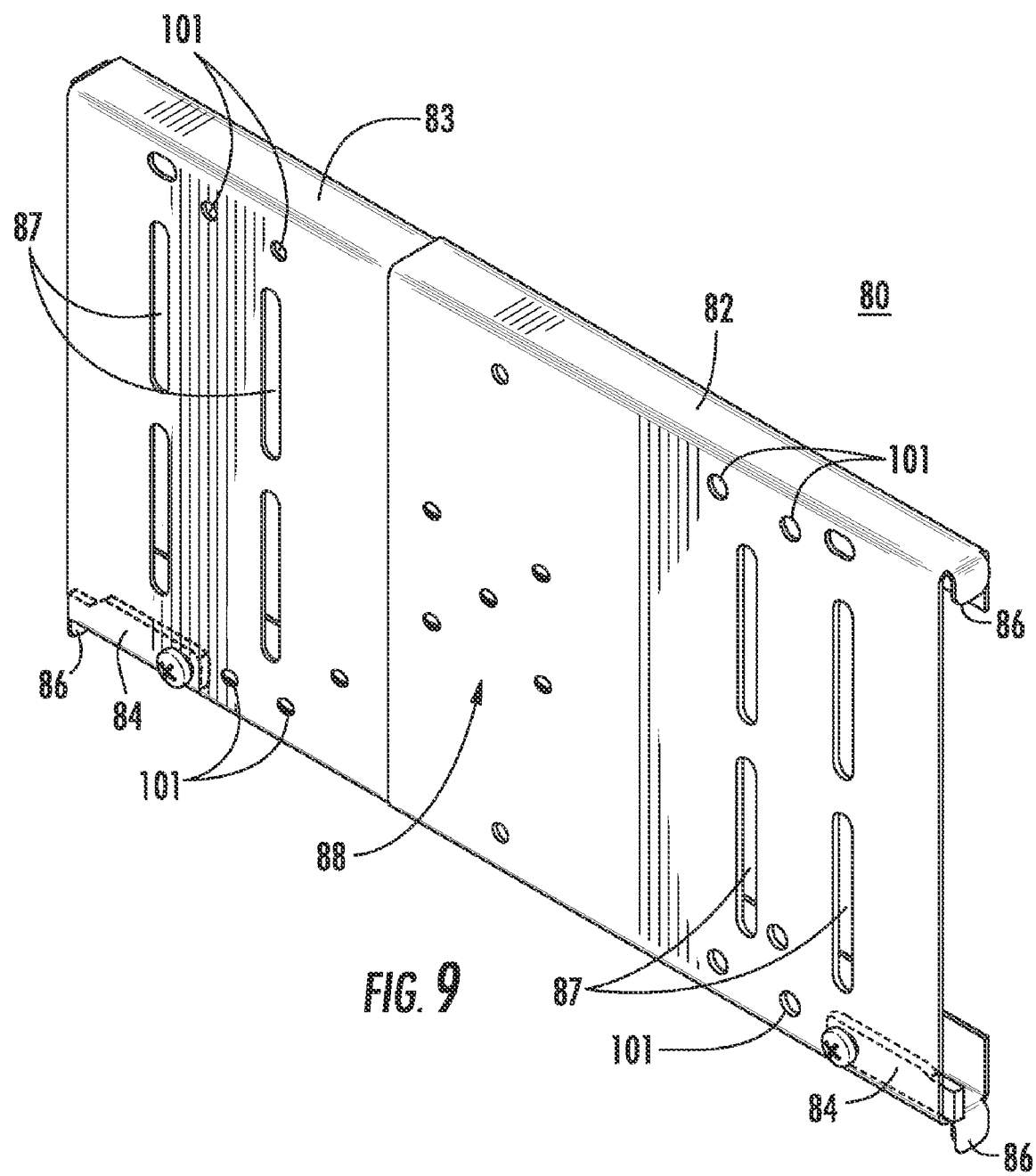
FIG. 9 is an isometric view of a midsection member of the vertical cable manager of FIG. 8.
Figure 10:
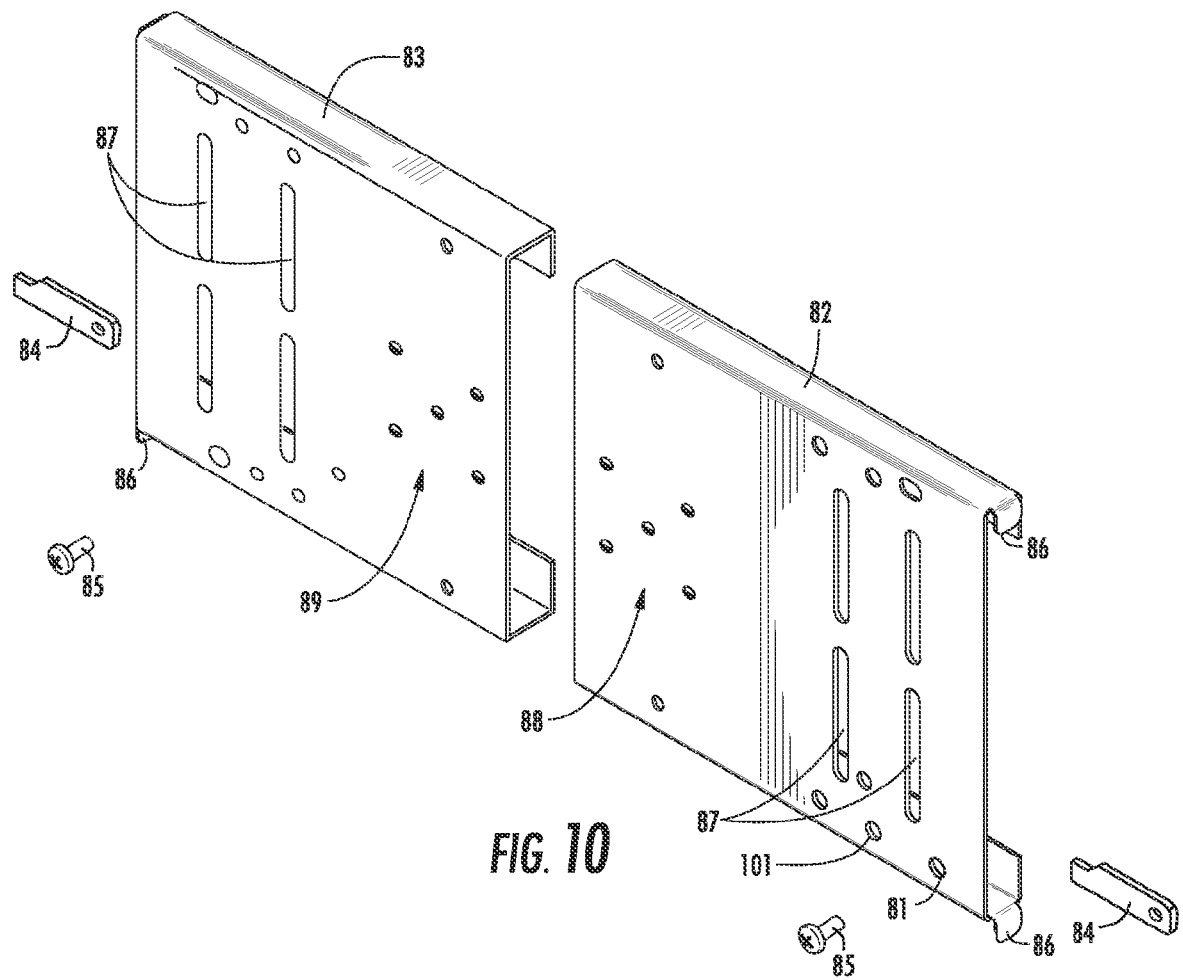
FIG. 10 is an exploded isometric view of the midsection member of FIG. 8.

FIGS. 9 and 10 are an isometric view and an exploded isometric view, respectively, of a midsection member 80 of the vertical cable manager 30 of FIG. 8. Each midsection member 80 includes two telescoping sections 82,83, one nested inside the other, and a pair of locking keys 84. Each section 82,83 is generally C-shaped in cross-section with a static tab 86 extending downward from each of the upper and lower distal ends. The main portion of each section 82,83 is preferably penetrated by a plurality of mounting openings that may include pairs of slots 87, groupings of apertures 88,89, individual apertures 101, or the like. In the illustrated embodiment, two pairs of slots 87 are included near the distal end of each telescoping section 82,83, and a grouping of round apertures 88 is included near the proximal end of first section while a corresponding grouping of slotted apertures 89 is included near the proximal end of the second section such that when installed normally, the two groupings of apertures 88,89 are aligned with each other for one or more purposes described hereinbelow.

In at least some embodiments, including those illustrated, a relatively simple mounting mechanism is preferred in order to simplify installation and adjustment. More particularly, the tabs 86 are arranged to interface with the square apertures 58 in the lateral portions 59 of the support columns 46 of the spine assemblies 42. Such apertures 58 are preferably arranged at regular intervals along the height of the support columns 46 with the interval chosen to match the vertical distance between the static tabs 86 at the upper and lower ends of each section 82,83. To install one of the midsection members 80, the two sections 82,83 are fit together and telescoped to approximately the proper distance between the two support columns 46. The midsection member 80 is then positioned so that the static tabs 86 are disposed adjacent a desired set of square apertures 58 in the support columns 46 and manipulated in such a way as to maneuver the static tabs 86 through the selected apertures 58. Once through, the member 80 is lowered until each static tab 86 hangs over the bottom edge of its respective aperture, as is visible in FIGS. 15 and 16. In this disposition, the midsection member 80 provides some lateral stability between the two support columns 46.

Stability may be further enhanced through use of the locking keys 84. Each locking key 84 is connected to the end of one of the midsection sections 80 via a fastener 85 passing through a slotted aperture 81 (perhaps best seen in FIG. 10). The locking key 84 may thus be disposed in an extended state (visible at the right end of the midsection member 80 of FIG. 9) or a retracted state (visible at the left end of the midsection member 80 of FIG. 9). In the extended state, the locking key 84 provides additional stability for an installed midsection member 80 via contact with the front or rear edge of the square aperture 58 through which it extends. In the retracted state, the locking key 84 is withdrawn from the aperture 58, thus making it easier to install or remove the midsection member 80, and more particularly the respective static tab 86, from the support column 46. Each locking key 84 may be fixed in place via the fastener 85.

In an alternative not illustrated herein, midsection members of a fixed length may be substituted for the two-section midsection members 80 illustrated herein. Furthermore, the midsection members 80 may be screwed or welded to the support columns 46.

Figure 11:
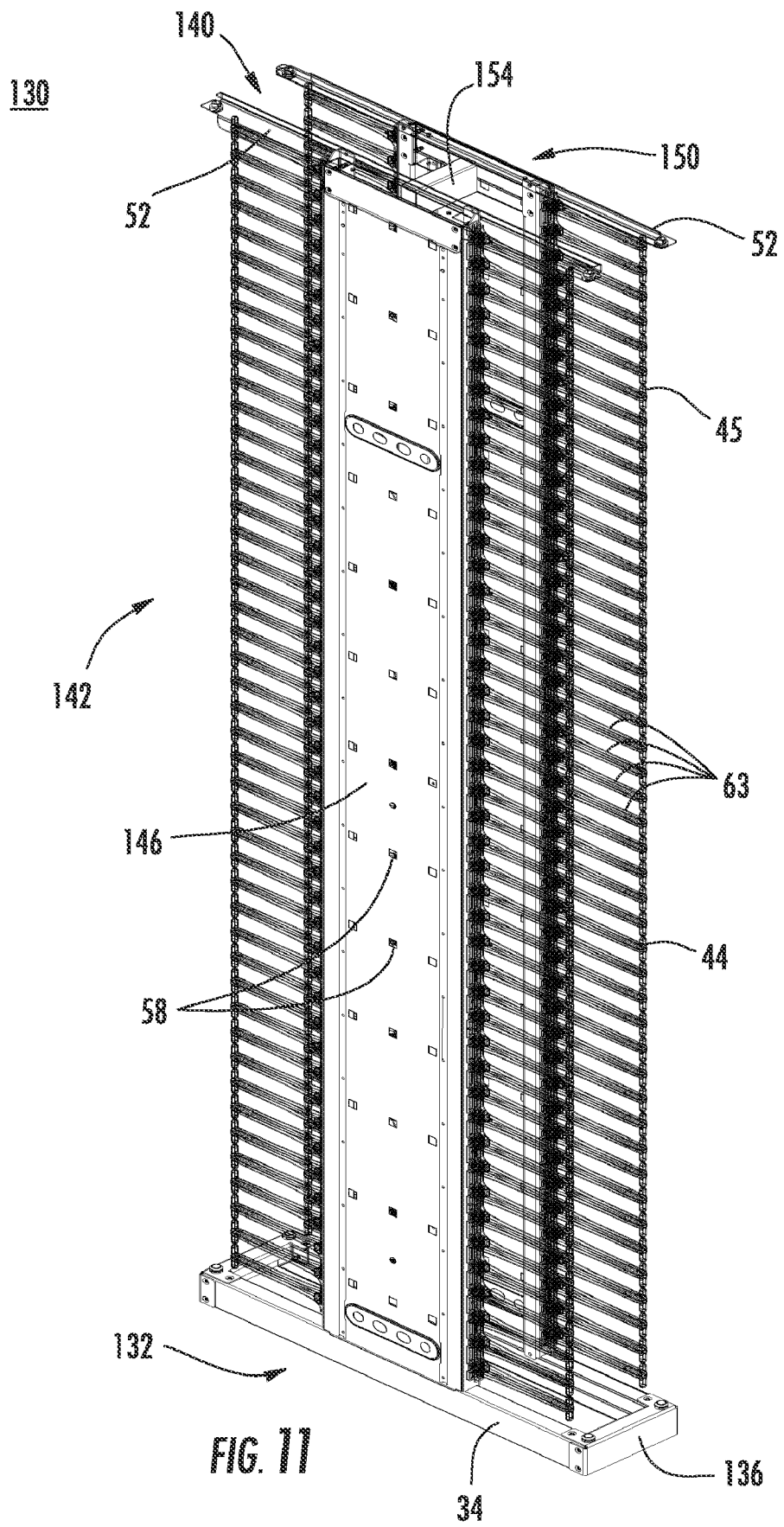
FIG. 11 is an isometric view of a vertical cable manager in accordance with a second preferred embodiment of the present invention.

As will be apparent to the Ordinary Artisan, a vertical cable manager as described and illustrated herein may be provided in various dimensions and proportions without departing from the scope of the present invention. For example, FIG. 11 is an isometric view of a vertical cable manager 130 in accordance with a second preferred embodiment of the present invention. The vertical cable manager 130 in FIG. 11 is taller than that of FIGS. 1-8 (and has correspondingly more T-shaped projections 63 and square apertures 58) and is narrower than that of FIGS. 1-8. Of course, other vertical cable managers may be taller, shorter, wider, narrower, or permutations thereof.

As shown therein, the vertical cable manager 130 of FIG. 11 includes a base 132, an interconnected double-spine assembly 140, and a pair of doors (not shown). The base 132 comprises a frame that includes two side members 34 and two cross members 136, with the length of the side members 34 and the length of the cross members 136 once again defining the depth and width, respectively, of the vertical cable manager 130. The interconnected double-spine assembly 140 includes two spine assemblies 142, each having a plurality of fingered cable guides 44,45 extending from a vertical support column 146. The spine assemblies 142 are interconnected at their lower ends by the base 132 and at their upper ends by a top frame 150, which includes two side assemblies 52 and a cross member 154.

Figure 12:
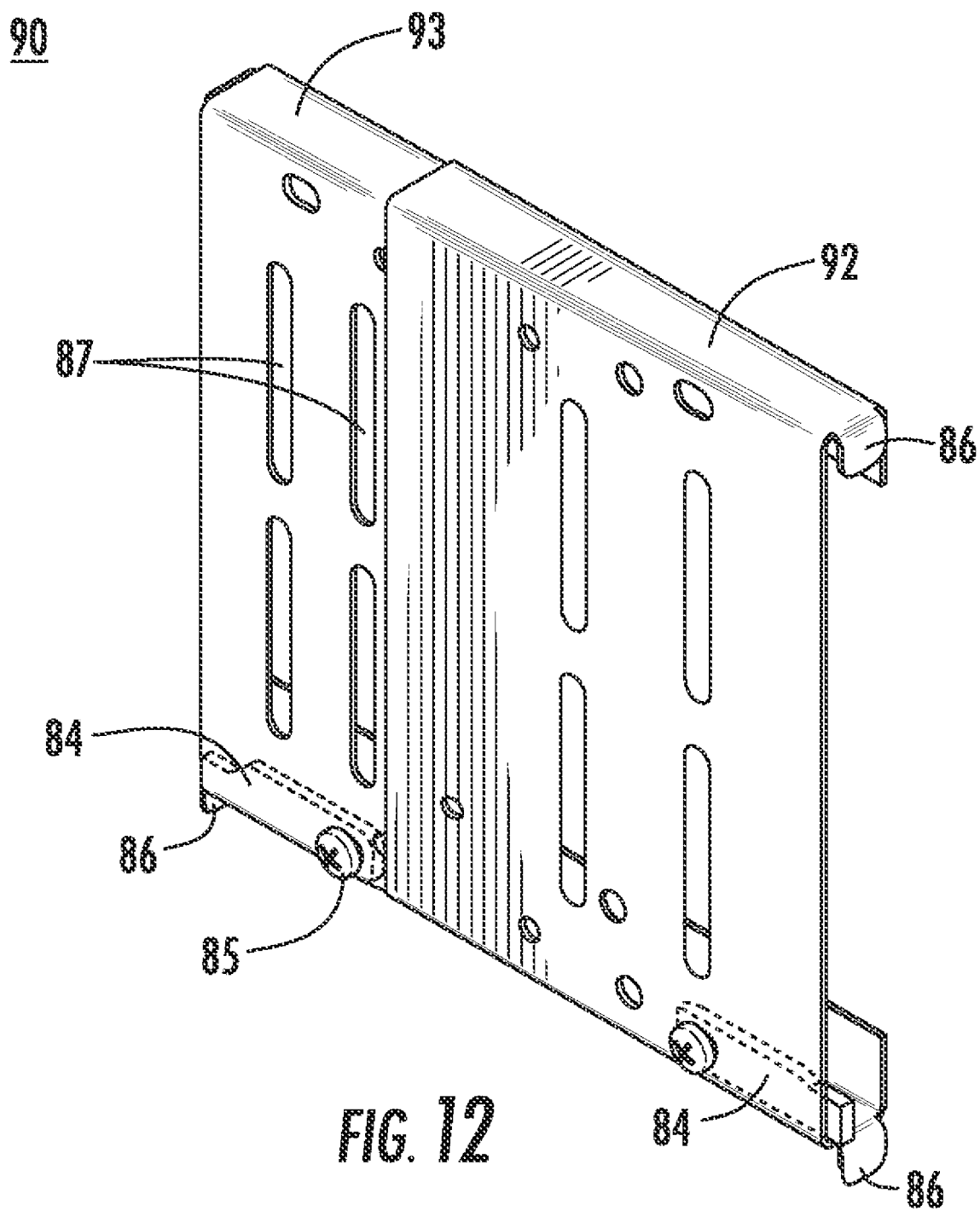
FIG. 12 is an isometric view of an alternative midsection member for use in the vertical cable manager of FIG. 11.

Other than dimensions and proportions, the design of the vertical cable manager 130 of FIG. 11 is generally similar to that of FIGS. 1-8 except for use of an alternative midsection member 90, an isometric view of which is shown in FIG. 12. The alternative midsection member 90 includes two telescoping sections 92,93, one nested inside the other, and a pair of locking keys 84. Like those of FIGS. 9 and 10, each section 92,93 is generally C-shaped in cross-section with a static tab 86 extending downward from each of the upper and lower distal ends. The main portion of each section 92,93 is preferably penetrated by a plurality of mounting openings that may include pairs of slots 87, or the like; however, there may not be sufficient room in the sections 92,93 for as many openings as in the member 80 of FIGS. 9 and 10. In the illustrated embodiment, two pairs of slots 87 are included near the distal end of each telescoping section 92,93. The design, construction and operation of the locking keys 84 and static tabs 86 are the same as in FIGS. 9-10.

FIGS. 13-18 are an isometric view, an exploded isometric view, a front view, a side view, a top view and a side cross-sectional view, respectively, of the vertical cable manager 30 of FIG. 8, shown with a plurality of accessories installed on the midsection members 80 thereof. In the illustrated implementation, the accessories include two large cable spools 94, three lashing bars 98, and two sub-channel units 100. Of course, greater or lesser numbers of accessories may alternatively be utilized, and there is no need to use accessories of all of the illustrated types. Each type of accessory will be further described hereinbelow.

Figure 13:
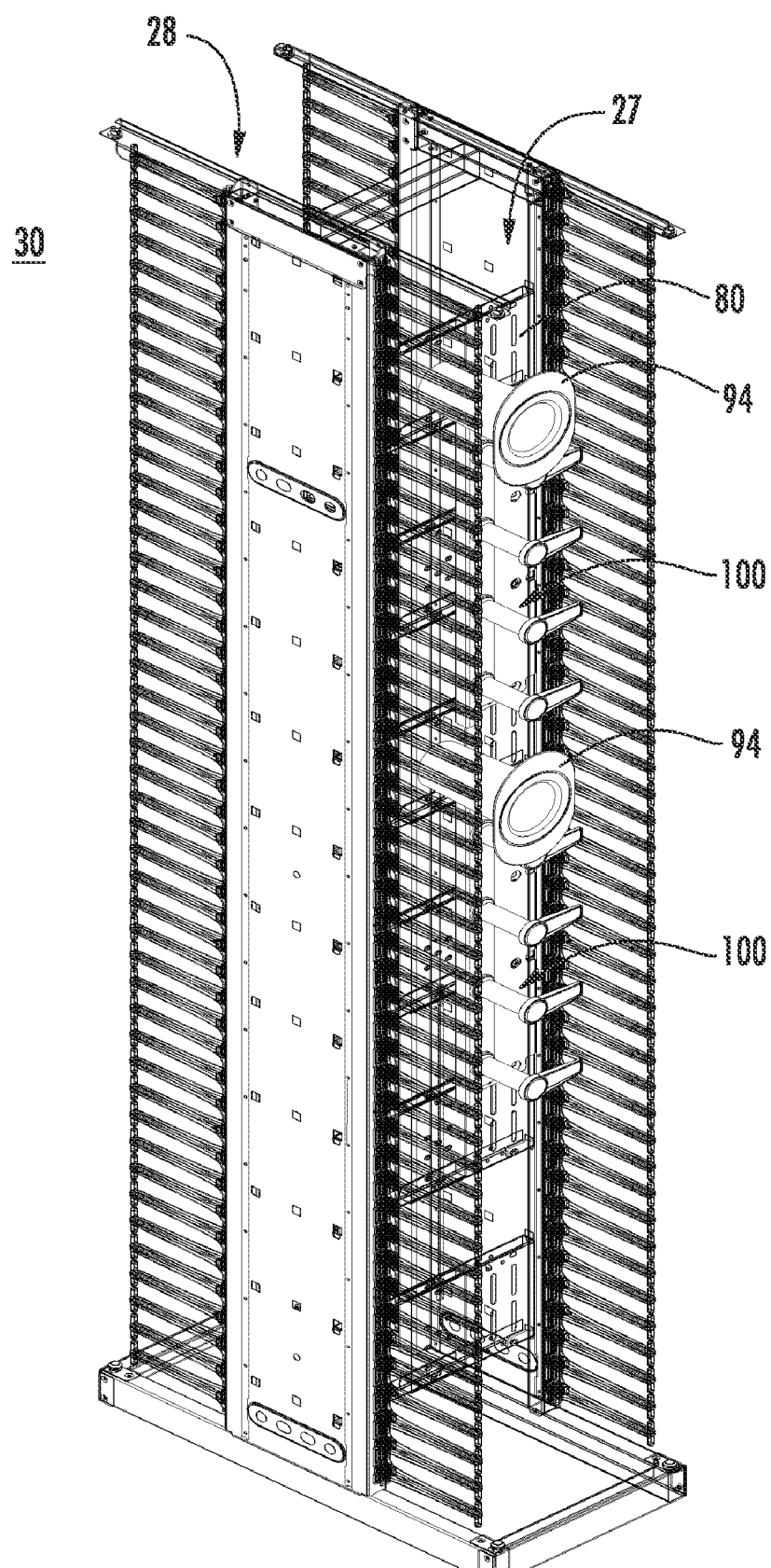
FIG. 13 is an isometric view of the vertical cable manager of FIG. 8, shown with a plurality of accessories installed on the midsection members thereof.
Figure 14:
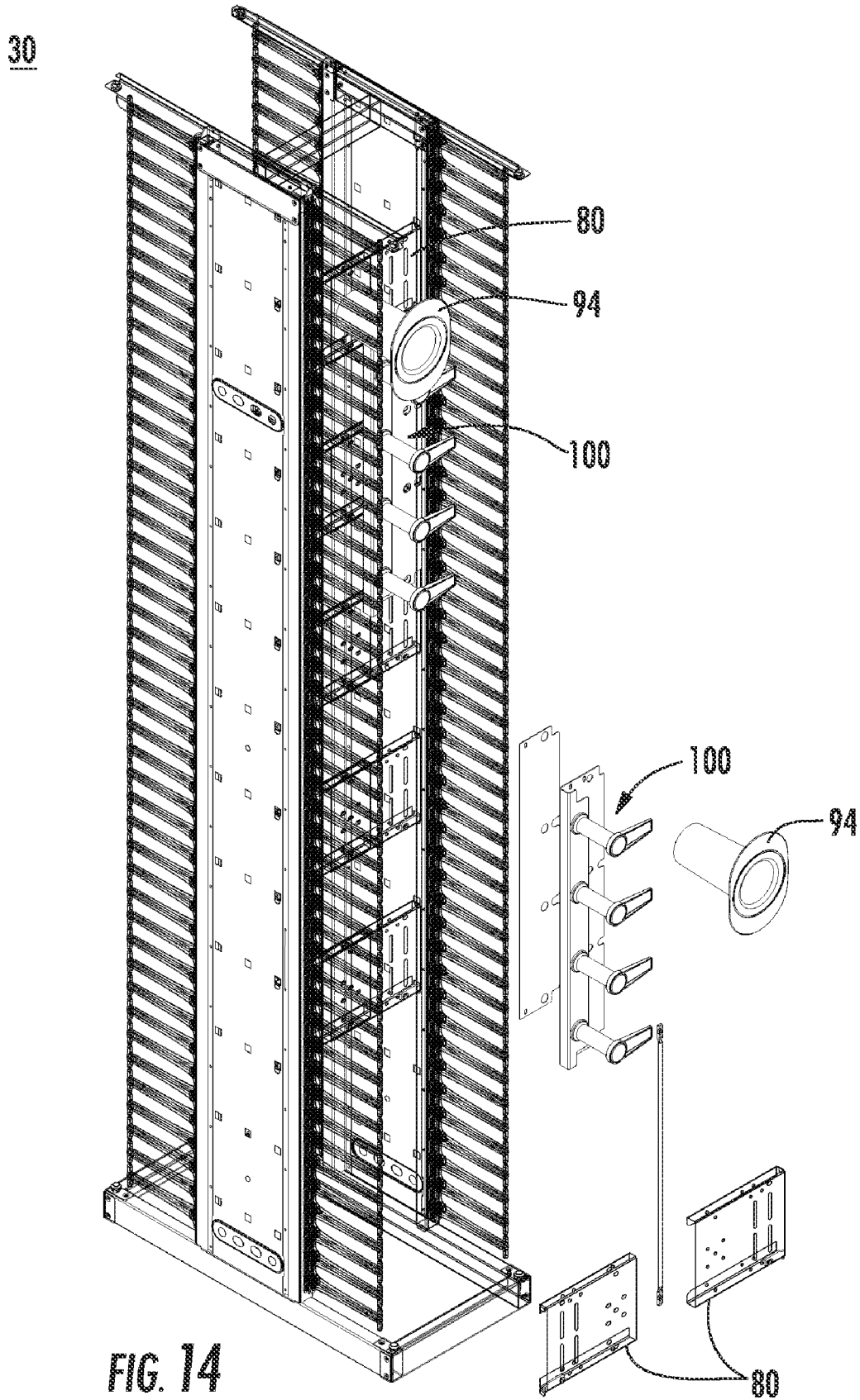
FIG. 14 is an exploded isometric view of the vertical cable manager of FIG. 13.

FIGS. 19-22 are an isometric view, a left side view, a rear view and a front view, respectively, of one of the large cable spools 94 of FIG. 13 shown in relation to the midsection member 80 of FIG. 9. As shown therein, the cable spool 94 includes an oval spool head 95 mounted perpendicularly to a semi-conical shaft 96 that has a slight inward taper, perhaps best seen in FIG. 20, along its extent from the spool head 95. The length of the shaft 96 is preferably selected such that, when mounted on a midsection member 80 in a forward-most position (more fully described hereinbelow), the spool 94 extends most but not all of the way to the distal ends of the T-shaped projections 63. In the illustrated implementation, this permits the spool 94 to be used for the majority of cables (not shown) routed through the front of the cable manager 30, but also permits a portion of such cables to be routed in front of the spool 94 if desired.

In the illustrated embodiment, the spool 94 is hollow, but alternatively may be semi-hollow or solid, if desired, without departing from the scope of the present invention. The distal end of the spool 94 is preferably solid but is penetrated by one or more (two in the illustrated embodiment) mounting apertures 97 that correspond in arrangement to apertures in the groups of apertures 88,89 in the midsection member 80, thus permitting attachment to the midsection member 80 using fasteners (not shown).

In use, the cross member 54 of the top frame 50 and the midsection members 80 define front and rear wiring channels or paths 27,28, as shown in FIG. 13. Cables may be routed up or down through these channels 27,28 to a desired elevation and then routed In use, wires, optical fiber and other cables (not shown) are routed up or down through these channels 27,28 to a desired elevation and then routed through the projections 63 of the cable guides 44,45 to an adjacent mounting fixture 20 or the like. Either or both of these channels 27,28 may be effectively segregated further through the use of one or more of the spools 94. This is illustrated, by way of example, by the spools 94 in the front channel 27 in the arrangement shown in FIG. 17. Each spool shaft 96 provides a radius of curvature that corresponds to one or more standards, such as for fiber cables. In addition, each spool head 95 prevents cables that are installed between the spool head 95 and the midsection member 80 from moving forward, away from the midsection member 80, a feature perhaps best understood with reference to FIG. 17. The large spool 94 may be installed in either of two orientations through selection of the appropriate mounting apertures in the grouping of apertures 88,89 on the midsection member 80. Alternatively, smaller groups of apertures 88,89 may be provided on the midsection member 80 and additional mounting apertures 97 may be provided on the spool 94, thereby accomplishing the same functionality. When installed in one orientation, using selected subsets of the groups of apertures 88,89, the oval spool head 95 is aligned vertically (as shown in the various illustrations), while when installed in another orientation (not shown), using different selected subsets of the groups of apertures 88,89, the oval spool head 95 is aligned horizontally.

The midsection members 80 utilized herein also make it easier to route cables back and forth between the front and rear wiring channels 27,28. More particularly, wide vertical gaps 26 are established between the midsection members 80, each considerably taller and wider than prior art openings, which were self-contained within a wall that extended the entire vertical length of each prior art double-sided cable manager. Still-larger gaps 26 may be established by omitting intermediate midsection members 80 altogether. This system provides considerable flexibility for front-to-back wiring while still providing a flexible system of cable management features and structures.

Figure 15:
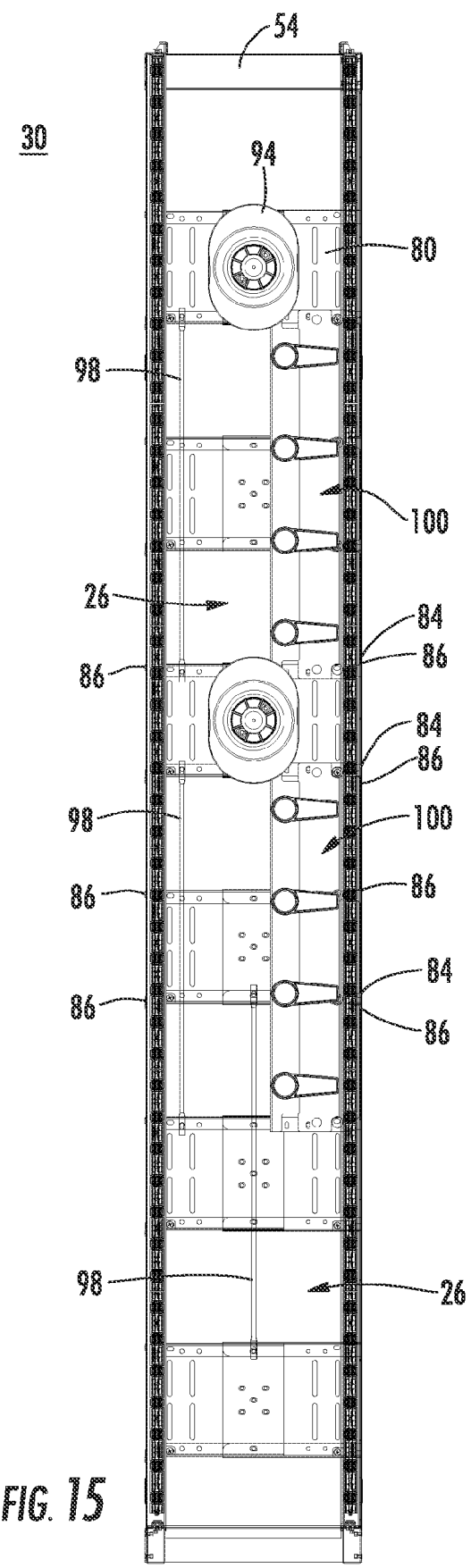
FIG. 15 is a front view of the vertical cable manager of FIG. 13.
Figure 16:
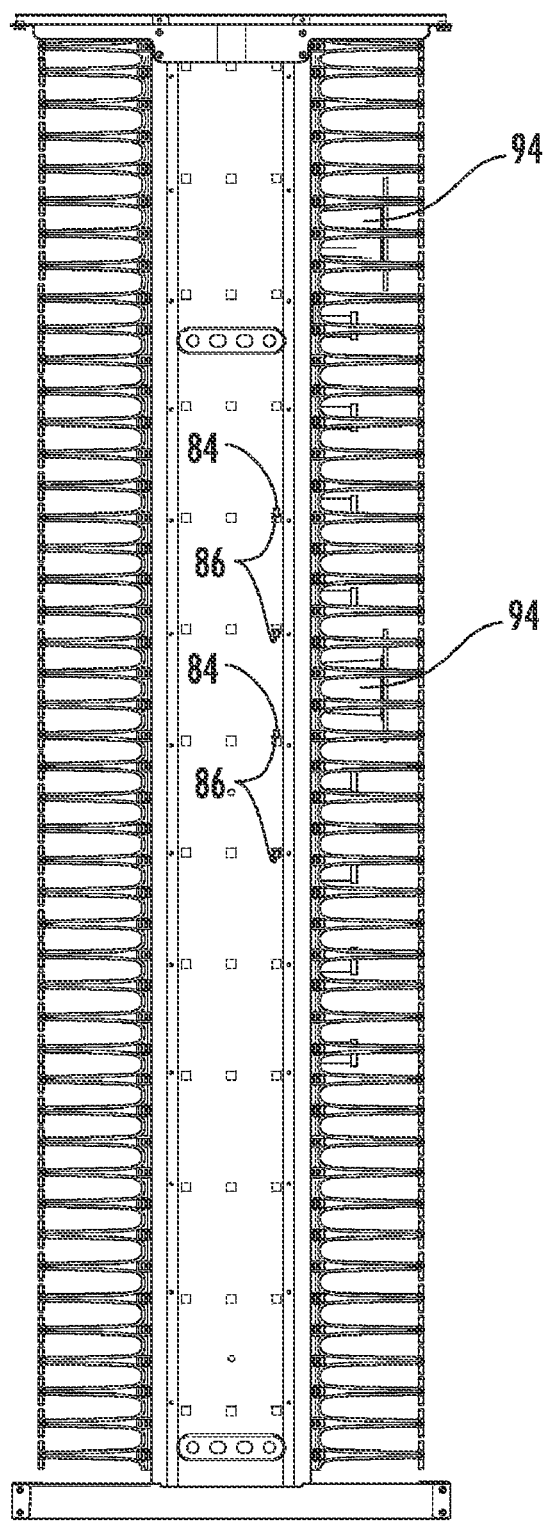
FIG. 16 is a side view of the vertical cable manager of FIG. 13.
Figure 17:
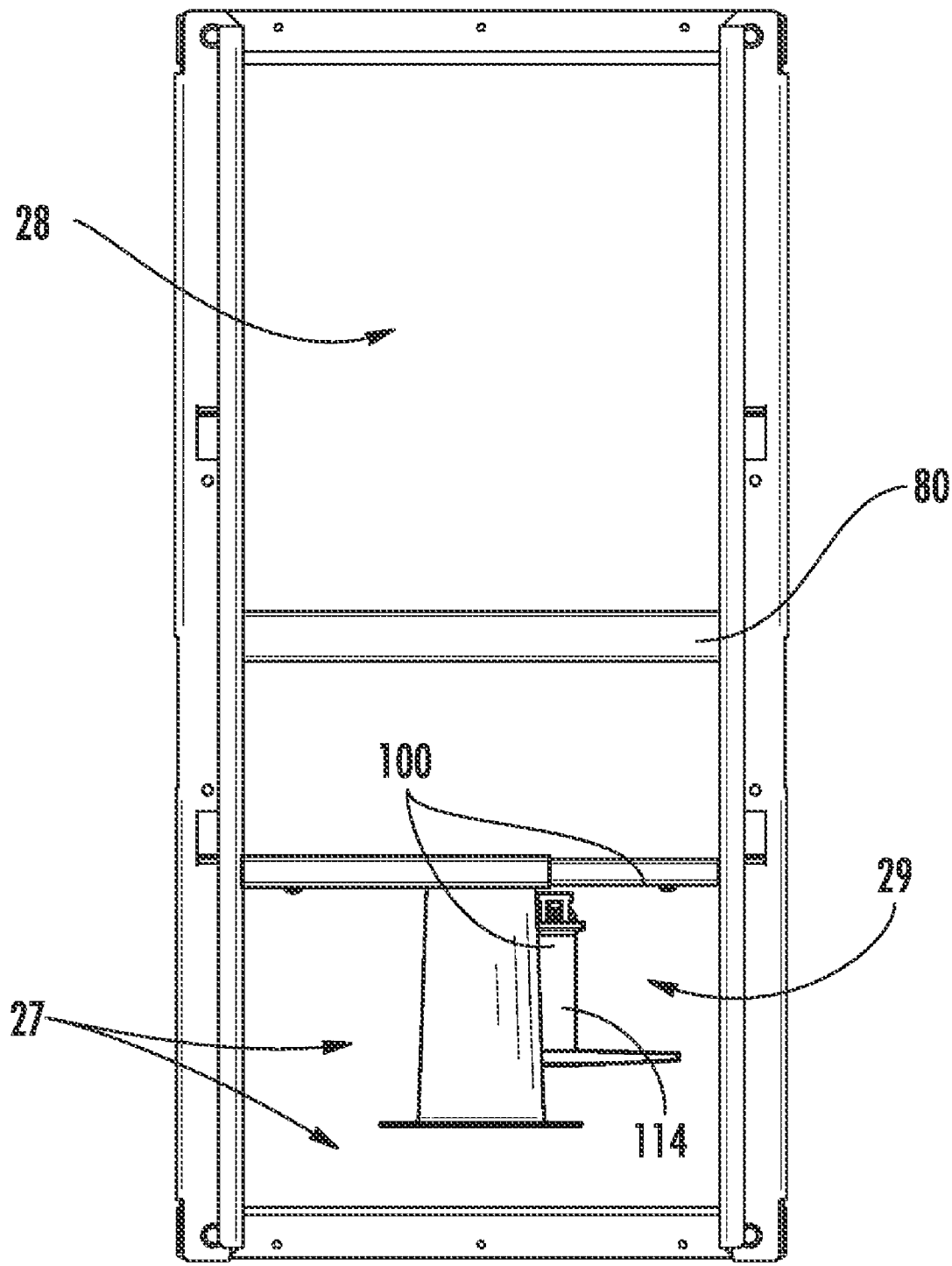
FIG. 17 is a top view of the vertical cable manager of FIG. 13.

As perhaps best seen in FIG. 15, the lashing bars 98 are mounted so as to extend in parallel with the front wiring channel 27 generally. Each lashing bar 98 may be attached to a pair of midsection members 80 via fasteners, such as bolts, extending through apertures 101 in the midsection members 80. As shown in FIG. 15, they may extend across another midsection member 80 without connecting thereto. Although lashing bars 98 of only one length are shown in FIG. 15, it will be apparent that other lengths may likewise be used. Each lashing bar provides a convenient structure for tying off bundles of cables thereto, thereby preventing the cables from shifting around within the wiring channel 27.

Figure 31:
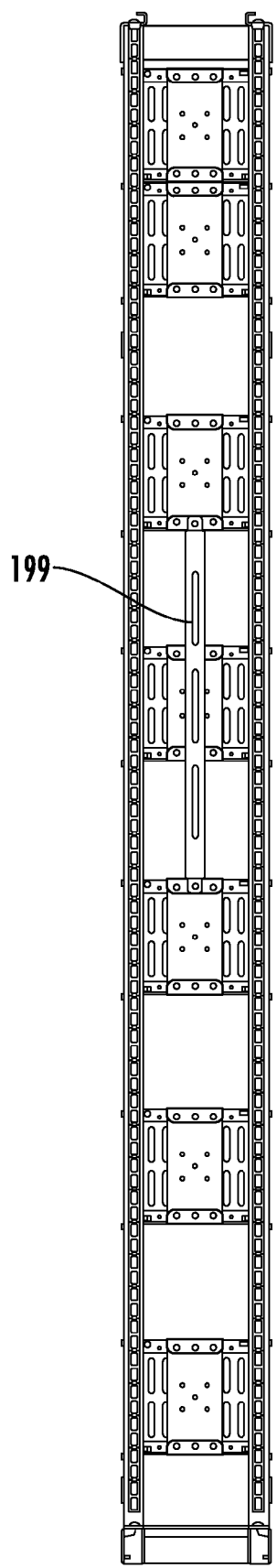
FIG. 31 is a front view of a vertical cable manager similar to that of FIG. 13, shown with a first alternative lashing bar assembly.
Figure 32:
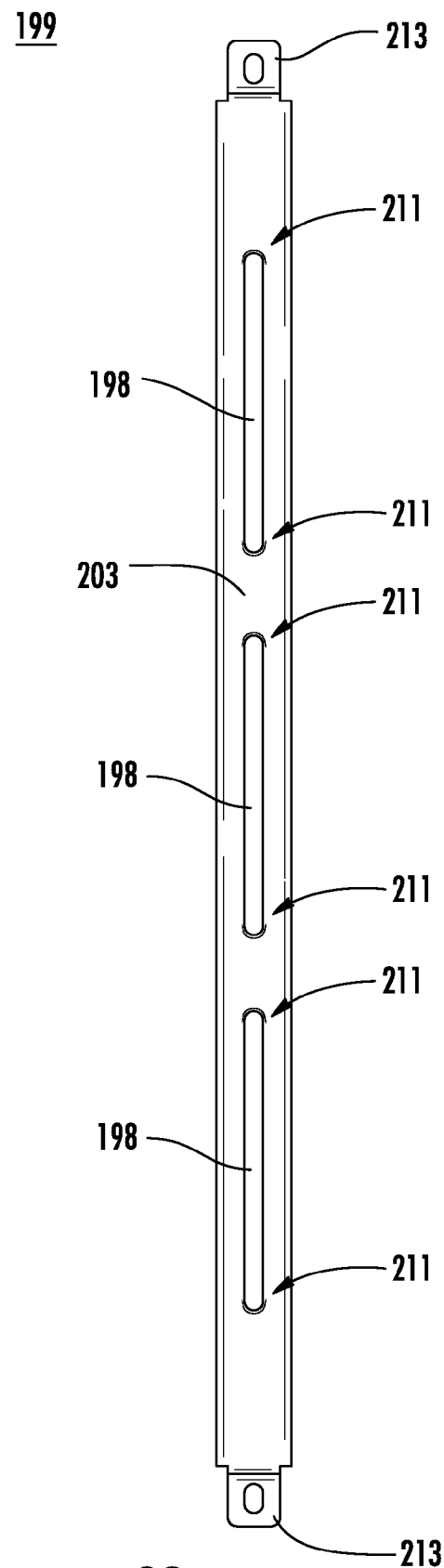
FIG. 32 is a front view of the lashing bar assembly of FIG. 31.
Figure 33:
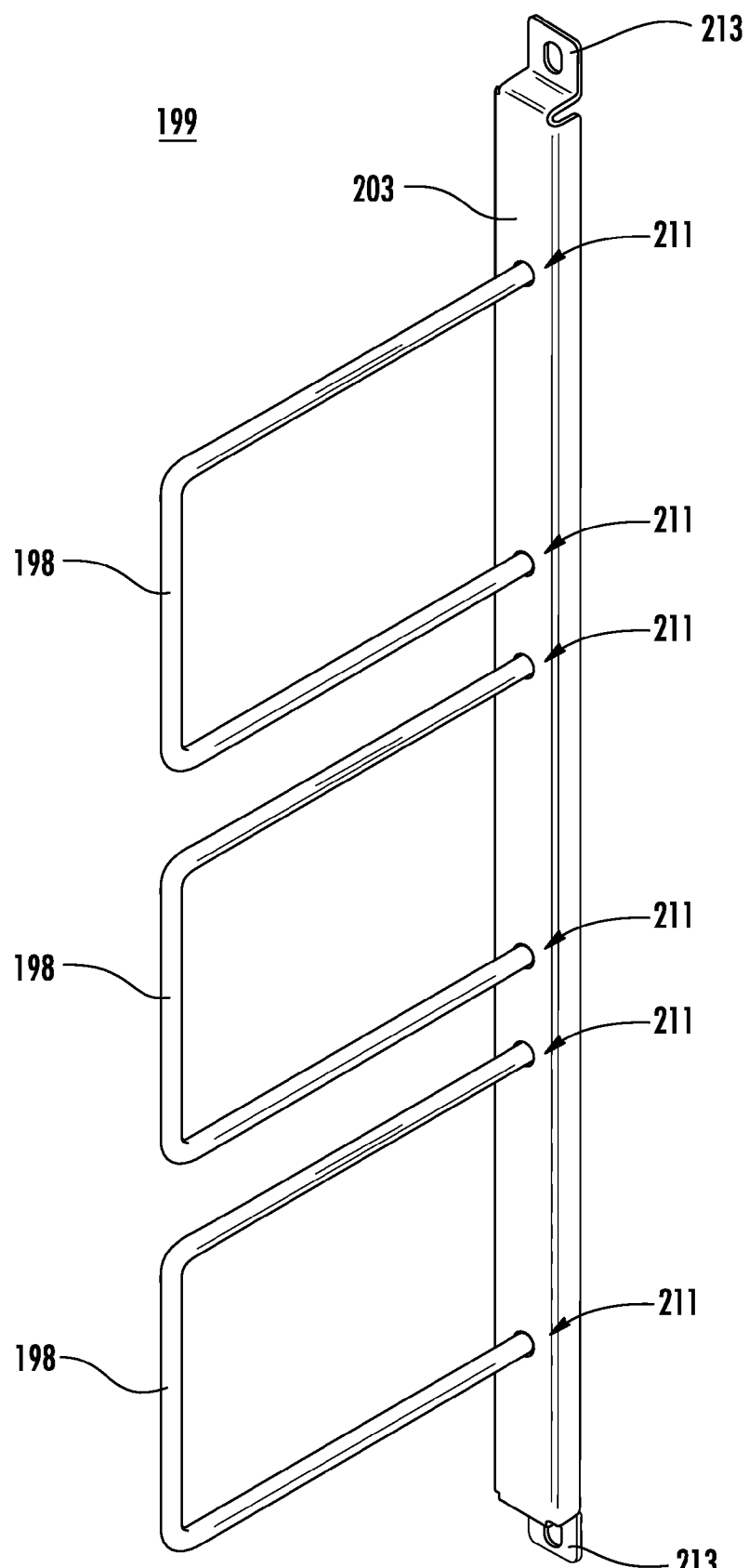
FIG. 33 is an isometric view of the lashing bar assembly of FIG. 31.

FIG. 31 is a front view of a vertical cable manager 330 similar to that of FIG. 13, shown with a first alternative lashing bar assembly 199, while FIGS. 32 and 33 are a front view and an isometric view, respectively, of the lashing bar assembly 199 of FIG. 31. As shown therein, the first alternative lashing bar assembly 199 includes a plurality of individual lashing bars 198 mounted on a base 203 via openings 211 therein, each bar creating a separate loop or hump for cable management. The base 203 includes a mounting tab 213 at each end such that it may be attached to a pair of midsection members 80 via fasteners, such as bolts, extending through apertures 101 in the midsection members 80. As shown in FIG. 31, they may extend across another midsection member 80 without connecting thereto. Although a lashing bar 198 of only one length is shown in FIG. 31, it will be apparent that other lengths may likewise be used. Each lashing bar 198 in the assembly 199 provides a convenient structure for tying off bundles of cables thereto, thereby preventing the cables from shifting around within a wiring channel defined by the vertical cable manager 330.

Figure 34:
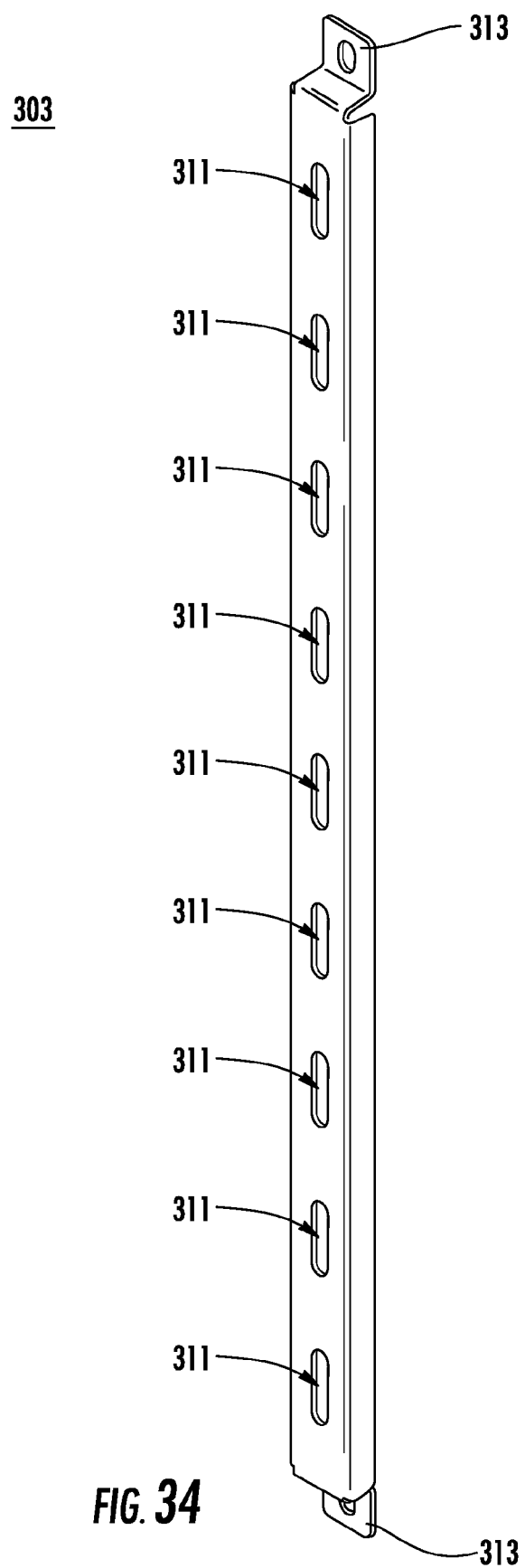
FIG. 34 is an isometric view of the base of a second alternative lashing bar assembly for use in a vertical cable manager similar to that of FIG. 13.

FIG. 34 is an isometric view of the base 303 of a second alternative lashing bar assembly for use in a vertical cable manager similar to that of FIG. 13. As shown therein, the base 303 has a plurality of slotted openings 311 in which one or more individual lashing bars (not shown) may be mounted. Each bar may create a separate loop or hump for cable management, similar to the arrangement shown in FIG. 33. The base 303 includes a mounting tab 313 at each end such that it may be attached to a pair of midsection members 80 via fasteners, such as bolts, extending through apertures 101 in the midsection members 80. The base 303 may extend across another midsection member 80 without connecting thereto. Although a base 303 of only one length is shown in FIG. 34, it will be apparent that other lengths may likewise be used. Each lashing bar in the assembly provides a convenient structure for tying off bundles of cables thereto, thereby preventing the cables from shifting around within a wiring channel defined by a vertical cable manager.

Figure 35:
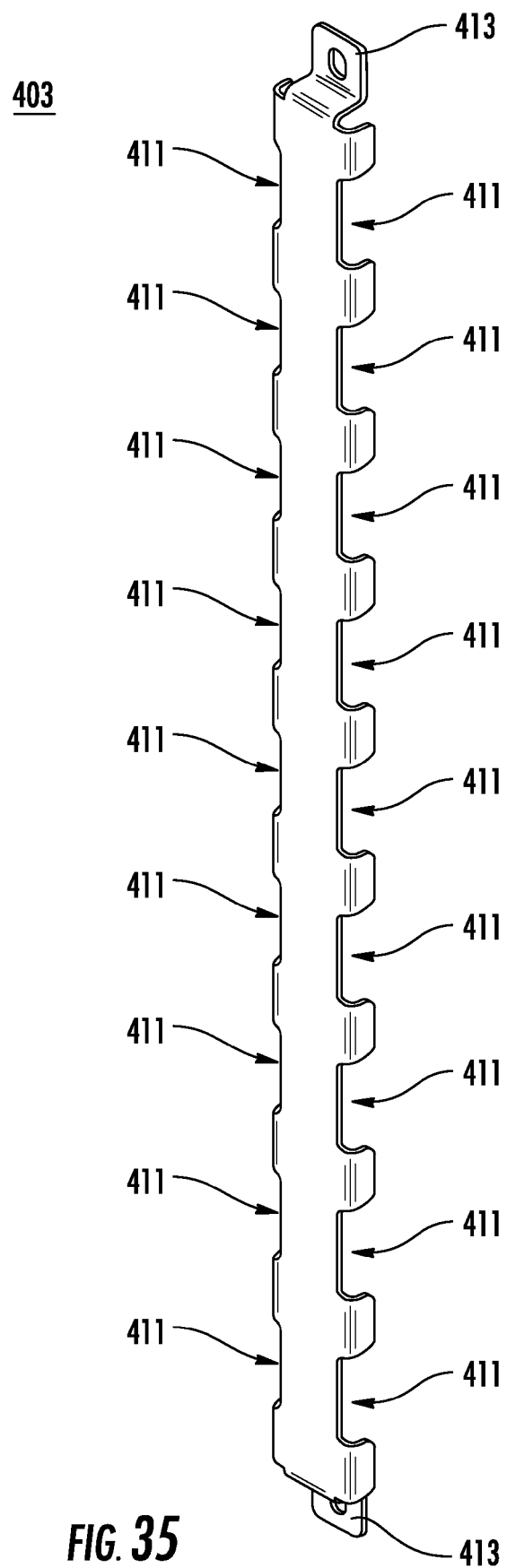
FIG. 35 is an isometric view of the base of a third alternative lashing bar assembly for use in a vertical cable manager similar to that of FIG. 13.

FIG. 35 is an isometric view of the base 403 of a third alternative lashing bar assembly for use in a vertical cable manager similar to that of FIG. 13. As shown therein, the base 403 has a plurality of slotted recesses 411, along each edge thereof, in which one or more individual lashing bars (not shown) may be mounted. Each bar may create a separate loop or hump for cable management, similar to the arrangement shown in FIG. 33. It will be appreciated that lashing bars may be installed on either or both edges of the base 403. The base 403 includes a mounting tab 413 at each end such that it may be attached to a pair of midsection members 80 via fasteners, such as bolts, extending through apertures 101 in the midsection members 80. The base 403 may extend across another midsection member 80 without connecting thereto. Although a base 403 of only one length is shown in FIG. 34, it will be apparent that other lengths may likewise be used. Each lashing bar in the assembly provides a convenient structure for tying off bundles of cables thereto, thereby preventing the cables from shifting around within a wiring channel defined by a vertical cable manager.

Figure 36:
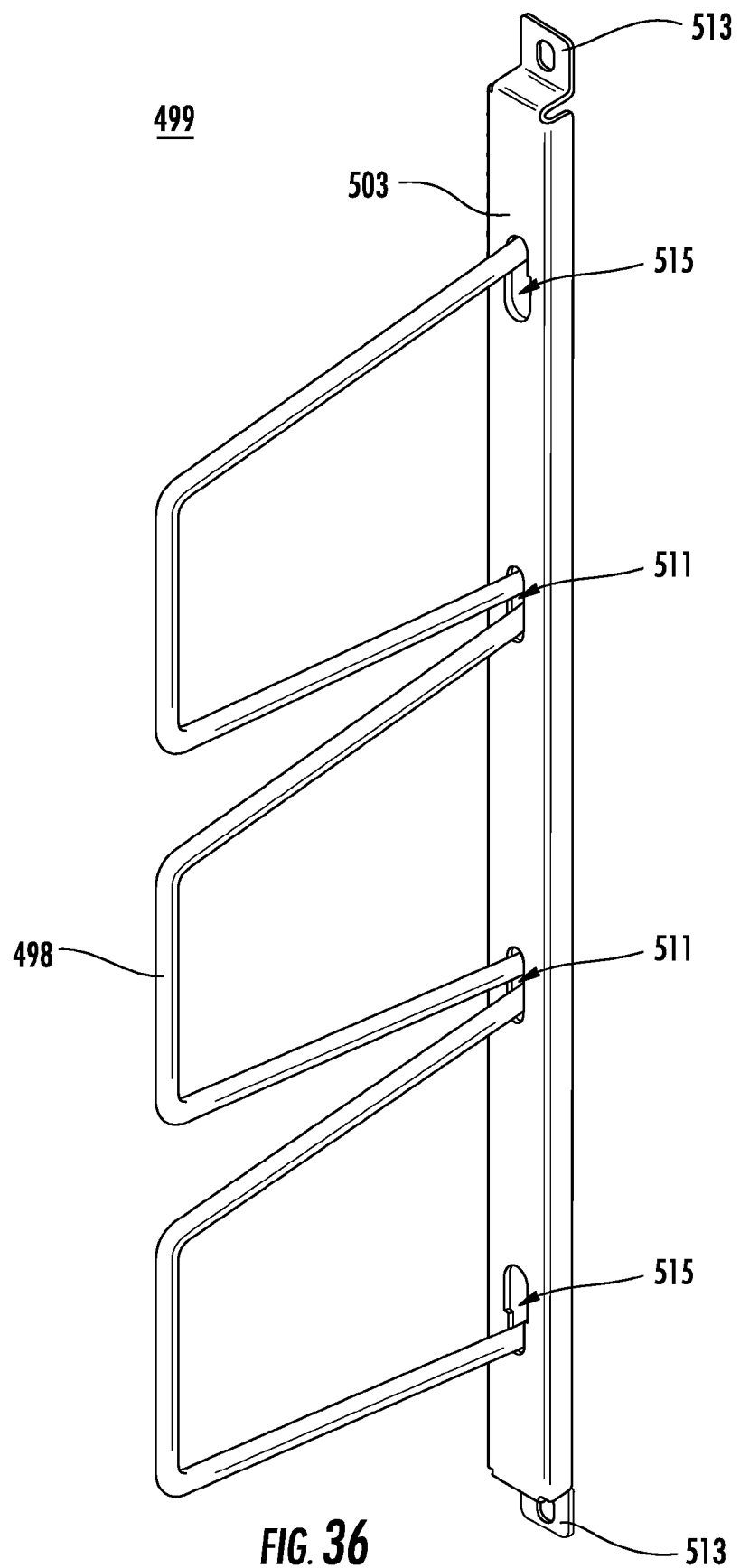
FIG. 36 is an isometric view of the base of a fourth alternative lashing bar assembly for use in a vertical cable manager similar to that of FIG. 13.

FIG. 36 is an isometric view of the base of a fourth alternative lashing bar assembly 499 for use in a vertical cable manager similar to that of FIG. 13. As shown therein, the fourth alternative lashing bar assembly 499 includes a single lashing bar 498, with a plurality of loops or humps, mounted on a base 503 via openings 511,515 therein. The base 503 includes a mounting tab 513 at each end such that it may be attached to a pair of midsection members 80 via fasteners, such as bolts, extending through apertures 101 in the midsection members 80. The assembly 499 may extend across another midsection member 80 without connecting thereto. Although a lashing bar assembly 499 of only one length is shown in FIG. 36, it will be apparent that other lengths may likewise be used. Each loop or hump in the lashing bar 498 in the assembly 499 provides a convenient structure for tying off bundles of cables thereto, thereby preventing the cables from shifting around within a wiring channel defined by a vertical cable manager. The lashing bar 498 may be installed on the base 503 by squeezing the ends of the bar 498 inward, thereby permitting the ends of the bar 498 to be inserted in keyhole slots 515 in the base. Portions of the bar 498 between the loops or humps may be inserted to slot openings 511 correspondingly arranged in the base 503.

Each type of lashing bar assembly provides loops or humps that in the interior of a vertical cable manager, allowing cable bundles inside the vertical cable manager to be anchored near the rear of the cable management space thereby increasing the utilization of the vertical cable manager's capacity to house and route cables.

As described previously, conventional tie-down features included such devices as bridge lances or punched slots in the sheet metal comprising the rear "wall" of the cable management space. The use of such features required a more tedious "threading" of Velcro ties. Furthermore, previous methods almost uniformly required that Velcro tie wraps be threaded through bridge lances or through punched slots in sheet metal, often requiring access to both the front and the rear of the manager.

The various lashing bars described or illustrated herein each allow for a single person remaining on one side of the vertical manager to easily wrap a Velcro tie wrap around the cable bundle and the lashing bar, securing the cable bundle and drawing it back into the rear of the cable management space. The "loops" or "humps" of the various alternative lashing bar assemblies provide additional security for insuring anchored cable bundles do not slip vertically from the point where they were anchored and also provide a means for subdividing the cable management space vertically within the vertical cable manager.

Each bar assembly provides a rigid beam to which a flexible but generally stiff bundle of data/communications cables may be anchored. Each bar assembly makes use of Velcro or other tie wraps much easier than threading such ties through small sheet metal features. The greater ease of use as well as not being confined to a limited number of tie-down points creates a more flexible cable management space and allows for greater utilization of the potential capacity of the vertical cable manager. The "loops" provide a means to subdivide the vertical cable management space into two or more vertical channels, allowing for more specific routing spaces for cable within the manager.

Each lashing bar and/or bar assembly can be made from solid, round metal bar stock, formed sheet metal, extruded metal (such as aluminum) or composite, or a variety of other materials. As illustrated, the bar assembly can be provided in a simple straight section with or without perforations down its length, with or without repeating strain relief features down the length, or can include one or more "loop" features which are affixed to the bar.

It will be appreciated that in some contexts, the single lashing bar 98 of FIG. 13 may be referred to as a lashing bar assembly.

Figure 23:
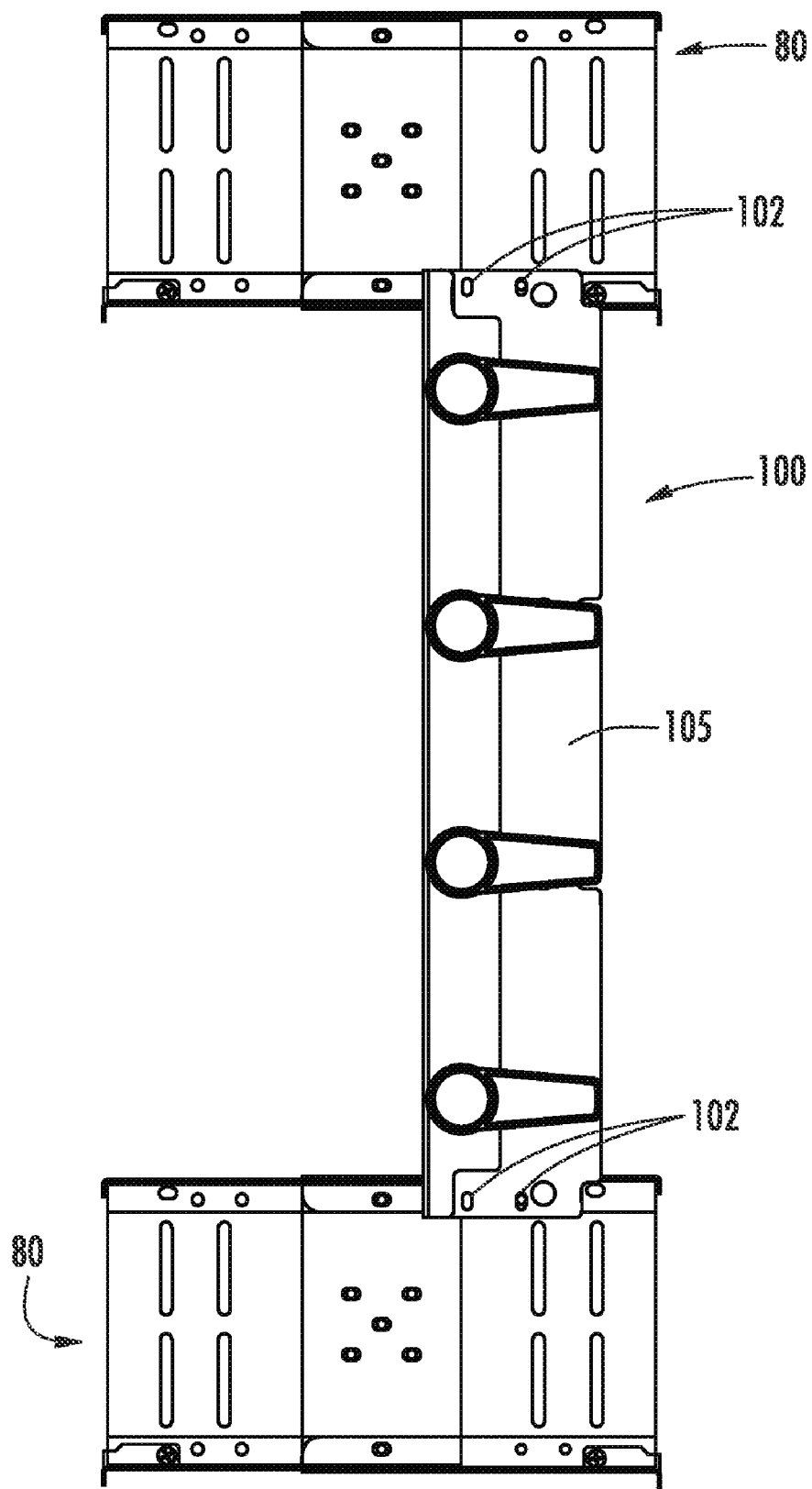
FIG. 23 is a front view of one of the sub-channel units and two of the midsection members of FIG. 13.
Figure 24:
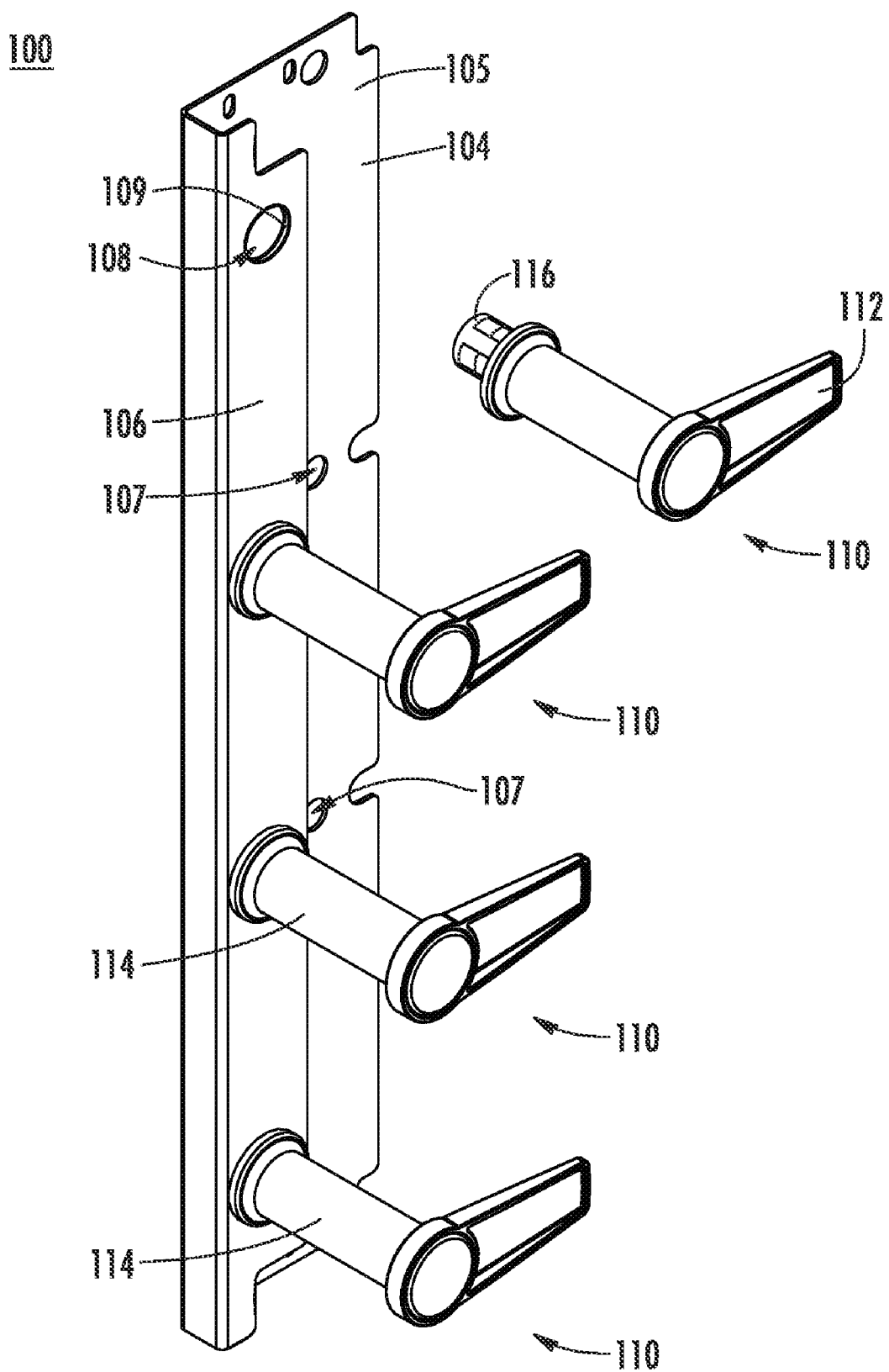
FIG. 24 is a partially exploded isometric view of the sub-channel unit of FIG. 23.
Figure 25:
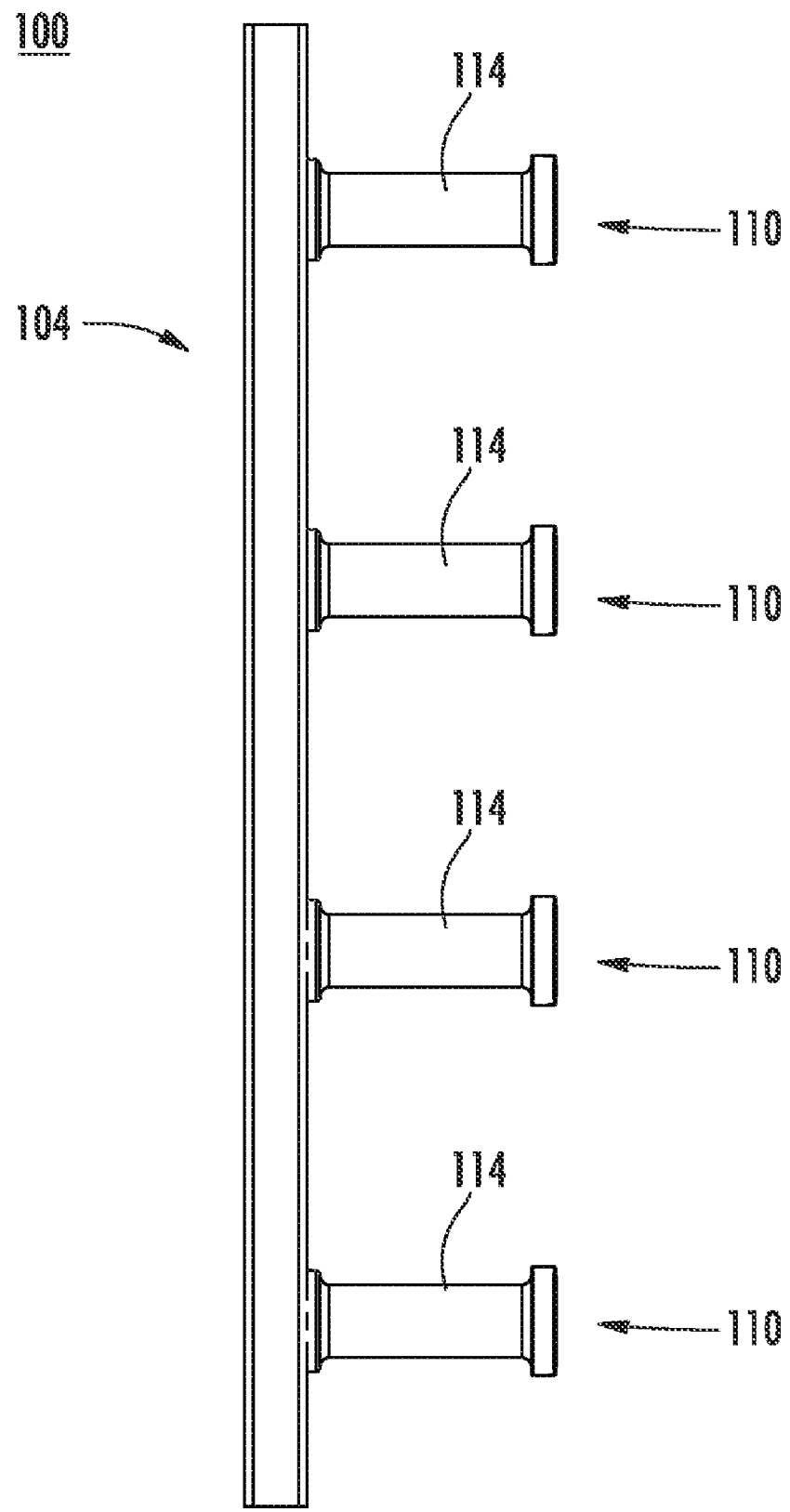
FIG. 25 is a left side view of the sub-channel unit of FIG. 23.
Figure 26:
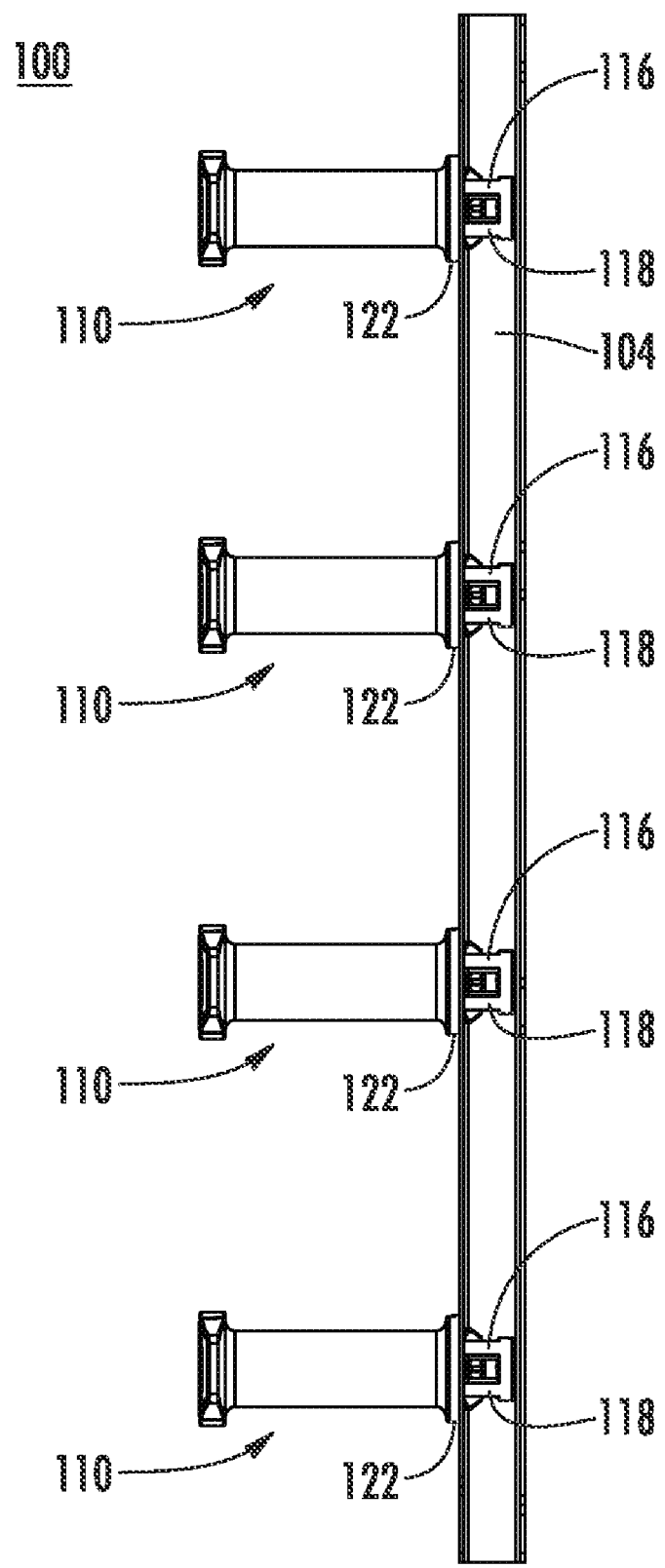
FIG. 26 is a right side view of the sub-channel unit of FIG. 23.
Figure 27:
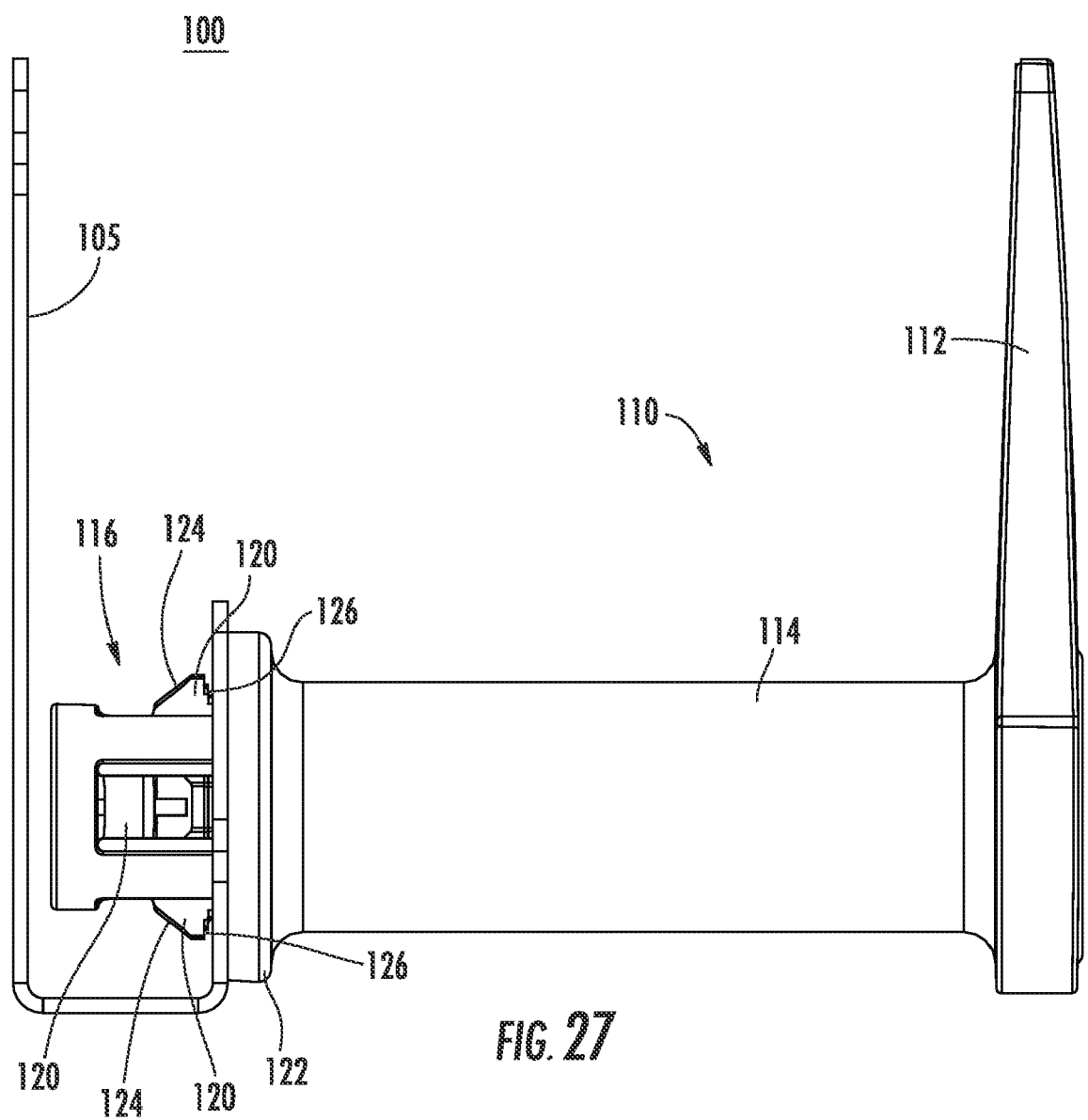
FIG. 27 is a top view of the sub-channel unit of FIG. 23.

FIG. 23 is a front view of one of the sub-channel units 100 and two of the midsection members 80 of FIG. 13. As shown therein, the sub-channel unit 100 may be mounted to two appropriately-spaced midsection members 80 by inserting fasteners (not shown) through apertures 102 in the sub-channel unit 100 and corresponding apertures 101 (perhaps best seen in FIG. 9) in the sections 82,83 of the midsection members 80. The mounting apertures 102 in the sub-channel unit 100 may be slotted so as to facilitate a small amount of adjustment to accommodate slight variances in the distances between midsection members 80.

FIGS. 24-27 are a partially exploded isometric view, a left side view, a right side view and a top view, respectively, of the sub-channel unit 100 of FIG. 23. Each sub-channel unit 100 includes a back plate 104 and one or more repositionable handle spools 110. In the embodiment shown, four repositionable handle spools 110 are aligned along the back plate 104, but it will be appreciated that greater or fewer numbers of spools 110 may be used. Further, in at least some embodiments, the handle spools 110 are not rotatable; in at least some embodiments, the handle spools 110 are mounted on separate back plates (not shown) that are aligned; in at least some embodiments, the illustrated handle spools 110 are replaced by spools of at least one other shape; in at least some embodiments, the handle spools 110 are arranged horizontally instead of vertically; and in at least some embodiments, the handle spools 110 are arranged in more than one column or row.

Each handle spool 110 includes a gate arm 112 mounted perpendicularly to a cylindrical shaft 114 that extends from a repositionable base 116. The gate arm 112, shaft 114 and base 116 may be integrally formed via injection molding or the like. In the illustrated embodiment, at least some portions of the spool 110 are hollow, but alternatively may be semi-hollow or solid, if desired, without departing from the scope of the present invention. A cap 117, which may also be injection molded, may be used to cover the end of the shaft 114.

The length of the shaft 114 is preferably selected such that, when the unit 100 is mounted on a midsection member 80 in a forward-most position (more fully described hereinbelow), the spool 110 extends a significant portion (in at least one embodiment, approximately halfway) of the way to the distal ends of the T-shaped projections 63. In the illustrated implementation, this permits the spool 110 to be used for the a significant subset of any cables (not shown) routed through the front of the cable manager 30, but also permits a portion of such cables to be routed in front of the spool 110 if desired.

In the illustrated embodiment, the repositionable base 116 includes a generally cylindrical stub 118, around which are disposed four resilient bosses 120 that may be depressed radially inwardly relative to the stub 118, and a coaxial seating flange 122. In the illustrated embodiment, the bosses 120 are arranged evenly around the cylindrical stub 118 at 90 degree intervals, but it will be appreciated that such spacing need not be even, and that other numbers of bosses 120 may be utilized. As perhaps best seen in FIG. 27, each boss 120 is attached to the stub 118 near the end of the stub 118 and extends away from the end of the stub 118 in a hollow or opening defined by the side of the stub 118. Each boss 118 includes a beveled deflection face 124 and a stepped retention face 126.

The back plate 104 of the sub-channel unit 100 includes a primary mounting plate 105 and a handle spool shelf 106. The primary mounting plate 105 is penetrated by a plurality of mounting apertures 107 arranged to align with individual apertures 101 on the midsection members 80, and may be attached to the midsection members 80 with fasteners (not shown) inserted therethrough. The primary mounting plate 105 is further penetrated by a plurality of access openings and cutaways to provide access to other fasteners and mounting apertures on various midsection members 80 mounted therebehind if necessary.

The shelf 106 includes a plurality of spool openings 108 for receiving the mounting stubs 118 of the respective handle spools 110. In the illustrated embodiment, there are four spool openings 108 in each sub-channel unit 100, corresponding to the four handle spools 110 mounted thereon, but it will be appreciated that greater or fewer numbers of openings 108 may be provided, and that not all of the openings 108 necessarily need to be occupied. Each opening 108 is generally circular but with a plurality of small recesses 109 arranged around the periphery thereof. In the illustrated embodiment, the recesses 109 are arranged evenly around each opening 108 at 90 degree intervals, but it will be appreciated that such spacing need not be even, and that other numbers of recesses 109 may be utilized, so long as correspondence to the bosses 120 on the handle spool stubs 118 is maintained. It will be appreciated, however, that a greater number of recesses 109 than bosses 120 may be provided, so long as there is at least one and preferably a plurality of different dispositions in which the stubs 118 may be mounted in the openings 108.

To insert a stub 118 into an opening 108, the bosses 120 on the stub 118 must be aligned with the recesses 109 around the periphery of the opening 108. Because the bosses 120 and recesses 109 are each arranged at 90 degree intervals, this may be accomplished with the handle spool 110 in any of four rotational orientations. More particularly, the gate arm 112 may be rotated for disposition at any of four different orientations, with such orientations being at 90 degree intervals relative to each other. Preferably, the four orientations include the gate arm 112 being disposed horizontally to the right (when viewed from the front, as shown in FIGS. 15 and 23), vertically upward, horizontally to the left, and vertically downward.

The depth of each recess 109 relative to the edge of its respective opening 108 corresponds to the extent of each boss 120 from the side of its respective stub 118. More particularly, the depth of the recess 109 is chosen such that as the stub 118 is pushed through the opening 108, the rim of each recess 109 bears against the beveled deflection face 124 on one of the bosses 120, deflecting it radially inward, until the widest portion is passed and the stepped retention face 126 is reached. Because the stepped retention face 126 is narrower than the widest portion of the bosses 120, each boss 120 then "snaps" into place and is held in place by an appropriate step or ledge (visible in FIG. 27) on the retention face 126.

In use, wires, optical fiber and other cables (not shown) are routed along or around one or more of the spools 110. Each spool shaft 114 provides a radius of curvature that corresponds to one or more standards, such as for fiber cables. In addition, each gate arm 112 prevents cables from moving forward, away from the midsection member 80, a feature perhaps best understood with reference to FIG. 17. As noted previously, each handle spool 110 may be installed in any one of four orientations through selection of which bosses 120 are installed in which recesses 109. Conveniently, once a handle spool 110 is installed, it may be rotated by simply grasping the gate arm 112 and exerting a relatively minimal pressure in the direction in which it is desired to move the gate arm 112. The recesses 109 gently depress the bosses 120 of the handle spool 110 into the openings thereof, thereby enabling the indexing feature of the handle spool 110. As the spool rotates, the bosses 120 flex into and out of the recesses 109 to provide a rotational detent feel. The handle spool 110 may be removed by reaching between the primary mounting plate 105 and the handle spool shelf 106 and squeezing the bosses 120 inward enough to permit removal of the stub 118 entirely by reversing the insertion process described previously. The bosses 120 may be squeezed by a user's fingers or via a tool.

Advantageously, the operation of the repositionable handle spools permit cables to be installed along the length of the sub-channel unit 100 and held in place by the gate arms 112 of the respective handle spools 110 mounted thereon. In conjunction with the cylindrical shafts 114 of the spools 110, this provides for retention of such cables along at least three boundaries, defined by the primary mounting plate 105, the cylindrical shafts 114, and the gate arms 112. Furthermore, if the unit 100 is mounted adjacent a wall of cable guides 44,45, as may be seen in FIG. 17, then a closed channel or wiring path 29 is defined with boundaries on all four sides. Cables may be loaded into a three- or four-sided channel 29 by removal or rotation of the handle spools 110 such that the gate arms 112 do not block the front entrance to the channel 29 and then insertion or rotation of the spools 110 to close that entrance and retain the cables in the channel 29. Of course, cables may be routed around any of the cylindrical shafts 114 and out of the channel 29, if desired, with the radius of curvature of the shafts 114 ensuring that a minimum turn radius is maintained with regard to each such cable.

Notably, the length of each gate arm 112 may be chosen to assist in retaining the cables as described. In at least one embodiment, the length of the gate arms 112 is selected to match the width of the primary mounting plate 105 as illustrated in FIG. 23, thereby permitting the distal ends of the gate arms 112 to be disposed immediately adjacent the cable guides 44,45 or other structure disposed along the lateral edge of the cable manager 30. In at least one other embodiment, the length of the gate arms 112 is selected to be less than the width of the primary mounting plate 105 so that a gap remains between the distal ends of the gate arms 112 and the adjacent cable guides 44,45 or other structure. In at least some embodiments, the unit 100 is mounted as close to the adjacent cable guides 44,45 or other structure, while in other embodiments the unit 100 is spaced apart from the adjacent cable guides 44,45 or other structure.

In at least some embodiments, a sub-channel unit having a different arrangement of repositionable handle spools or other spools is utilized, such as one taught or suggested by U.S. Pat. No. 6,600,107, the entirety of which is incorporated herein by reference. More particularly, in at least one embodiment, each spool includes a gate arm, extending perpendicularly from a cylindrical shaft that is repositionable relative to the shaft. A sub-channel unit may be constructed from one or more of such spools mounted on a back plate, all without departing from the scope of one or more embodiments of the present invention.

As referenced previously, the midsection members 80 may preferably be mounted at more than one distance from the front of the cable manager 30. This is facilitated by the inclusion of a plurality of columns of square apertures 58 in the lateral portions 59 of the support columns 46. In the illustrated embodiment, there are three columns of such apertures 58, with one column located in the center of the support column and the other two columns located a uniform distance forward and rearward from the center column. However, it will be appreciated that a greater or lesser number of columns of such apertures 58 may alternatively be provided.

Figure 28:
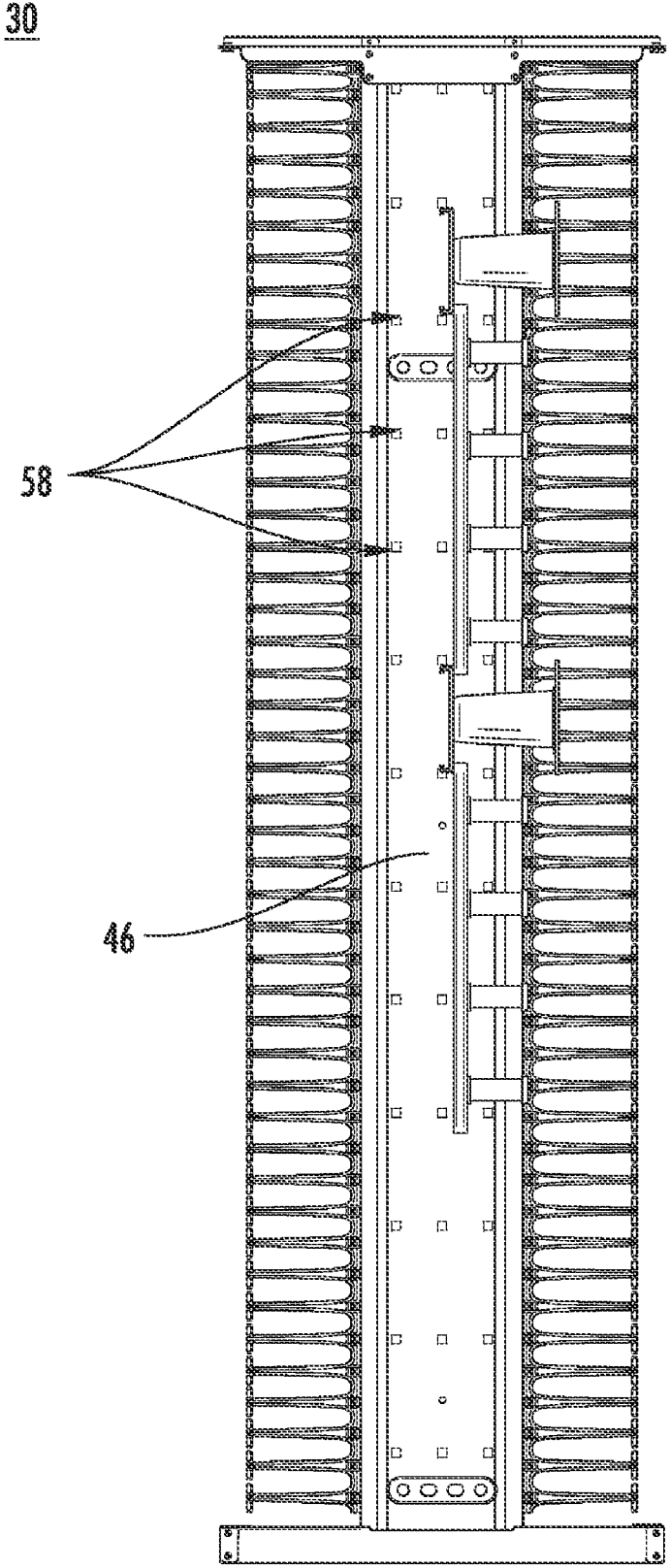
FIG. 28 is a side cross-sectional view of the vertical cable manager of FIG. 13, shown with the accessories disposed in a first alternative arrangement.
Figure 29:
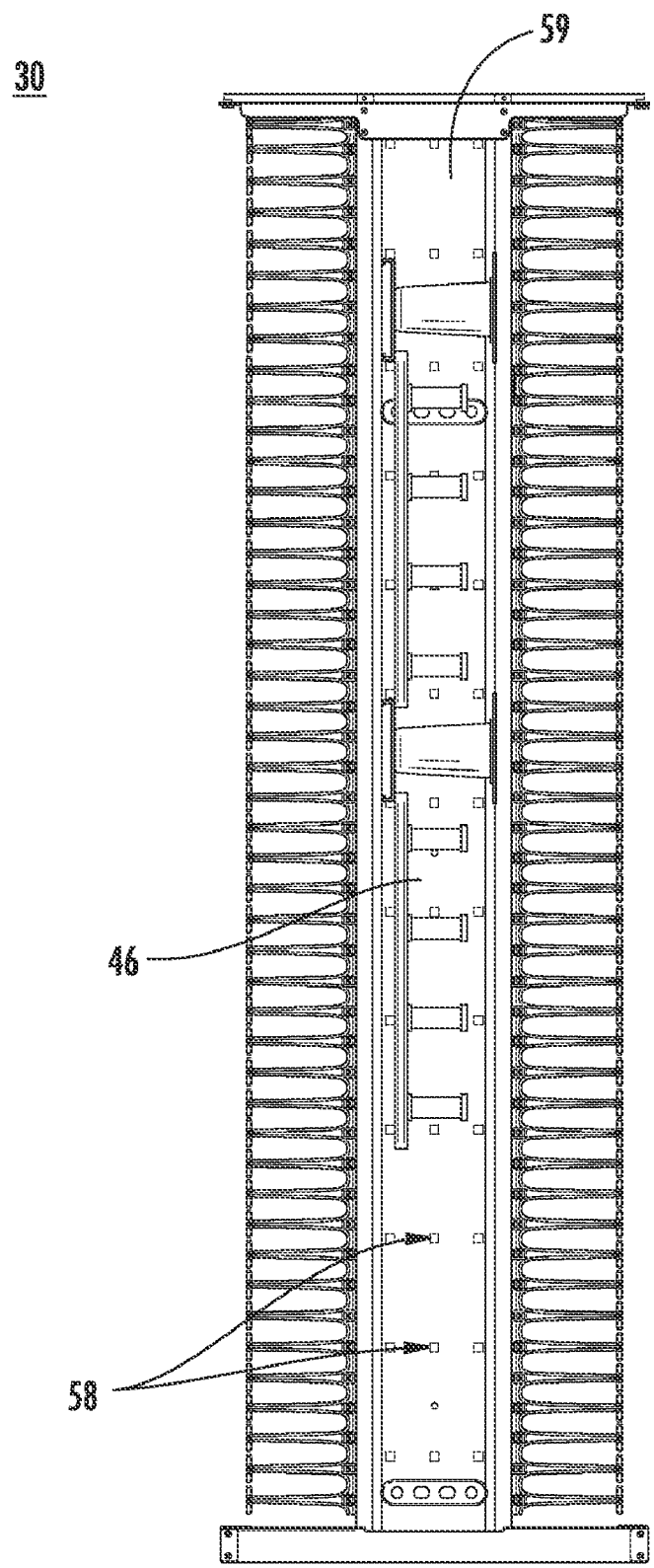
FIG. 29 is a side cross-sectional view of the vertical cable manager of FIG. 13, shown with the accessories disposed in a second alternative arrangement.

In FIGS. 13-18, the midsection members 80, and thus the accessories supported thereby, are mounted in a forward-most position in the cable manager 30. However, FIGS. 28 and 29 are side cross-sectional views of the vertical cable manager 30 of FIG. 13 with the accessories disposed in first and second alternative arrangements, respectively. More particularly, in FIG. 28, the midsection members 80, and thus the accessories supported thereby, are mounted in a center position in the cable manager 30, while in FIG. 29, the midsection members 80, and thus the accessories supported thereby, are mounted in a rearward-most position in the cable manager 30. Of course, as used herein, "forward" and "rearward" are relative terms, and it will be apparent to the Ordinary Artisan that any of these arrangements may be reversed such that the midsection members 80, and any accessories supported thereby, are oriented in the opposite direction, or for some midsection members 80 and accessories to face forward and for others to face rearward. Furthermore, although not illustrated, it will also be appreciated that combinations of these arrangements may likewise be accomplished. For example, one set of midsection members 80, and accessories supported thereby, may be mounted in apertures 58 in one of the columns, with the accessories on it extending in one direction, and another set of midsection members 80, and accessories supported thereby, may be mounted in apertures 58 in another of the columns, with the accessories on it extending in the opposite direction. Other permutations will likewise be appreciated by the Ordinary Artisan.

Figure 30:
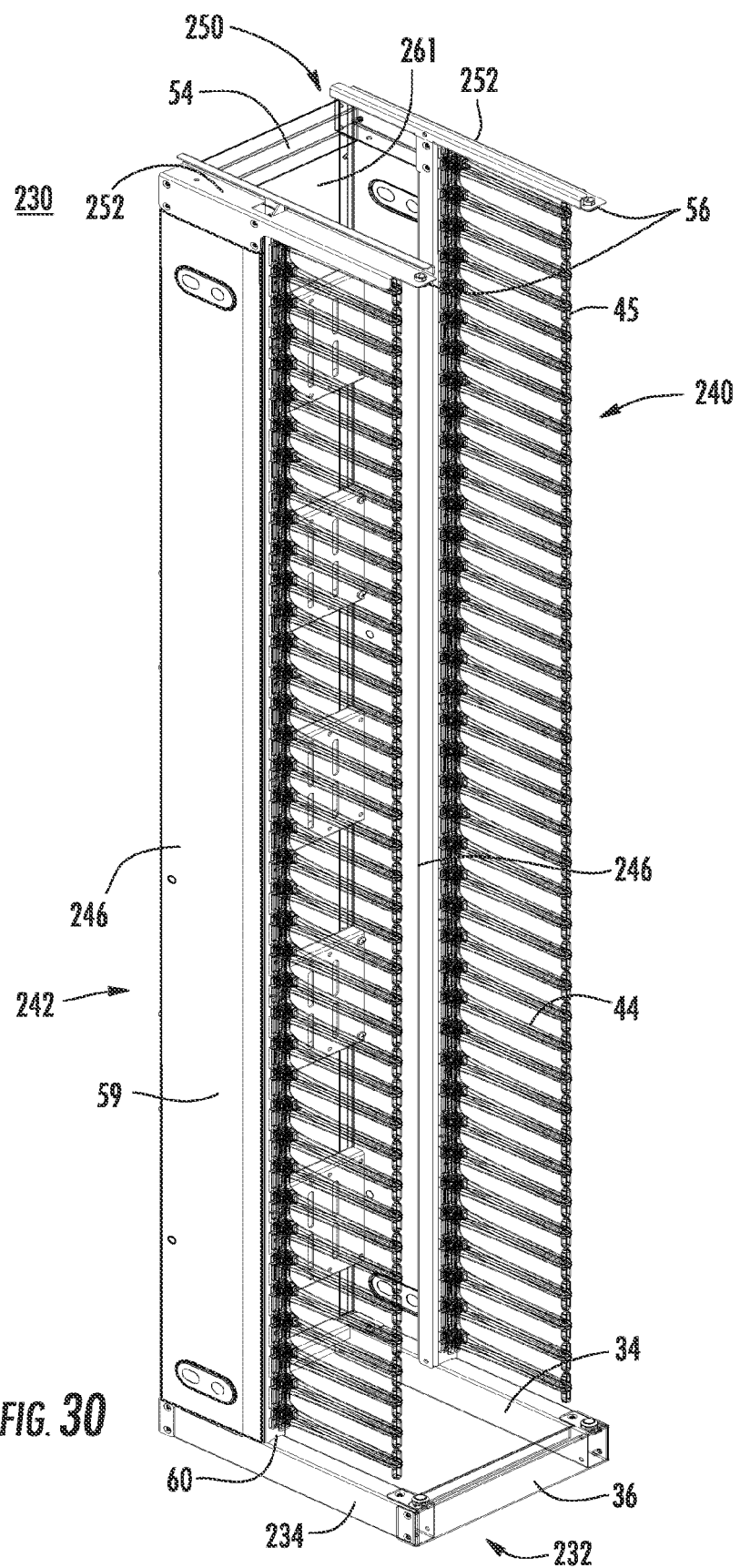
FIG. 30 is an isometric view of a vertical cable manager in accordance with a third preferred embodiment of the present invention.

FIG. 30 is an isometric view of a single-channel vertical cable manager 230 in accordance with a third preferred embodiment of the present invention. As shown therein, this vertical cable manager 230 includes a single-channel base 232, an interconnected double half-spine assembly 240 topped by a single-channel top frame 250, and a front door (not shown). Means may or may not be provided for mounting a rear door on the back of the cable manager 230. The double half-spine assembly 240 is supported by the base 232. The door is similar to the doors 38 of the cable manager 30 of FIG. 2, and in particular is used like the front door 38 of that cable manager 30. The base 232 comprises a frame that includes two shortened side members 234 and two cross members 36, with the length of the shortened side members 234 and the length of the cross members 36 defining the depth and width, respectively, of the vertical cable manager 230.

The interconnected double half-spine assembly 240 includes two half-spine assemblies 242, each having a plurality of ribbed or fingered cable guides 44,45 extending only forwardly from a single-channel vertical support column 246. The half-spine assemblies 242 are interconnected at their lower ends by the base 232 and at their upper ends by the top frame 250. Each support column 246 may be formed from a generally C-shaped section of metal, producing a lateral portion 59, a front bracket 60 and a plain rear bracket 261. Penetrating the front bracket 60, but preferably not the rear bracket 261, are a series of preferably evenly-spaced square apertures, similar to the square apertures 48 of FIG. 4, and a number of small round apertures, similar to the round apertures 49 of FIG. 4, interspersed therebetween. The fingered cable guides 44,45 are attached to the front brackets 60 of the support columns 246 via the apertures therein.

The top frame 250 includes two shortened side assemblies 252 and a cross member 54. Each side assembly 252 includes a portion for mounting to the top of a respective support column 246 and a horizontal rail. A hinge/latch interface 56 is disposed at each of the distal ends of the horizontal rails, thereby providing hinge and latch functions for each lateral side of each door 38. The cross member 54 stabilizes the upper ends of the spine assemblies 242, fixing the distance therebetween. Optionally, additional interconnection between the spine assemblies 242 may be provided by midsection members 80, like those described previously, attached to the support columns 246 via square apertures (not shown) therein.

Other than the variations in the respective bases 32,232, top frames 50,250 and support columns 46,246, wherein the various elements define only a single channel for routing cables, the design, construction and operation of the single-channel vertical cable manager 230 is generally similar to that of the double-channel vertical cable manager 30 of FIG. 2. Other differences will be understood by the Ordinary Artisan.

An important function of the various aspects of the present invention described and illustrated herein is to provide installers with a wide variety of options for cable management in a vertical cable manager. Thus, it will be appreciated that various combinations and permutations of the spools, members, lashing bars, and the like are all within the scope of the present invention, and indeed such flexibility is considered to be an inventive aspect in its own right.

Based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

What is claimed is:

1. A vertical cable manager, comprising:
a pair of column assemblies, each having a generally planar portion with a plurality of mounting locations arranged in a plurality of columns, the mounting locations of one column assembly being aligned with the mounting locations of the other column assembly; and
a removable midsection member connected between the column assemblies at the mounting locations;
wherein the midsection member is adapted to be repositioned relative to the column assemblies;
wherein the midsection member includes a vertically-oriented planar portion reinforced by a structural element along at least one of a top and a bottom of the planar portion; and
wherein the planar portion of the midsection member is reinforced by a first longitudinal flange extending perpendicularly from the top of the planar portion and is further reinforced by a second longitudinal flange extending perpendicularly from the bottom of the planar portion.

2. The vertical cable manager of claim 1, wherein the midsection member is repositionable to any of various heights by mounting at different mounting locations within a selected column.

3. The vertical cable manager of claim 1, wherein the midsection member is repositionable to any of various depths by mounting at mounting locations within different columns.

4. The vertical cable manager of claim 1, wherein the midsection member is generally C-shaped in cross section.

5. The vertical cable manager of claim 1, wherein the mounting locations are apertures.

6. The vertical cable manager of claim 5, wherein the midsection member includes static tabs at ends thereof for extending through the apertures of the planar portions.

7. The vertical cable manager of claim 1, wherein the midsection member includes two telescoping sections, one section being nested within the other, for permitting adjustment of the length of the midsection member.

8. The vertical cable manager of claim 7, wherein each telescoping section includes one or more apertures that are alignable when the telescoping sections are adjusted relative to one another.

9. The vertical cable manager of claim 1, wherein the midsection member includes one or more apertures for mounting accessories thereto.

10. The vertical cable manager of claim 9, wherein a large cable spool is mountable to the midsection member.

11. The vertical cable manager of claim 9, wherein a lashing bar assembly is mountable to the midsection member.

12. The vertical cable manager of claim 9, wherein a sub-channel unit is mountable to the midsection member.

13. A vertical cable manager, comprising:
a pair of column assemblies, each having a generally planar portion with a plurality of mounting locations arranged in a plurality of columns, the mounting locations of one column assembly being aligned with the mounting locations of the other column assembly;
a removable midsection member connected between the column assemblies at the mounting locations; and
a locking key attachable at an end of the midsection member and extendable through an aperture of the planar portion for providing stability to the midsection member;
wherein the midsection member is adapted to be repositioned relative to the column assemblies;
wherein the mounting locations are apertures; and
wherein the midsection member includes static tabs at ends thereof for extending through the apertures of the planar portions.

14. The vertical cable manager of claim 13, wherein the midsection member is repositionable to any of various heights by mounting at different mounting locations within a selected column.

15. The vertical cable manager of claim 13, wherein the midsection member is repositionable to any of various depths by mounting at mounting locations within different columns.

16. The vertical cable of claim 13, wherein the midsection member includes a vertically-oriented planar portion reinforced by a structural element along at least one of a top and a bottom of the planar portion.

17. The vertical cable manager of claim 16, wherein the midsection member is generally C-shaped in cross-section.

18. The vertical cable manager of claim 13, wherein the midsection member includes two telescoping sections, one section being nested within the other, for permitting adjustment of the length of the midsection member.

19. The vertical cable manager of claim 18, wherein each telescoping section includes one or more apertures that are alignable when the telescoping sections are adjusted relative to one another.

20. The vertical cable manager of claim 13, wherein the midsection member includes one or more apertures for mounting accessories thereto.

21. The vertical cable manager of claim 20, wherein a large cable spool is mountable to the midsection member.

22. The vertical cable manager of claim 20, wherein a lashing bar assembly is mountable to the midsection member.

23. The vertical cable manager of claim 20, wherein a sub-channel unit is mountable to the midsection member.

24. A vertical cable manager, comprising:
a pair of column assemblies, each having a generally planar portion with a plurality of mounting locations arranged in a plurality of columns, the mounting locations of one column assembly being aligned with the mounting locations of the other column assembly;
a removable, C-shaped midsection member connected between the column assemblies at the mounting locations, the midsection members including two telescoping sections, one section being nested within the other, for permitting adjustment of the length of the midsection member; and
a locking key attachable at an end of the midsection member and extendable through an aperture of the planar portion for providing stability to the midsection member;
wherein the midsection member is adapted to be repositioned relative to the column assemblies;
wherein the mounting locations are apertures; and
wherein the midsection member includes static tabs at ends thereof for extending through the apertures of the planar portions.

25. The vertical cable manager of claim 24, wherein the midsection member is repositionable to any of various heights by mounting at different mounting locations within a selected column.

26. The vertical cable manager of claim 24, wherein the midsection member is repositionable to any of various depths by mounting at mounting locations within different columns.

27. The vertical cable manager of claim 24, wherein the midsection member includes one or more apertures for mounting accessories thereto.

28. The vertical cable manager of claim 27, wherein each telescoping section includes one or more apertures that are alignable when the telescoping sections are adjusted relative to one another.

29. The vertical cable manager of claim 27, wherein a large cable spool is mountable to the midsection member.

30. The vertical cable manager of claim 27, wherein a lashing bar assembly is mountable to the midsection member.

31. The vertical cable manager of claim 27, wherein a sub-channel unit is mountable to the midsection member.

32. A removable midsection member for use in connection with a vertical cable manager, comprising:
two telescoping sections, one being nested within the other, for adjusting the length of the midsection member between a pair of column assemblies of the vertical cable manager;
static tabs at each end thereof for extending through mounting apertures arranged in general alignment with one another at the respective column assemblies; and
a locking key attachable at outermost ends of the telescoping sections and extendable through an aperture of the respective column assemblies for providing stability to the midsection member;
wherein the midsection member is adapted to be repositioned relative to the column assemblies to any of various heights or depths.

33. The removable midsection member of claim 32, wherein the telescoping sections are each generally C-shaped in cross-section.

34. The removable midsection member of claim 32, wherein the midsection member includes one or more apertures for mounting accessories thereto.

35. The removable midsection member of claim 34, wherein each telescoping section includes one or more apertures that are alignable when the telescoping sections are adjusted relative to one another.

36. The removable midsection member of claim 35, wherein a large cable spool is mountable to the telescoping sections.

37. The removable midsection member of claim 35, wherein a lashing bar assembly is mountable to the telescoping sections.

38. The removable midsection member of claim 35, wherein a sub-channel unit is mountable to the telescoping sections.

* * * * *